United States Patent
Saito et al.

(10) Patent No.: US 10,205,543 B2
(45) Date of Patent: Feb. 12, 2019

(54) WIRELESS COMMUNICATION SYSTEM AND METHOD FOR MONITORING THE QUALITY OF A WIRELESS LINK AND RECOMMENDING A MANUAL ADJUSTMENT TO IMPROVE THE QUALITY OF THE WIRELESS LINK

(71) Applicant: SONY CORPORATION, Tokyo (JP)

(72) Inventors: Erika Saito, Tokyo (JP); Natsuki Itaya, Tokyo (JP); Kazuyuki Sakoda, Chiba (JP); Kenzoh Nishikawa, Kanagawa (JP); Chihiro Fujita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/531,642

(22) PCT Filed: Nov. 25, 2015

(86) PCT No.: PCT/JP2015/005852
§ 371 (c)(1),
(2) Date: May 30, 2017

(87) PCT Pub. No.: WO2016/098287
PCT Pub. Date: Jun. 23, 2016

(65) Prior Publication Data
US 2017/0359129 A1    Dec. 14, 2017

(30) Foreign Application Priority Data
Dec. 15, 2014 (JP) .................. 2014-253333

(51) Int. Cl.
*H04B 17/23* (2015.01)
*H04B 17/29* (2015.01)
(Continued)

(52) U.S. Cl.
CPC ............ *H04B 17/23* (2015.01); *H04B 17/29* (2015.01); *H04B 17/318* (2015.01); *H04B 17/309* (2015.01); *H04B 17/364* (2015.01)

(58) Field of Classification Search
CPC ...... H04B 17/318; H04B 17/23; H04B 17/29; H04B 17/364; H04B 17/309; H04R 3/12; H04R 1/403; H04S 7/301; H04S 7/302
See application file for complete search history.

(56) References Cited

U.S. PATENT DOCUMENTS 6,466,832 B1 * 10/2002 Zuqert .................. H04R 3/14
  700/94
7,773,941 B2 * 8/2010 Bonta .................. H04B 7/2606
  455/11.1
(Continued)

FOREIGN PATENT DOCUMENTS

AU    2008349583 A1    8/2009
EP       2245700 A1   11/2010
(Continued)

OTHER PUBLICATIONS

Devjani Sinha, "Sensor Based Efficient Multi-Floor Location Tracking", Master Project Report, pp. 1-24.
(Continued)

*Primary Examiner* — Devan Sandiford
(74) *Attorney, Agent, or Firm* — Chip Law Group

(57) ABSTRACT

A system that acquires information from at least first and second electronic devices, the information indicating a quality of a wireless link between the at least first and second electronic devices; generates adjustment information indicating an adjustment of at least one of a position, orientation, antenna position or antenna direction of at least one of the first or second electronic devices to improve the quality of
(Continued)

the wireless link between the first and second electronic devices; and controls outputting the adjustment information.

26 Claims, 33 Drawing Sheets

(51) Int. Cl.
*H04B 17/318* (2015.01)
*H04B 17/309* (2015.01)
*H04B 17/364* (2015.01)

(56) References Cited

U.S. PATENT DOCUMENTS

| | | | | |
|---|---|---|---|---|
| 9,015,612 B2* | 4/2015 | Nguyen | ............... | G06K 9/0057 715/769 |
| 9,402,145 B2* | 7/2016 | Carlsson | ................ | H04S 7/307 |
| 9,426,551 B2* | 8/2016 | Carlsson | ................ | H04R 1/028 |
| 9,560,449 B2* | 1/2017 | Carlsson | ................ | H04R 3/12 |
| 2003/0202469 A1* | 10/2003 | Cain | ........................ | H04L 45/20 370/230 |
| 2004/0203433 A1* | 10/2004 | Najafi | ..................... | H04B 17/23 455/67.11 |
| 2004/0264704 A1* | 12/2004 | Huin | ........................ | H04S 7/301 381/59 |
| 2005/0094585 A1* | 5/2005 | Golden | ................ | H04B 7/0408 370/310 |
| 2005/0250457 A1 | 11/2005 | Mester et al. | | |
| 2006/0159033 A1* | 7/2006 | Suzuki | ..................... | H04L 45/00 370/254 |
| 2007/0078981 A1* | 4/2007 | Alberth, Jr. | ........... | H04W 88/02 709/225 |
| 2008/0171519 A1 | 7/2008 | Tegreene | | |
| 2008/0198079 A1 | 8/2008 | Tegreene | | |
| 2009/0081948 A1* | 3/2009 | Banks | ...................... | H04R 5/02 455/3.05 |
| 2010/0185753 A1* | 7/2010 | Liu | ..................... | H04L 65/4084 709/219 |
| 2010/0299639 A1* | 11/2010 | Ramsay | ................ | G06F 3/0486 715/835 |
| 2010/0317298 A1* | 12/2010 | Hakansson | .......... | H01Q 1/1257 455/67.13 |
| 2011/0023074 A1 | 1/2011 | Nguyen | | |
| 2012/0113224 A1* | 5/2012 | Nguyen | ............... | G06K 9/0057 348/46 |
| 2015/0029954 A1* | 1/2015 | Victor | .................. | H04L 12/5692 370/329 |
| 2015/0208187 A1* | 7/2015 | Carlsson | .................. | H04R 3/12 381/79 |
| 2015/0326331 A1* | 11/2015 | Knowles | ................ | H04R 27/00 370/350 |
| 2017/0026770 A1* | 1/2017 | Patel | ........................ | H04R 3/12 |
| 2017/0055097 A1* | 2/2017 | Dougherty | .............. | H04S 7/301 |
| 2017/0094437 A1* | 3/2017 | Kadri | ....................... | H04R 5/02 |
| 2017/0215121 A1* | 7/2017 | Condeixa | ................ | H04W 36/18 |
| 2018/0041830 A1* | 2/2018 | Shahamat | ................ | H04R 3/00 |

FOREIGN PATENT DOCUMENTS

| | | |
|---|---|---|
| JP | 2006-180138 A | 7/2006 |
| JP | 2008-501257 A | 1/2008 |
| JP | 2009-239385 A | 10/2009 |
| JP | 2011-114415 A | 6/2011 |
| WO | 2007/040831 A1 | 4/2007 |
| WO | 2009/096834 A1 | 8/2009 |

OTHER PUBLICATIONS

Rev. B, "Wireless Sensor Networks: Getting Started Guide", 7430-0022-05, Aug. 2004, pp. 1-43.
Devjani Sinha, "Sensor Based Efficient Multi-Floor Location Tracking", pp. 24.
Rev. B, "Wireless Sensor Networks: Getting Started Guide", XP055249562, Aug. 2004, 48 pages.
Devjani Sinha, "Sensor Based Efficient Multi-Floor Location Tracking", Master Project Report, XP055249555, 24 pages.
International Search Report and Written Opinion of PCT Application No. PCT/JP2015/005852, dated Feb. 19, 2016, 15 pages.
Office Action for JP Patent Application No. 2014-253333, dated Mar. 13, 2018, 04 pages of Office Action and 03 pages of English Translation.
Office Action for EP Patent Application No. 15813929.5, dated Dec. 12, 2018, 06 pages of Office Action.

* cited by examiner

FIG. 4

| 132 ↘ | | | | | | |
|---|---|---|---|---|---|---|
| | 204 | 2 | 2 | 1 | 1 | |
| | 203 | 2 | 2 | 1 | | 1 |
| | 202 | 1 | 1 | | 1 | 1 |
| | 201 | 1 | | 1 | 2 | 2 |
| | 200 | | 1 | 1 | 2 | 2 |
| | | 200 | 201 | 202 | 203 | 204 |

FIG. 7

| TERMINAL IDENTIFICATION INFORMATION \ COMMUNICATION QUALITY INFORMATION | DATA RATE | RSSI | MCS | HOP COUNT | TIME DEVIATION INFORMATION |
|---|---|---|---|---|---|
| 201 | 10Mbs | ... | ... | 1 | 2 |
| 202 | 4Mbs | ... | ... | 1 | 101 |
| 203 | × | ... | ... | 2 | 80 |
| 204 | × | ... | ... | 2 | 250 |

| 134 | | FUNCTION | STATIONARY/MOBILE |
|---|---|---|---|
| | 200 | DISPLAY | STATIONARY |
| | 201 | DISPLAY + SOUND OUTPUT | MOBILE |
| | 202 | SOUND OUTPUT | STATIONARY |
| | 203 | INPUT + DISPLAY + SOUND OUTPUT | MOBILE |
| | 204 | INPUT | MOBILE |

WIRELESS COMMUNICATION SYSTEM AND METHOD FOR MONITORING THE QUALITY OF A WIRELESS LINK AND RECOMMENDING A MANUAL ADJUSTMENT TO IMPROVE THE QUALITY OF THE WIRELESS LINK

CROSS REFERENCE TO RELATED APPLICATIONS

This application is a U.S. National Phase of International Patent Application No. PCT/JP2015/005852 filed on Nov. 25, 2015, which claims the benefit of Japanese Patent Application No. JP 2014-253333 filed in the Japan Patent Office on Dec. 15, 2014. Each of the above-referenced applications is hereby incorporated herein by reference in its entirety.

TECHNICAL FIELD

The present technology relates to an information processing apparatus. More specifically, the present technology relates to an information processing apparatus which handles information exchanged by wireless communication, a communication system, an information processing method, and a program to cause a computer to execute the method.

BACKGROUND ART

In related art, there is a wireless communication technology to exchange information by using wireless communication. For example, a communication method of autonomously performing mutual connection with an electronic device in a range in which a radio wave arrives (which communication method is, for example, ad hoc communication or ad hoc network) is proposed (see, for example, PTL 1).

CITATION LIST

Patent Literature

[PTL 1]
JP 2009-239385 A

SUMMARY

Technical Problem

According to the above conventional technology, it is possible to exchange information between two electronic devices by using wireless communication even when connection through a wired line is not performed. Here, communication quality between the electronic devices varies according to an installation place or an installation direction of each of the electronic devices. However, it is difficult for a user to recognize and see whether the quality is high or low. Thus, it is important to set an optimal wireless communication environment in consideration of communication quality between the electronic devices.

Thus, for example, it is considered that it is possible to provide an appropriate environment corresponding to communication quality between the electronic devices by using information exchanged between the electronic devices.

The present technology is provided in view of such condition and is to provide an appropriate environment corresponding to communication quality between electronic devices.

Solution to Problem

According to one embodiment, the disclosure is directed to a system that acquires information from at least first and second electronic devices, the information indicating a quality of a wireless link between the at least first and second electronic devices; generates adjustment information indicating an adjustment of at least one of a position, orientation, antenna position or antenna direction of at least one of the first or second electronic devices to improve the quality of the wireless link between the first and second electronic devices; and controls outputting the adjustment information.

The adjustment information may indicate at least one of a recommended antenna direction for at least one of the first or second electronic devices, a recommended orientation of at least one of the first or second electronic devices, or a recommended position of at least one of the first or second electronic devices.

The information acquired from the at least first and second electronic devices may indicate at least one of a data rate of the wireless link between the at least first and second electronic devices, a hop count of an indirect wireless link between the at least first and second electronic devices, or a time delay of the wireless link between the at least first and second electronic devices.

The system may be configured to operate in a test mode, and control the first and second electronic devices to measure the quality of a wireless link between the at least first and second electronic devices.

The system may be configured to control outputting the adjustment information by generating display data to be displayed by a display. Further the system may include a user interface configured to receive an input corresponding to a layout of a building and a location of each or the first and second devices within the building, wherein the system is configured to generate the display data based on the received input.

The user interface may include a display configured to display a plurality of icons each corresponding to a feature of the building and each of the first and second electronic device. And the user interface may be configured to receive, as the input, one or more dragging operations dragging one or more of the plurality of icons to a predetermined area of the display.

The system may output the adjustment information to at least one of the first or second electronic devices.

The system may be configured to output the adjustment information to at least one of the first or second electronic devices. The system may be a third electronic device that includes the circuitry, and the third electronic device is communicatively coupled to the first and second electronic devices via a network. The circuitry may be configured to stream content to at least one of the first or second electronic devices via the network for reproduction at the at least one of the first or second electronic devices. The network may be a network in which the first, second and third electronic devices are connected to each other by one-on-one wireless communication. The one-on-one wireless communication may form an ad hoc mesh network connecting the first, second and third electronic devices.

The system may include the first electronic device; the second electronic device; and a third electronic device including the circuitry. The first and second electronic devices may be configured to measure at least one of a data rate, a received signal strength indicator (RSSI), a modulation and coding scheme (MCS), a time deviation or hop count of the link between the first and second electronic devices. The first and second electronic devices may transmit a result of the measurement to the third electronic device as the information indicating a quality of a wireless link between the at least first and second electronic devices.

According to one embodiment, the disclosure is directed to a method performed by a system, the method including: acquiring information from at least first and second electronic devices, the information indicating a quality of a wireless link between the at least first and second electronic devices; generating adjustment information indicating an adjustment of at least one of a position, orientation, antenna position or antenna direction of at least one of the first or second electronic devices to improve the quality of the wireless link between the first and second electronic devices; and controlling outputting the adjustment information.

According to one embodiment, the disclosure is directed to one or more non-transitory computer readable media including computer program instructions, which when executed by a system, cause the system to: acquire information from at least first and second electronic devices, the information indicating a quality of a wireless link between the at least first and second electronic devices; generate adjustment information indicating an adjustment of at least one of a position, orientation, antenna position or antenna direction of at least one of the first or second electronic devices to improve the quality of the wireless link between the first and second electronic devices; and control outputting the adjustment information.

Advantageous Effects of Invention

According to an embodiment of the present technology, an appropriate environment corresponding to communication quality between electronic devices can be provided. Note that an effect described herein is not the limitation and may be any of the effects disclosed in the present disclosure.

BRIEF DESCRIPTION OF DRAWINGS

FIG. 4 is a table schematically illustrating a management table held by the information processing apparatus 100 in the first embodiment of the present technology.

FIG. 7 is a table schematically illustrating a communication quality management table 231 held by the electronic device 200 in the first embodiment of the present technology.

FIG. 19 is a table schematically illustrating an electronic device management table 134 held by an information processing apparatus 100 in the third embodiment of the present technology.

DESCRIPTION OF EMBODIMENTS

In the following, a mode to carry out the present technology (hereinafter, referred to as embodiment) will be described. A description will be made in the following order.
1. First embodiment (example in which electronic device measures communication quality and gives report to information processing apparatus)
2. Second embodiment (example in which information processing apparatus measures and displays communication quality)
3. Third embodiment (example of adjustment method of when mobile electronic device is installed)
4. Fourth embodiment (example of using mobile information processing apparatus)
5. Fifth embodiment (example of handling communication quality by using cloud service)
6. Application example 1. First Embodiment

[Example of Configuration of Communication System]

Figure 1:
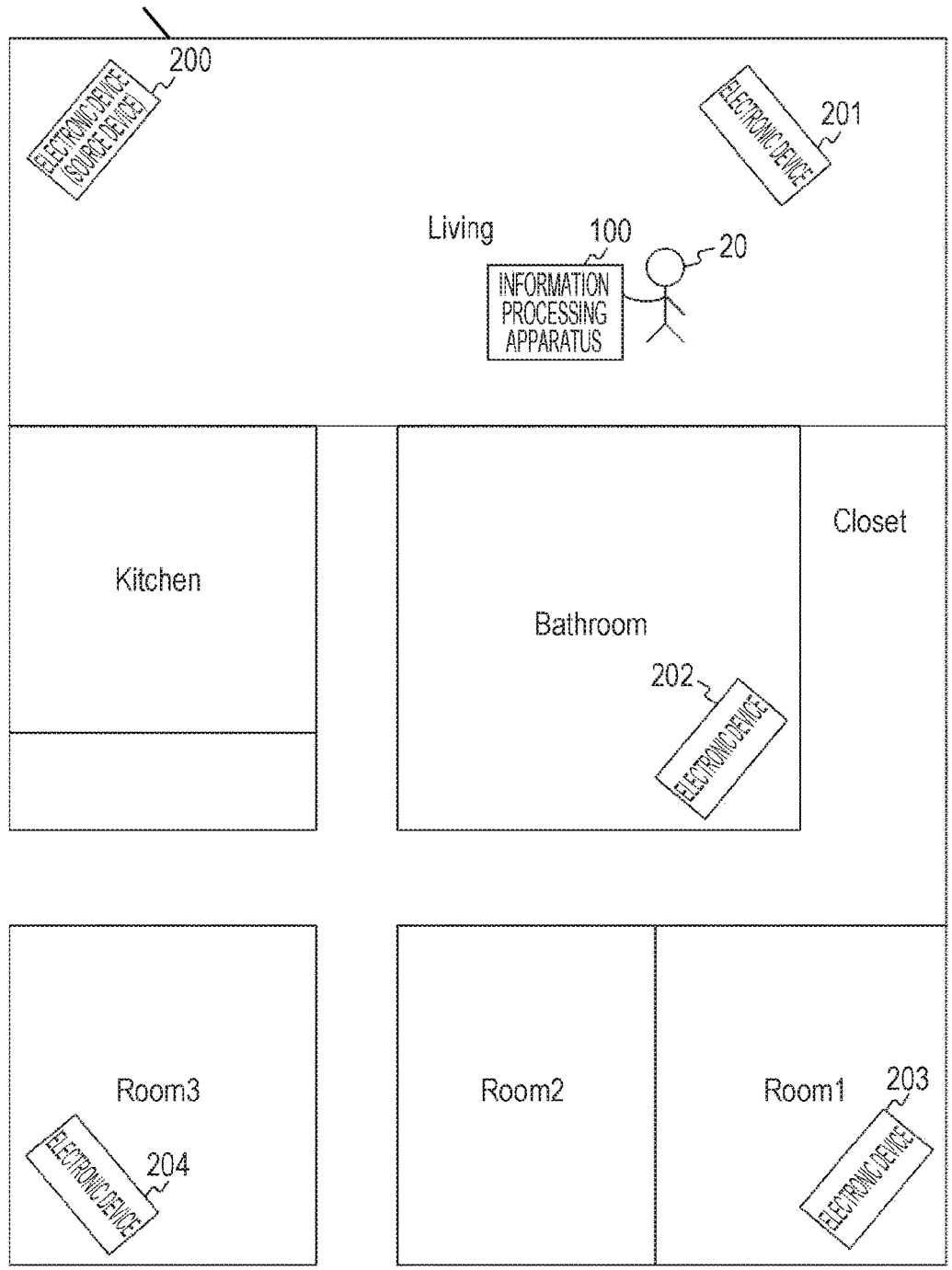
FIG. 1 is a view illustrating an example of a system configuration of a communication system 10 in a first embodiment of the present technology.

FIG. 1 is a view illustrating an example of a system configuration of a communication system 10 in the first embodiment of the present technology.

The communication system 10 includes an information processing apparatus 100 and electronic devices 200 to 204. Note that in FIG. 1, an example of arrangement in a case where the information processing apparatus 100 and the electronic devices 200 to 204 are installed in a house including a living room, a bathroom, a kitchen, a closet, and three rooms is illustrated.

Here, the information processing apparatus 100 can be a portable information processing apparatus including a display function. That is, the information processing apparatus 100 is a device which can be operated at hand by a user 20 and which is a mobile device. Note that each of the electronic devices 200 to 204 may or may not include a display function.

Also, each of the information processing apparatus 100 and the electronic devices 200 to 204 includes a wireless communication function with which it is possible to exchange information with a different device by using wireless communication. For example, the information processing apparatus 100 and the electronic devices 200 to 204 can perform wireless communication by a communication system of a wireless local area network (LAN). Also, the information processing apparatus 100 and the electronic devices 200 to 204 may perform wireless communication by a different communication system.

In such a manner, various wireless communication devices are arranged in a distributed manner in a certain area, whereby the communication system 10 is configured. Note that the information processing apparatus 100 can be held by the user 20.

Here, for example, the certain area indicates a place such as an office, a house, a factory, an airport, an educational institution (such as classroom in school), a cultural institution, a sport facility, a welfare institution, a medical facility (such as hospital), an assembly hall, an airport, a tourist facility, a commercial facility, or an accommodation facility.

Also, for example, each of the electronic devices 200 to 204 can be an electronic device such as a sensor, a television, a projector, a hard disk recorder, a speaker, a microphone, an access point, a personal computer (PC), or a display. Also, for example, each of the electronic devices 200 to 204 can be an electronic device such as a drone, a medical device, a surgical device, a patient tracking monitor, gaming device, a Blu-ray disc player, a printer, a light with a sensor, an automatic door, a security device, or a disaster prevention device. Also, for example, each of the electronic devices 200 to 204 is a tablet, a smartphone, a photo frame, a refrigerator, an air conditioner, an air cleaner, a vacuum cleaner (such as self-propelled vacuum cleaner), a laundry machine, a microwave, a toaster, a ventilation fan, or a radio.

Also, wireless communication performed between devices is realized, for example, by a communication method in which mutual connection with a peripheral electronic device is performed autonomously. Note that the peripheral electronic device is, for example, an adjacent electronic device or an adjoining electronic device.

Here, as a communication method in which mutual connection with a peripheral electronic device is performed autonomously, ad hoc communication or an ad hoc network has been known. In such a network, each electronic device can perform mutual communication with a peripheral electronic device without depending on a master station (such as control device). Thus, in an embodiment of the present technology, a description will be made with an ad hoc network or a mesh network as an example of a communication method in which mutual connection with a peripheral electronic device is autonomously performed.

In the ad hoc network, when a new electronic device is added to the periphery, the new electronic device can freely participate in the network. In such a manner, it is possible to increase a cover range of the network as the number of electronic devices (peripheral electronic device) is increased. That is, a cover range of the network can be increased as an electronic device is serially added.

Here, each of the information processing apparatus 100 and the electronic devices 200 to 204 can perform transfer of information, which is exchanged between different devices, in a bucket-brigade manner in addition to autonomous mutual connection with a different device in the periphery.

For example, a case where there is a device (such as electronic device 201) for which it is difficult to directly communicate with the electronic device 203 due to non-arrival of a radio wave is assumed. In such a manner, even when direct connection is difficult to be performed, the electronic device 202 which can directly communicate with the electronic device 203 transfers data of the electronic device 201 to the electronic device 203. Since the data is transferred in such a manner, the electronic device 203 and the electronic device 201 for which it is difficult to communicate with the electronic device 203 directly can exchange information through the electronic device 202. That is, the electronic device 201 and the electronic device 203 can communicate with each other through a relay station (electronic device 202).

A method of performing data transfer to each other (so-called bucket brigade) in such a manner and transferring information to a distant device is called multi-hop relay. Also, a network to perform multi-hop is generally known as a mesh network. Also, the communication system 10 is an example of a network in which a plurality of devices is connected to each other by one-on-one wireless communication. That is, in the communication system 10, each device is a system included in an ad hoc network or a mesh network.

For example, the electronic device 200 is an electronic device (such as speaker including memory) which can hold content (such as sound content (sound source) or image content (video with sound)) and can output the content from the own device or from a different electronic device. Also, each of the electronic devices 201 to 204 is a speaker which can output the content held in the electronic device 200.

In this case, the content held in the electronic device 200 can be transmitted to the electronic devices 201 to 204 by wireless communication and the content can be reproduced in each installation place of the electronic devices 201 to 204. For example, each of (or at least one of) the electronic devices 201 to 204 can reproduce content of an identical sound source. Also, for example, the electronic devices 201 to 204 can respectively reproduce content of different sound sources.

Here, since it is possible to exchange information by wireless communication, the user 20 can freely install the electronic devices 200 to 204.

However, in a case of using the wireless communication, a size, a radio wave environment, or the like may vary in a certain area depending on an installation place. Thus, when the user 20 freely installs the electronic devices 200 to 204, a part of the electronic devices may be installed in a place where a radio wave does not arrive. Also, for example, a communication path (path) which is not easily connected to a part of the electronic devices may be generated. Also, for example, a communication path (path) with which a load is applied only to a part of the electronic devices may be generated.

Also, it is difficult for the user 20 to understand which installation place of each of the electronic devices 200 to 204 makes it possible to secure many paths good for a wireless communication environment or to understand an arrangement in which performance as the communication system 10 becomes optimal (or preferable). Thus, after installing the electronic devices 200 to 204, the user 20 needs to make each of the electronic devices 200 to 204 output sound, to listen to the sound output, and to look for an installation place of each of the electronic devices 200 to 204. In such a manner, the user 20 needs to serially and appropriately move the electronic devices 200 to 204 and to look for an installation place of each of the electronic devices 200 to 204.

As described, there are various installation environments of electronic devices. Thus, it is difficult for the user 20 to understand which arrangement of the electronic devices 200 to 204 is a preferable arrangement method of the communication system 10. Also, for example, since installation places of the electronic devices 200 to 204 are distributed, performing an adjustment method of the electronic devices 200 to 204 is difficult.

Thus, in the first embodiment of the present technology, an example in which a user can easily understand an arrangement of electronic devices with which arrangement performance as the communication system 10 becomes optimal (or preferable) will be described.

[Example of Configuration of Information Processing Apparatus]

Figure 2:
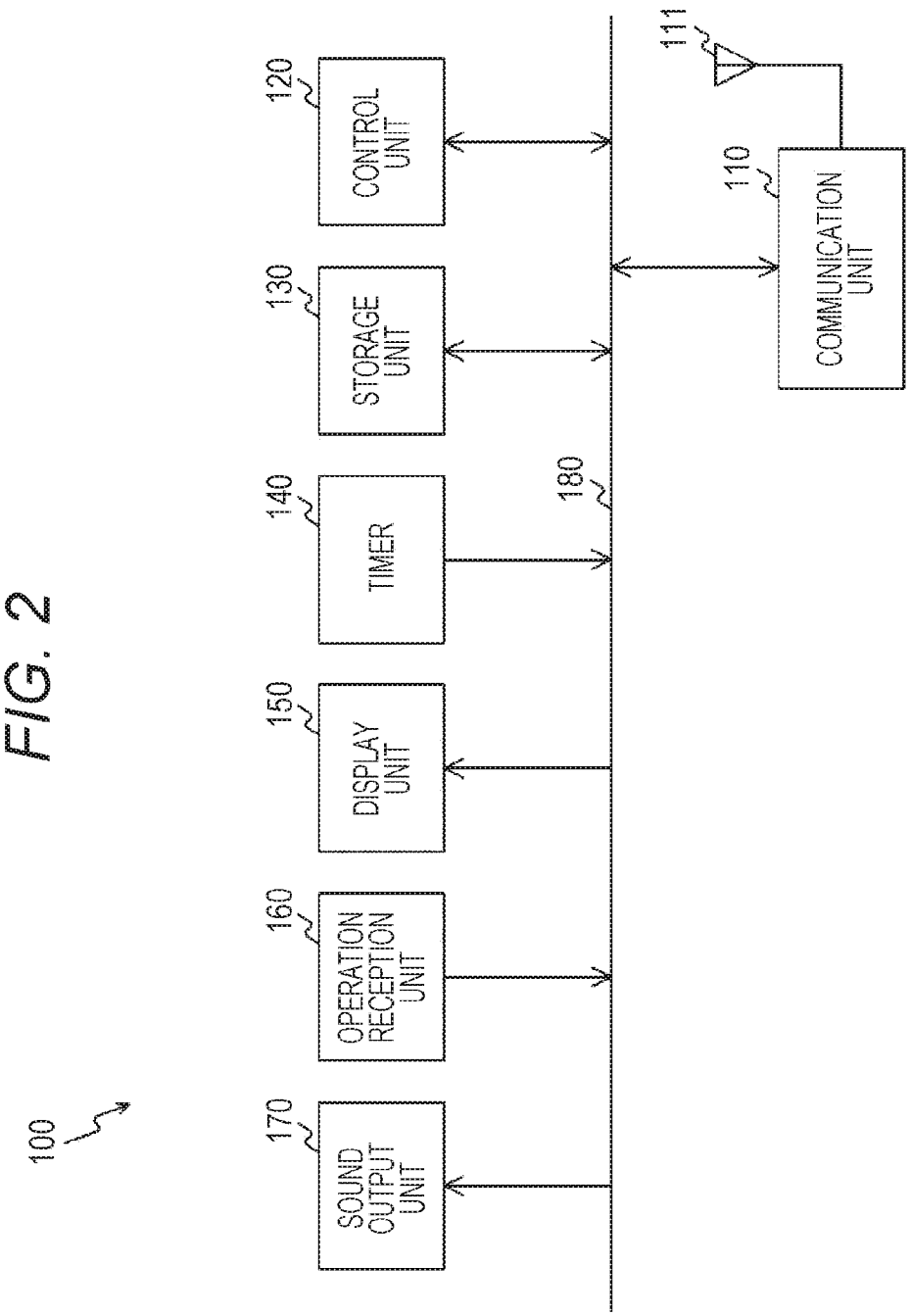
FIG. 2 is a block diagram illustrating an example of a functional configuration of an information processing apparatus 100 in the first embodiment of the present technology.

FIG. 2 is a block diagram illustrating an example of a functional configuration of the information processing apparatus 100 in the first embodiment of the present technology.

The information processing apparatus 100 includes a communication unit 110, an antenna 111, a control unit 120, a storage unit 130, a timer 140, a display unit 150, an operation reception unit 160, and a sound output unit 170. Also, these are connected to each other through a bus 180. The information processing apparatus 100 is, for example, a portable information processing apparatus which can be carried around by the user 20 (such as smartphone, tablet terminal, or mobile phone).

The communication unit 110 is a module (such as wireless local area network (LAN) modem) to perform transmission/reception of a radio wave through the antenna 111. For example, the communication unit 110 can perform wireless communication by a communication system of the wireless LAN. Also, for example, the communication unit 110 can perform wireless communication by ZigBee (registered trademark), near field communication (NFC), Bluetooth (BT (registered trademark)), or Bluetooth low energy (BLE). Also, for example, the communication unit 110 can perform wireless communication by a different communication system (such as visible light communication).

For example, based on the control by the control unit 120, the communication unit 110 can be connected to a different device and can exchange information with the device by using wireless communication. Also, for example, based on the control by the control unit 120, the communication unit 110 can transfer information, through a different device (first device), to a device (second device) different from the device (first device).

Also, the communication unit 110 may perform wireless communication using a radio wave (electromagnetic wave) and may perform wireless communication using a medium other than a radio wave (such as wireless communication using magnetic field). Note that the communication unit 110 is an example of an acquisition unit described in claims.

The control unit 120 controls each part of the information processing apparatus 100 based on a control program stored in the storage unit 130. For example, the control unit 120 is realized by a central processing unit (CPU). Also, for example, the control unit 120 performs signal processing of transmitted/received information.

Figure 10:
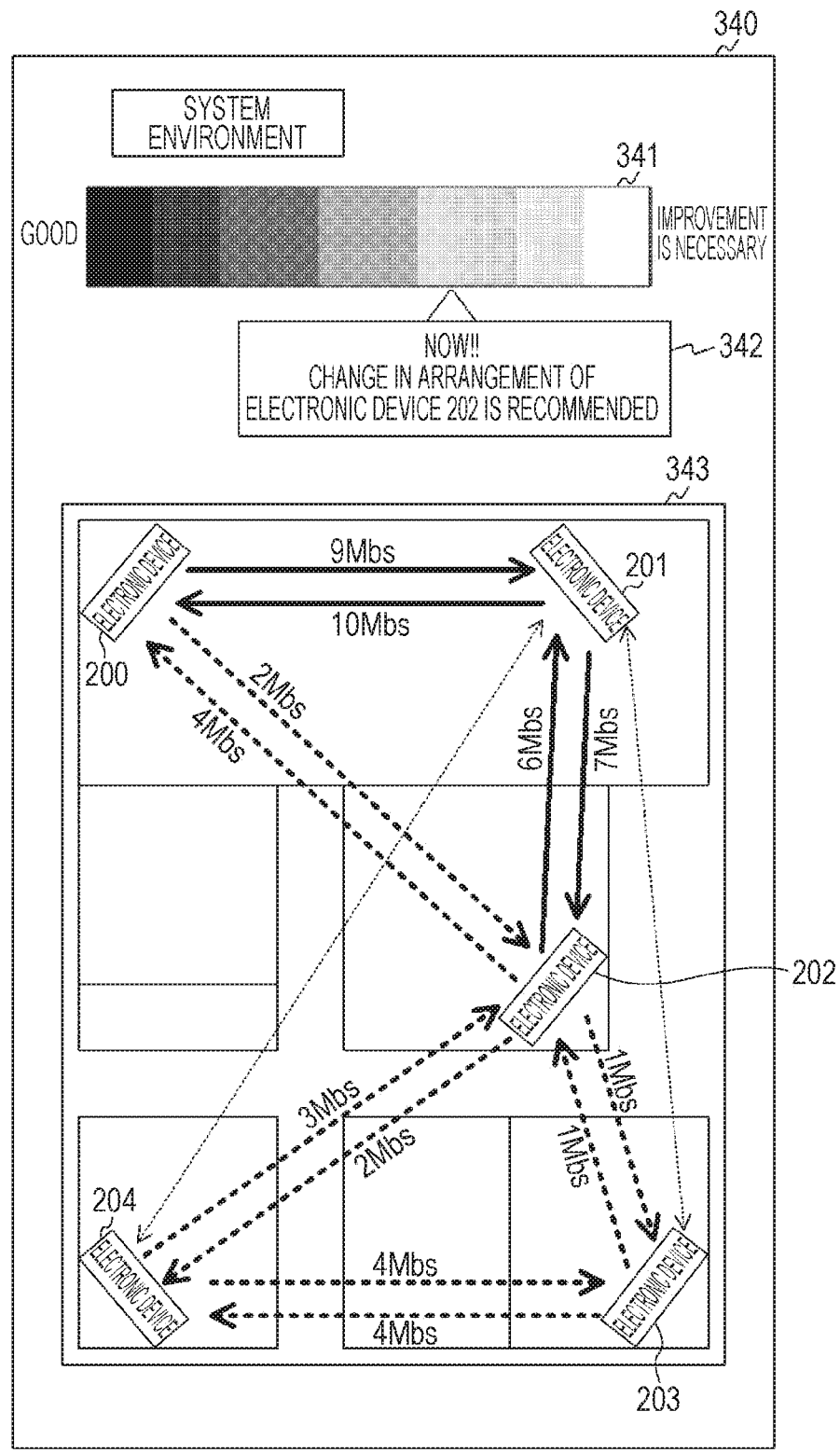
FIG. 10 is a view illustrating an example of a communication quality notification screen (communication quality notification screen 340) displayed on the display unit 150 in the first embodiment of the present technology.

For example, based on communication quality related to an electronic device which quality is acquired by the communication unit 110, the control unit 120 can output adjustment information to adjust a position and a direction of an antenna of the electronic device (for example, communication quality notification screen 340 illustrated in FIG. 10 can be displayed). For example, to the electronic device 200, an antenna 211 (illustrated in FIG. 6) is provided. Also, the antenna 211 is often included and fixed in the electronic device 200. Thus, for example, it is possible to adjust a position and a direction of the antenna 211 of the electronic device 200 by moving the electronic device 200 or changing an installation direction thereof. Note that when a mobile antenna is attached to the electronic device, it is possible to adjust a position or a direction of the antenna without moving the electronic device or changing a direction thereof.

The storage unit 130 is a memory to store various kinds of information. For example, in the storage unit 130, various kinds of information (such as control program) which is necessary for the information processing apparatus 100 to perform an intended operation is stored. Also, for example, in the storage unit 130, test data (calibration data) to transmit a test frame which is used by a different electronic device to measure communication quality is stored. Here, the communication quality is, for example, communication quality between electronic devices. For example, the communication quality can be understood as system communication performance of distributed and arranged electronic devices or as communication performance of each path in a case of performing data communication by using wireless communication. Also, in the storage unit 130, a management table (management table illustrated in FIG. 3 to FIG. 5) to manage communication quality measured by each electronic device is stored.

For example, a case of transmitting data from the communication unit 110 by using wireless communication is assumed. In this case, the control unit 120 processes information read from the storage unit 130, operation information input from the operation reception unit 160, or the like and generates a block of data to be actually transmitted (transmission packet). Then, the control unit 120 outputs the generated transmission packet to the communication unit 110. Also, after converting the transmission packet into a format of a communication system for actual transmission, the communication unit 110 transmits the converted transmission packet to the outside from the antenna 111.

Also, for example, in a case of receiving data in the communication unit 110 by using wireless communication, the communication unit 110 extracts a reception packet from the radio wave signal, which is received through the antenna 111, by signal processing performed by a reception device in the communication unit 110. Then, the control unit 120 interprets the extracted reception packet. As a result of the interpretation, when it is determined that the data is to be held, the control unit 120 writes the data into the storage unit 130. Also, when it is determined that the data is to be transferred to a different device, the control unit 120 transfers, to the communication unit 110, the data as a transmission packet to be transferred to a different device. Also, when it is determined that the data is to be output, the control unit 120 performs an output to the display unit 150 or to the sound output unit 170 or an output from an I/O interface (not illustrated) to the outside (such as external sound output apparatus).

The timer 140 is a timer to time various kinds of time. For example, the timer 140 times predetermined time at which the information processing apparatus 100 transmits a test frame. When the predetermined time is reached, the timer 140 gives a notification to the control unit 120.

The display unit 150 is a display unit to output various kinds of information based on the control performed by the control unit 120. As the display unit 150, for example, a display panel such as an organic electro luminescence (EL) panel or a liquid crystal display (LCD) panel can be used. As illustrated in FIG. 10, for example, information related to communication quality between the electronic devices 200 to 204 is displayed on the display unit 150.

The operation reception unit 160 is an operation reception unit to receive an operation input performed by a user. The operation reception unit 160 outputs, to the control unit 120, operation information corresponding to the received operation input. The operation reception unit 160 is realized, for example, by a touch panel, a keyboard, a mouse, or a sensor (such as touch interface). Note that the display unit 150 and the operation reception unit 160 can be configured integrally by a touch panel on which a user can perform an operation input by touching a display surface with a finger or bringing the finger close to the surface.

The sound output unit 170 is a sound output unit (such as speaker) to output various kinds of sound information based on the control by the control unit 120.

[Example of Contents in Management Table]

Figure 3:
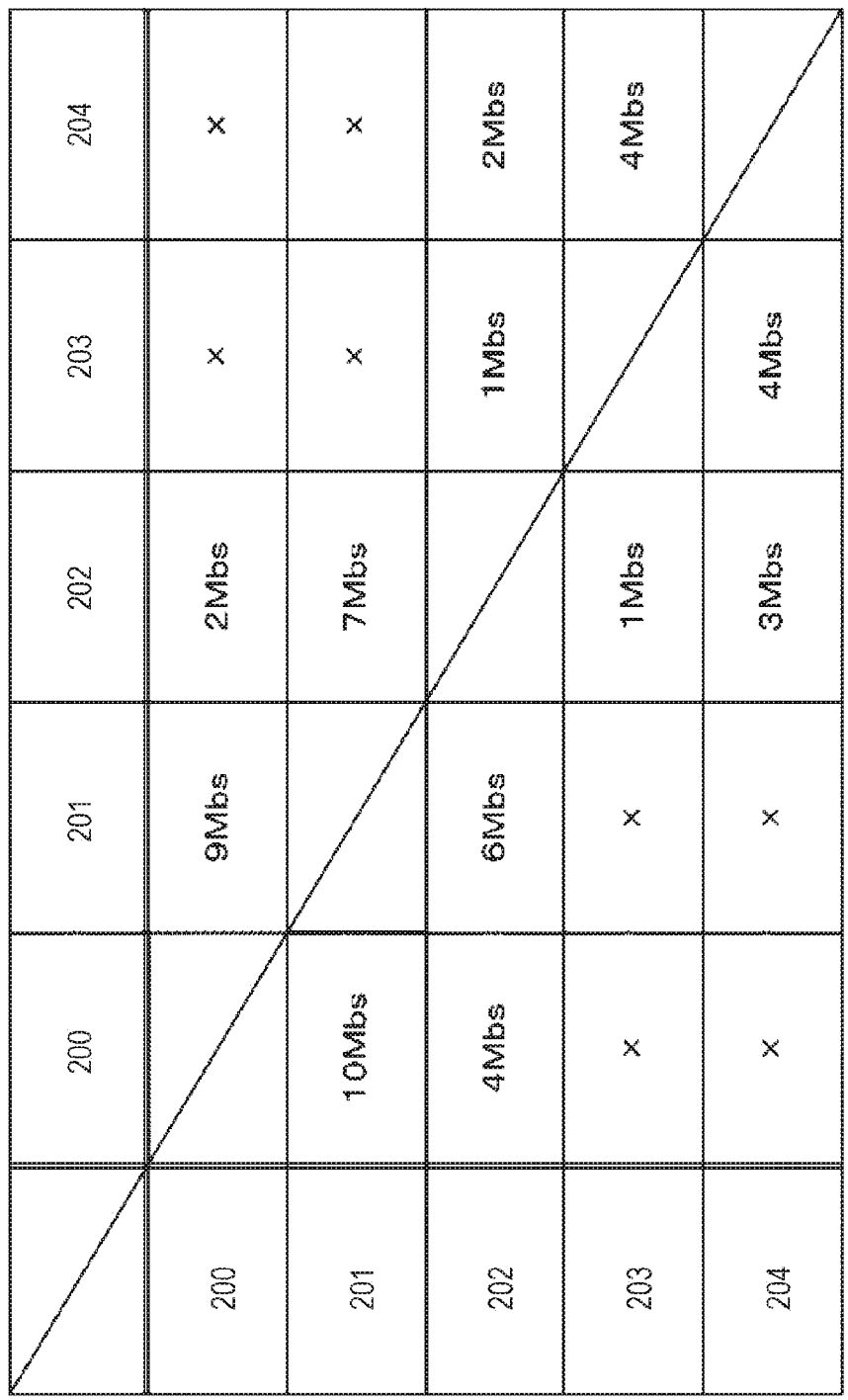
FIG. 3 is a table schematically illustrating a management table held by the information processing apparatus 100 in the first embodiment of the present technology.
Figure 5:
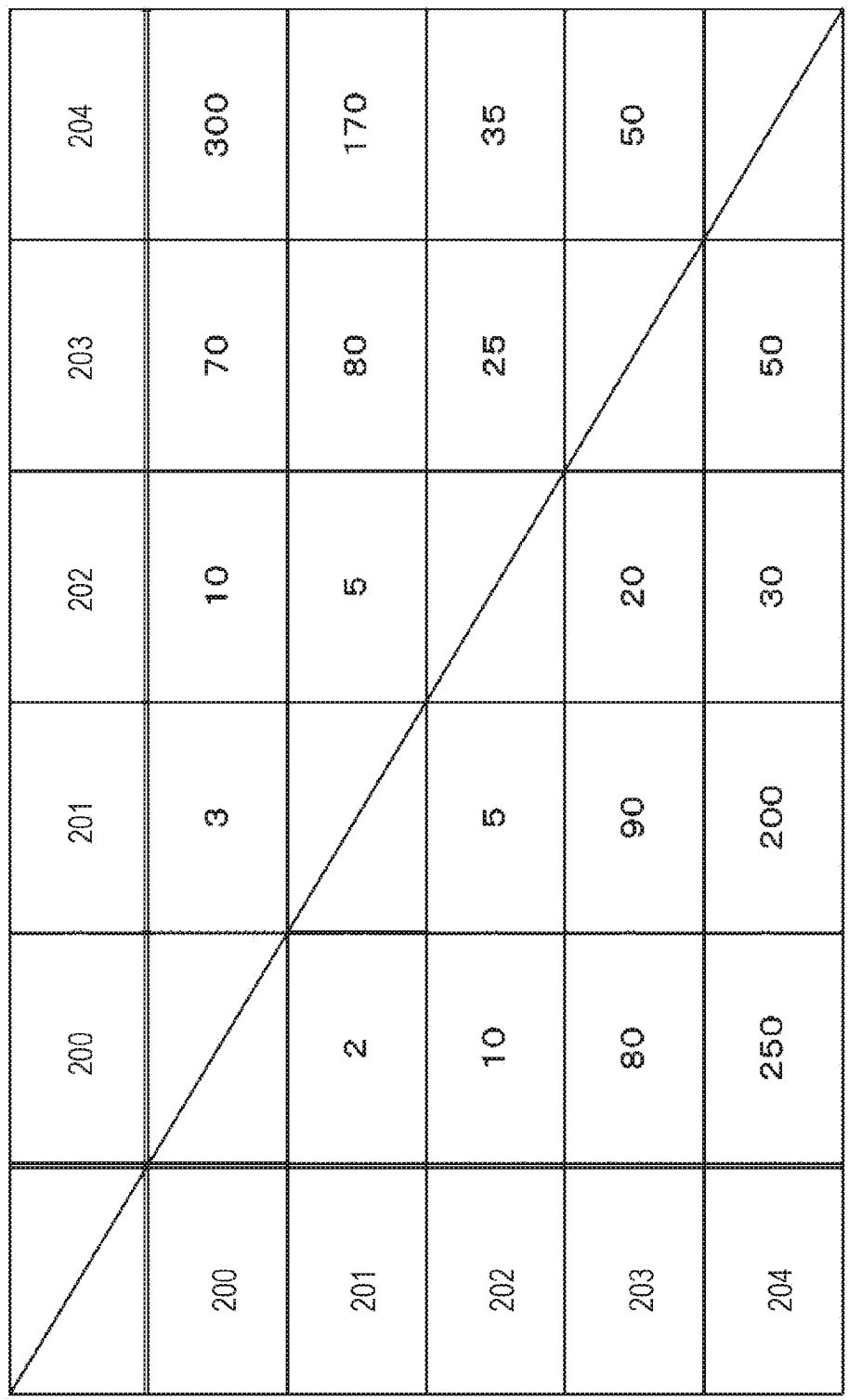
FIG. 5 is a table schematically illustrating a management table held by the information processing apparatus 100 in the first embodiment of the present technology.

Each of FIG. 3 to FIG. 5 is a table schematically illustrating a management table held by the information processing apparatus 100 in the first embodiment of the present technology.

In FIG. 3, a data rate management table 131 to manage a data rate as communication quality is illustrated. In FIG. 4, a hop count management table 132 to manage a hop count as communication quality is illustrated. In FIG. 5, a time deviation information management table 133 to manage time deviation as communication quality is illustrated. Each of these tables is stored in the storage unit 130 of the information processing apparatus 100. Also, each value therein is transmitted from each of the electronic devices 200 to 204 to the information processing apparatus 100.

Also, in each of FIG. 3 to FIG. 5, for convenience of a description, reference signs 200 to 204 are used as identification information indicating the electronic devices 200 to 204. Also, in each of FIG. 3 to FIG. 5, an example of a relationship between electronic devices in a case where an electronic device in each row is a source of transmission and an electronic device in each column is a destination is illustrated.

In the data rate management table 131, a data rate between the electronic devices 200 to 204 included in the communication system 10 is stored.

In the hop count management table 132, a hop count (number of transfers) between the electronic devices 200 to 204 included in the communication system 10 is stored. For example, "1" is stored as a hop count between electronic devices which can directly communicate with each other without a different electronic device therebetween. Also, for example, "2" is stored as a hop count between electronic devices which can indirectly communicate with each other through one electronic device.

By the hop count management table 132, it is easily understand which electronic device is to be used as a sound source, for example. Note that the sound source described herein means a source of distribution of content in a wireless environment. For example, an electronic device providing content may be used as a sound source. Also, in a case where an electronic device to provide content can be changed, it is possible to use, as the sound source, the electronic device which is the source of distribution.

In the time deviation information management table 133, arrival time deviation generated by data communication between the electronic devices 200 to 204 included in the communication system 10 is stored.

Note that the above communication quality is an example. Different communication quality (such as evaluation value (such as metric value)) may be measured and stored.

[Example of Configuration of Electronic Device]

Figure 6:
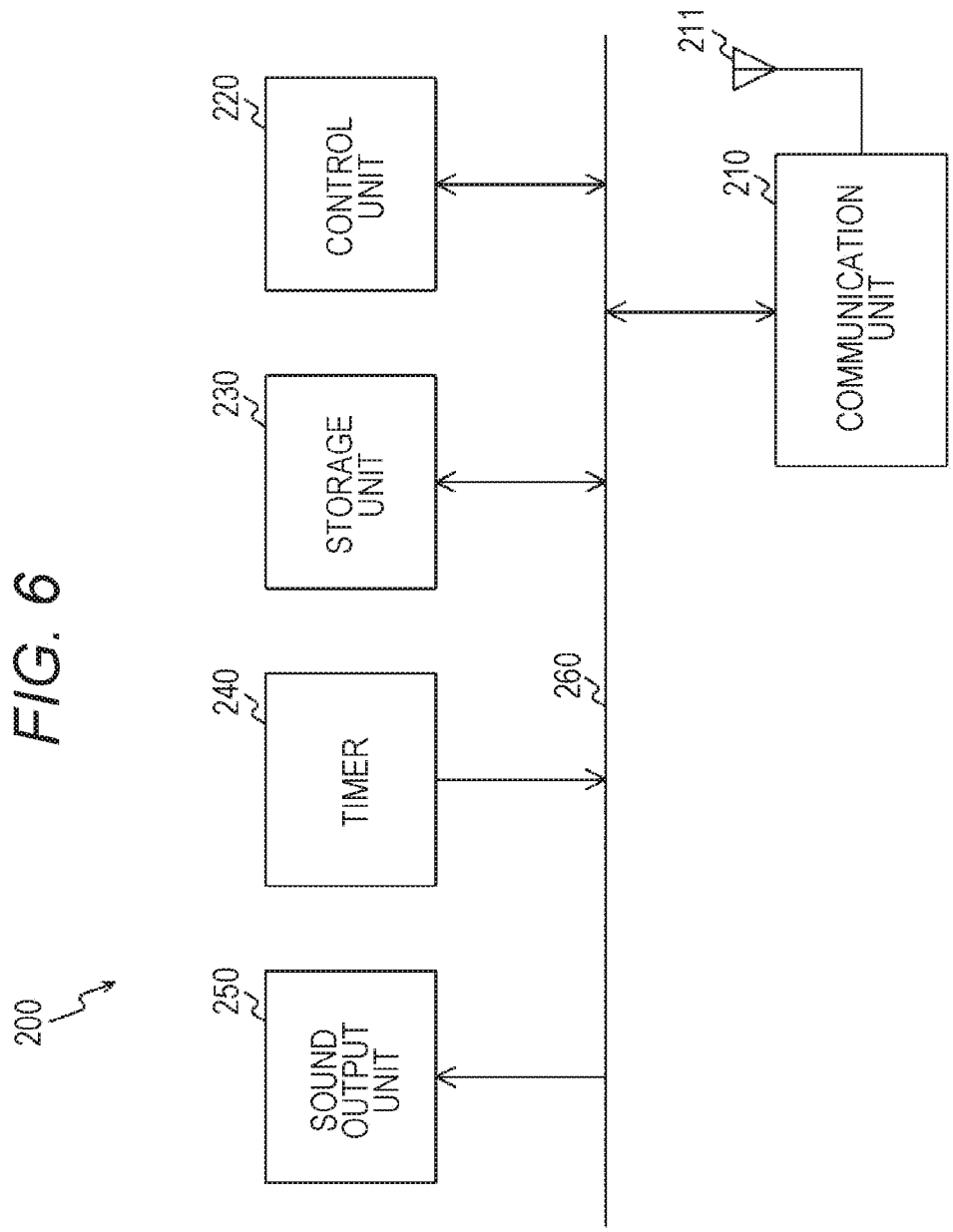
FIG. 6 is a block diagram illustrating an example of a functional configuration of an electronic device 200 in the first embodiment of the present technology.

FIG. 6 is a block diagram illustrating an example of a functional configuration of the electronic device 200 in the first embodiment of the present technology. Note that, a functional configuration of each of the electronic devices 201 to 204 is substantially identical to that of the electronic device 200. Thus, here, only the electronic device 200 will be described and a part of a description of the other devices will be omitted.

The electronic device 200 includes a communication unit 210, an antenna 211, a control unit 220, a storage unit 230, a timer 240, and a sound output unit 250. Also, these are connected to each other through a bus 260. Note that the communication unit 210, the antenna 211, the control unit 220, the storage unit 230, the timer 240, and the sound output unit 250 correspond to parts with the same name in the information processing apparatus 100 illustrated in FIG. 2. Thus, here, a part different from each part in the information processing apparatus 100 illustrated in FIG. 2 will be mainly described.

The storage unit 230 is a memory to store various kinds of information. For example, in the storage unit 230, various kinds of information (such as control program) necessary for the electronic device 200 to perform an intended operation are stored. Also, in the storage unit 230, for example, content (such as sound content or video content) output from the sound output unit 250 or a different electronic device is stored. Also, in the storage unit 230, the communication quality management table 231 illustrated in FIG. 7 is stored.

Also, two operation modes which are a reproduction mode and an adjustment mode can be set in the electronic device 200.

The reproduction mode is a mode (normal use mode) to perform reproduction (output from sound output unit 250) of content (content stored in storage unit 230 or content transmitted from different electronic device).

The adjustment mode is a mode (calibration mode) set in a case of adjusting an installation place of the electronic device 200 to an optimal place.

Each of these modes (reproduction mode and adjustment mode) can be set, for example, by using an operation member (such as switch or remote controller). For example, an operation member capable of switching the reproduction mode and the adjustment mode can be provided in a main body of the electronic device 200. In this case, the user 20 can switch modes physically.

Also, for example, the information processing apparatus 100 or a special terminal for control can be used as a remote controller. In this case, a mode switching signal is transmitted from the remote controller to the electronic device 200. Also, for example, it is possible to set the electronic devices 200 to 204 into the adjustment mode simultaneously by transmitting the mode switching signal to each of the electronic devices 200 to 204 from the remote controller.

Also, each mode (reproduction mode or adjustment mode) can be set based on control by a different device (such as control using control frame).

Here, when the adjustment mode is set, each of the electronic devices 200 to 204 measures communication quality related to data communication with a different electronic device. Then, each of the electronic devices 200 to 204 transmits the measurement result (communication quality) to the information processing apparatus 100. Here, as described above, the adjustment mode may be set based on an instruction from any of the electronic devices 200 to 204 or based on an instruction from the information processing apparatus 100. Here, a case where the adjustment mode is set in the electronic device 200 will be described as an example.

When the adjustment mode is set, the control unit 220 of the electronic device 200 periodically transmits, based on information from the timer 240, test data (test frame) stored in the storage unit 230 to the communication unit 210. For example, transmission can be performed by any of multicast, broadcast, and unicast. Note that the test data may not be data stored in the storage unit 230 and may be a random value generated and transmitted by the control unit 220. Also, for example, when the electronic device 200 is a speaker, test data including a feature of sound data can be used.

Also, a different electronic device also transmits a test frame in a similar manner. Thus, the electronic device 200 receives the test frame transmitted by the different electronic device. In such a manner, when the test frame from the different electronic device is received, the control unit 220 of the electronic device 200 measures communication quality with the different electronic device based on the test frame received in the communication unit 210. For example, the control unit 220 measures, as communication quality, a data rate, a received signal strength indicator (RSSI), a modulation and coding scheme (MCS), time deviation information, a hop count, or the like. Note that the time deviation information is information related to time from transmission from an electronic device, which is a transmission source of a test frame, until reception in the electronic device 200 (such as deviation time in transmission/reception time interval).

Also, the control unit 220 of the electronic device 200 records a measurement result based on the test frame received in the communication unit 210 (which result is communication quality with different electronic device) while associating the result with an electronic device which is the transmission source of the test frame. An example of the record is illustrated in FIG. 7.

[Example of Contents in Communication Quality Management Table]

FIG. 7 is a table schematically illustrating the communication quality management table 231 held by the electronic device 200 in the first embodiment of the present technology.

Note that in FIG. 7, for convenience of a description, reference signs 201 to 204 will be used as terminal identification information indicating the electronic devices 201 to 204. Note that as the terminal identification information, an ID (such as speaker 1 or speaker 2) in a system (in application), an MAC address, or the like can be used.

In the communication quality management table 231, a measurement result based on the test frame (communication quality with different electronic device) is stored while being associated with the electronic device which is the transmission source of the test frame. Note that in FIG. 7, an example in which a data rate, an RSSI, an MCS, a hop count, and time deviation information are stored as communication quality with a different electronic device is illustrated.

In such a manner, the control unit 220 of the electronic device 200 transmits communication quality, which is recorded in the communication quality management table 231, from the communication unit 210 to the information processing apparatus 100. In this case, all or a part of the communication quality recorded in the communication quality management table 231 can be transmitted to the information processing apparatus 100. Also, a different evaluation value may be calculated based on the communication quality recorded in the communication quality management table 231 and the evaluation value may be transmitted to the information processing apparatus 100. An example of a configuration of a reporting frame (report frame) used for transmission of the communication quality is illustrated in FIG. 8.

[Example of Configuration of Reporting Frame]

Figure 8:
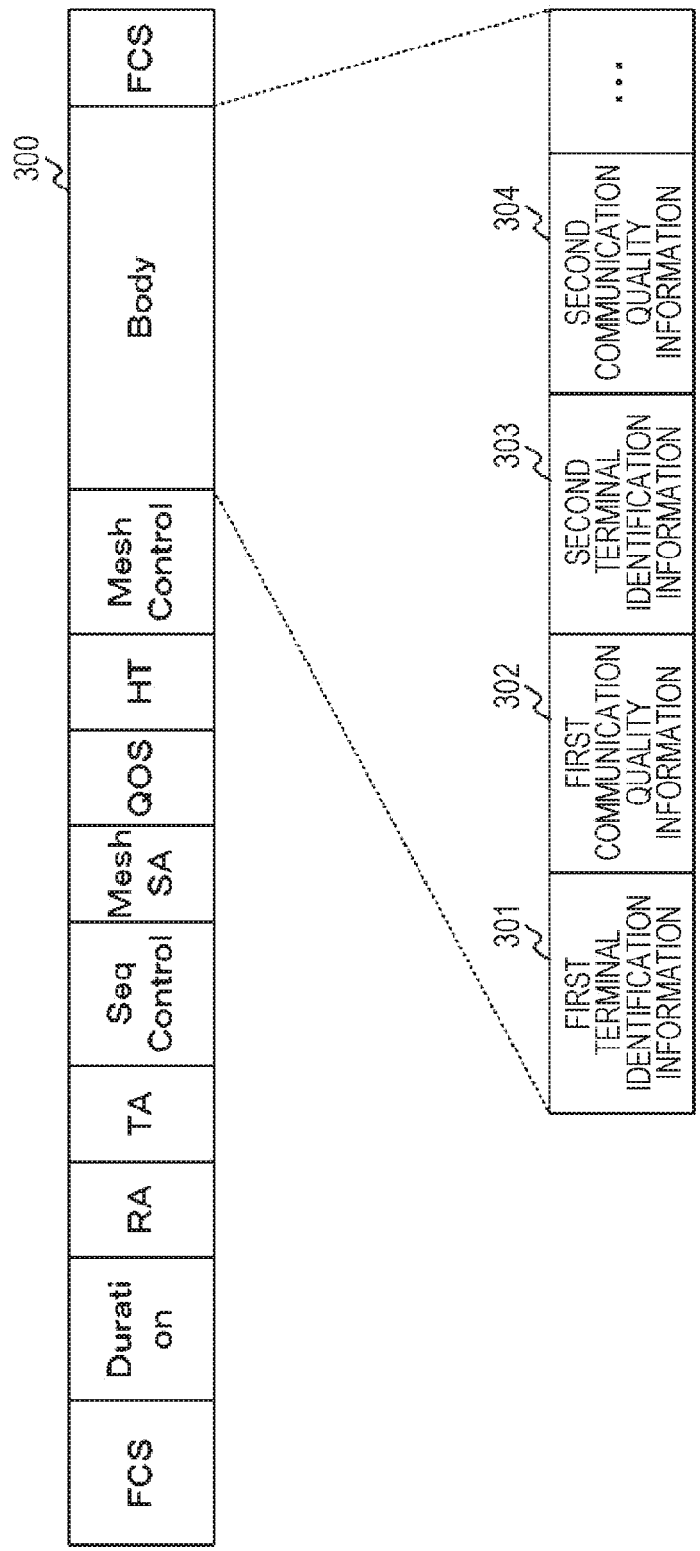
FIG. 8 is a view illustrating an example of a configuration of a reporting frame exchanged between devices included in the communication system 10 in the first embodiment of the present technology.

FIG. 8 is a view illustrating an example of a configuration of a reporting frame exchanged between devices included in the communication system 10 in the first embodiment of the present technology.

For example, in a Body field 300 in the reporting frame, communication quality information is recorded while being associated with an electronic device. For example, terminal identification information of the electronic device 201 is stored into a first terminal identification information field 301 in the Body field 300 and communication quality information related to the electronic device 201 is stored into a first communication quality information field 302. Similarly, terminal identification information of the electronic device 202 is stored into a second terminal identification information field 303 in the Body field 300 and communication quality information related to the electronic device 202 is stored into a second communication quality information field 304. Also, each piece of information related to the electronic devices 203 and 204 can be stored in a similar manner.

In such a manner, each of the electronic devices 200 to 204 stores communication quality, which is measured in the own device or in a different electronic device, into a reporting frame and performs transmission to the information processing apparatus 100. However, a case where the own device or a different electronic device is not able to receive a test frame and it is not possible to measure communication quality with respect to any of electronic devices is assumed. In such a case, a reporting frame indicating that it is not possible to receive a test frame and to measure communication quality may be notified to the information processing apparatus 100.

Here, when receiving a reporting frame, each of the electronic devices 200 to 204 transfers the frame to the information processing apparatus 100. Also, when the information processing apparatus 100 receives the reporting frame, communication quality information included in the reporting frame is stored into each of the tables (data rate management table 131, hop count management table 132, and time deviation information management table 133 respectively illustrated in FIG. 3 to FIG. 5). Then, based on the communication quality recorded in each table, the information processing apparatus 100 displays, onto the display unit 150, information related to communication quality between the electronic devices 200 to 204. In this case, the communication quality related to the electronic devices 200 to 204 is preferably displayed in a manner easily recognized by a user. An example of the display is illustrated in FIG. 10. Also, an example of registering a layout of a floor on a communication quality notification screen to display the communication quality between the electronic devices 200 to 204 in such a manner is illustrated in FIG. 8.

[Example of Generation of Layout on Communication Quality Notification Screen]

Figure 9:
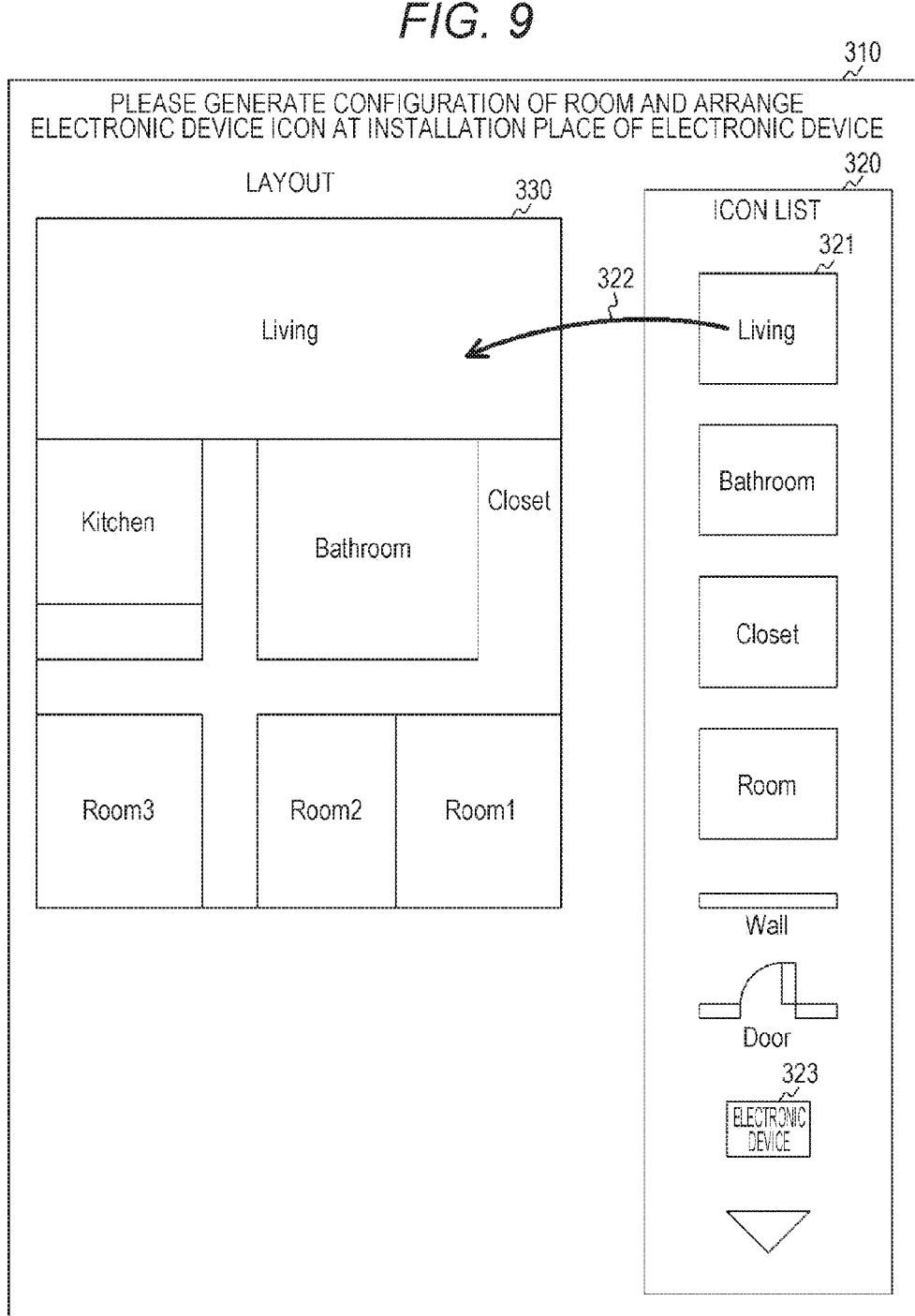
FIG. 9 is a view illustrating an example of a layout generation screen (layout generation screen 310) displayed on a display unit 150 in the first embodiment of the present technology.

FIG. 9 is a view illustrating an example of a layout generation screen (layout generation screen 310) displayed on the display unit 150 in the first embodiment of the present technology.

The layout generation screen 310 is a display screen used in a case of generating a layout of a communication quality notification screen (such as communication quality notification screen 340 illustrated in FIG. 10). Also, here, an example in which the display unit 150 and the operation reception unit 160 are configured by a touch panel is illustrated.

On the layout generation screen 310, an icon list display region 320 and a layout display region 330 are displayed.

In the icon list display region 320, a material in a case of generating a layout of a room (material included in room (such as living or bathroom)) or a material related to each device is displayed.

In the layout display region 330, a layout generated by a user is displayed. For example, the user selects the material displayed in the icon list display region 320 and displays the selected material in the layout display region 330.

For example, a living icon 321 is touched with a finger and the finger and moved to a predetermined position in the layout display region 330, as indicated by an arrow 322. Accordingly, a living region is formed in the layout display region 330. Also, a size or a shape of the living region can be arbitrarily changed by manual operation by the user (such as operation to decrease region or operation to increase region). Also, a different material can be generated in a similar manner. In FIG. 9, an example of a display in a case of generating a layout of a room illustrated in FIG. 1 is illustrated.

In such a manner, in the layout display region 330 in which each room is generated, an electronic device icon 323 is displayed at an installation place of each of the electronic devices 200 to 204. Also, in such a manner, in the layout display region 330 in which each room is generated, after an electronic device icon corresponding to each of the electronic devices 200 to 204 is arranged, the electronic devices 200 to 204 and the electronic device icons are associated with each other.

For example, when an electronic device icon arranged in the layout display region 330 is long-pressed (for example, for three second), an input region to input terminal identification information of an electronic device corresponding to the electronic device icon is displayed. Then, in the input region, it is possible to associate the electronic devices 200 to 204 with the electronic device icons by inputting terminal identification information of the electronic devices.

Also, for example, an electronic device icon arranged in the layout display region 330 is long-pushed (for example, for three seconds) and predetermined operation (such as pushing operation of predetermined button) is performed in an electronic device corresponding to the electronic device icon. By the predetermined operation, a control signal is transmitted from an electronic device corresponding to the electronic device icon to the information processing apparatus 100. Then, based on the control signal, it is possible to associate the electronic devices 200 to 204 with the electronic device icons.

In such a manner, a layout of a floor on the communication quality notification screen is generated and registered. Accordingly, a layout of the floor can be reused.

Note that in this example, an example of generating a layout of a single-story building (building with one floor) has been described. However, application to a case of generating a layout of a multi-story building (building with a plurality of floors) can be also performed. For example, in a case of generating a layout of a multi-story building (building with a plurality of floors), a layout display region is provided for each floor and the layout display regions are displayed in an array. Also, a layout displayed region of each floor may be displayed as a stereoscopic image. Accordingly, a hierarchical relationship in a building can be expressed.

[Example of Display on Communication Quality Notification Screen]

FIG. 10 is a view illustrating an example of a communication quality notification screen (communication quality notification screen 340) displayed on the display unit 150 in the first embodiment of the present technology.

The communication quality notification screen 340 is a display screen to notify, to a user, communication quality reported from the electronic devices 200 to 204 (communication quality measured by transmission/reception of test frame in adjustment mode). The communication quality notification screen 340 is displayed, for example, after the electronic devices 200 to 204 are set into the adjustment mode by user operation in the information processing apparatus 100.

For example, on the communication quality notification screen 340, a system state notification bar 341, an assist information region 342, and a device state notification region 343 are displayed. Note that in FIG. 10, for convenience of a description, a reference sign identical to each of the electronic devices 200 to 204 illustrated in FIG. 1 is assigned to an icon indicating each electronic device.

The system state notification bar 341 is a bar region to display a degree indicating whether data transmission from any electronic device to any electronic device can cause reproduction with no sound interruption in a hole system (which degree is state of whole system). Also, the assist information region 342 is a region displayed at a position indicating a degree. In the assist information region 342, contents to be improved (such as recommended information) are displayed in a balloon region. For example, an electronic device to which a data flow concentrates or an electronic device in which communication quality with a different electronic device is not high can be picked and information which prompts a user to move the electronic device can be displayed in the assist information region 342.

Here, it is preferable that a point to be improved is provided in such a manner that a path with each electronic device is increased. Thus, for example, based on positional information of an electronic device, the information processing apparatus 100 can pick an electronic device to which a data flow concentrates or an electronic device in which communication quality with a different electronic device is not high. For example, it can be recommended by the information processing apparatus 100 to move an electronic device (such as electronic device 202) around the center of a room. For example, in FIG. 10, a case where the electronic device 202 is picked as an electronic device to which a date flow concentrates or an electronic device in which communication quality with a different electronic device is not high is illustrated as an example.

In such a manner, for example, the information processing apparatus 100 can analyze each kind of communication quality and can provide, as recommended information, movement of an electronic device or changing of a direction thereof to a user (for example, by displaying in assist information region 342).

Note that in the system state notification bar 341, for example, it is indicated that a state becomes better on a left side and improvement becomes necessary on a right side. Note that a display method of the system state notification bar 341 illustrated in FIG. 10 is an example and not the limitation. For example, a state of a whole system may be displayed in a different display mode (such as display by circular sign or display by character or mark).

In the device state notification region 343, a layout of a room, which is registered by using the layout generation screen 310, and communication quality between electronic devices are displayed. The communication quality can be displayed, for example, based on each table stored in the storage unit 130 (such as each of tables respectively illustrated in FIG. 3 to FIG. 5). Also, communication quality to be displayed is, for example, a reception data rate, an RSSI, a hop count from a source device (electronic device which provides content), time deviation information, or a value indicating communication quality converted based on these. Note that in FIG. 10, an example of displaying a reception data rate as communication quality is illustrated.

Also, for example, communication quality between electronic devices is schematically indicated by a sign (such as arrow) in such a manner that the communication quality between the electronic devices is easily recognized. In FIG. 10, an arrow between electronic devices with high communication quality is indicated by a solid thick line. Also, an arrow between electronic devices with not-high communication quality in which devices communication can be performed is indicated by a dotted thick line. An arrow between electronic devices with low communication quality is indicated by a dotted thin line.

Note that a sign (such as arrow) indicating communication quality between electronic devices can be displayed only between electronic devices in which a path is established. Also, a sign (such as arrow) indicating communication quality between electronic devices can be displayed, for example, by performing threshold determination. For example, in a case where reception data rate is equal to or higher than 5 Mbs, a sign indicating that communication quality is high (arrow indicated by solid thick line) is displayed. Also, for example, in a case where a reception data rate is lower than 1 Mbs, a sign indicating that communication quality is low (arrow indicated by dotted narrow line) is displayed.

Also, a sign indicating communication quality between electronic devices may be displayed in a different display mode. For example, an arrow indicating, in different colors, whether communication quality is high or low may be displayed. Also, for example, whether communication quality is high or low may be displayed in different icons.

Also, communication quality of the electronic devices 200 to 204 is periodically reported to the information processing apparatus 100. Thus, when receiving a reporting frame from each of the electronic devices 200 to 204, the information processing apparatus 100 preferably performs an update to the latest value and performs a display based on the received reporting frame.

As illustrated in FIG. 10, in an arrangement of the electronic devices 200 to 204 which arrangement is illustrated in FIG. 1, there are only a few good paths between the electronic device 202 and the other electronic devices. Thus, it can be understood that the arrangement is preferably changed.

In such a manner, the user can see the communication quality notification screen 340 and can move the electronic device 202 with low communication quality to a different place. Then, by checking the communication quality notification screen 340 again after the electronic device 202 is moved, a place in a room to which place the electronic device 202 is moved and at which place system performance is improved can be easily checked.

In such a manner, when there is an electronic device with low communication quality as a system in a mesh network, it is possible to move the electronic device to a place where communication quality as a system is improved. That is, it is possible to arrange each electronic device to a place intended by a user. In this case, by setting the adjustment mode in each electronic device, the user can adjust an installation place of each electronic device while looking at the information processing apparatus 100 at hand.

In such a manner, the control unit 120 of the information processing apparatus 100 can display the communication quality notification screen 340 onto the display unit 150. On the communication quality notification screen 340, a spatial image indicating a space in which the electronic devices 200 to 204 are installed and a device image indicating a position in the space at which position each of the electronic devices 200 to 204 is installed can be also displayed. Also, the control unit 120 can display communication quality related to the electronic devices 200 to 204 while associating the quality with these devices.

Also, the control unit 120 can display, onto the display unit 150, adjustment information (such as assist information region 342) suggesting a position and a direction of an antenna of each of the electronic devices 200 to 204 for improvement of communication quality in the mesh network. Also, based on the acquired communication quality, the control unit 120 can display a state image indicating a state of the communication quality in the mesh network (which image is, for example, system state notification bar 341 or assist information region 342) onto the display unit 150.

Note that as communication quality, for example, communication quality between the electronic devices 200 to 204 which quality is measured by the electronic devices 200 to 204 or communication quality between the information processing apparatus 100 and each of the electronic devices 200 to 204 can be displayed.

[Example of Setting of Adjustment Mode]

Next, an example of a case of adjusting an installation place of each of the electronic devices 200 to 204 will be described.

First, the user 20 installs the electronic devices 200 to 204 at arbitrary positions and activates the electronic devices 200 to 204. In this case, initial setting (such as setting operation of ID or password) for configuration of a mesh network is performed manually or automatically by the electronic devices 200 to 204. Note that in a case where the electronic devices 200 to 204 are set devices (such as set speakers), it is possible to configure a mesh network automatically by the initial setting (ID or password).

In such a manner, a mesh network (such as set speaker network) is configured by the electronic devices 200 to 204. Subsequently, the user 20 makes the information processing apparatus 100 participate in the mesh network. For example, initial setting (such as setting operation of ID or password) for participation in the mesh network is performed manually or automatically.

Then, the user 20 uses the information processing apparatus 100 and generates a layout of a room and an arrangement layout of the electronic devices 200 to 204. For example, by using the layout generation screen illustrated in FIG. 9, a layout of a room and an arrangement layout of the electronic devices 200 to 204 are generated.

Then, the user 20 sets the adjustment mode in each of the electronic devices 200 to 204. An example of communication of when the adjustment mode is set in each of the electronic devices 200 to 204 (example of measurement of communication quality and example of report of measurement result) is illustrated in FIG. 11.

[Example of Communication]

Figure 11:
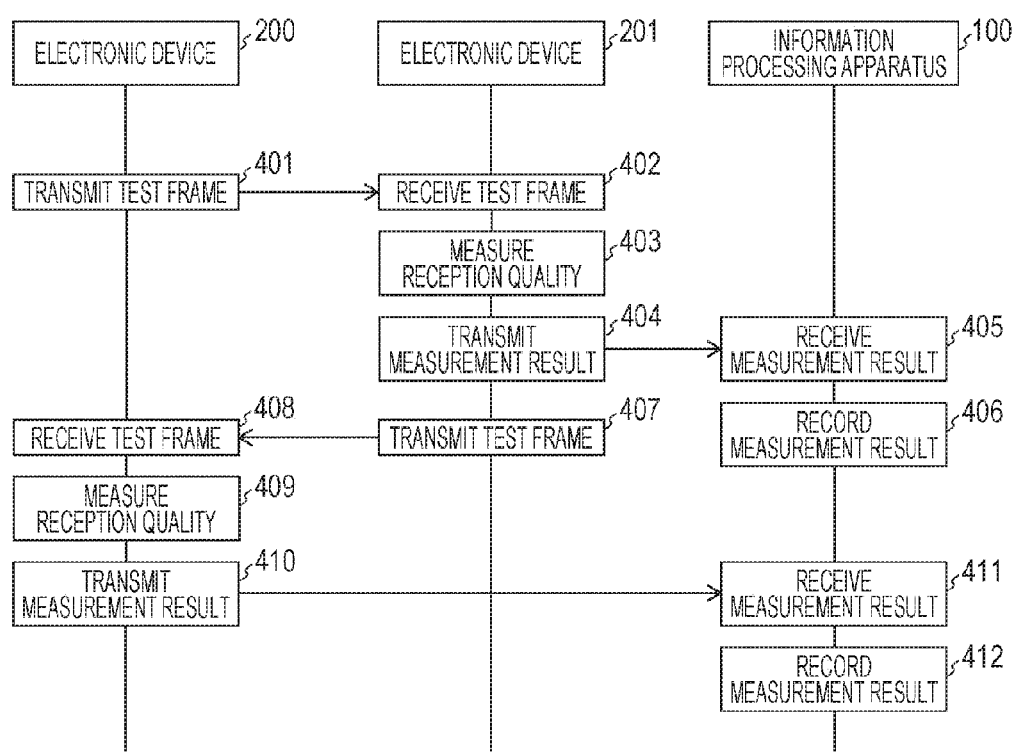
FIG. 11 is a sequence chart illustrating an example of communication processing between the devices included in the communication system 10 in the first embodiment of the present technology.

FIG. 11 is a sequence chart illustrating an example of communication processing between the devices included in the communication system 10 in the first embodiment of the present technology. Note that in FIG. 11, only the electronic devices 200 and 201 among the electronic devices 200 to 204 are illustrated and illustration of the other electronic devices is omitted.

When the adjustment mode is set, each of the electronic devices 200 to 204 transmits a test frame to an electronic device in a periphery (401 and 407). For example, each of the electronic devices 200 to 204 can periodically transmit a test frame in a broadcast, unicast, or multicast frame. Note that in FIG. 11, an example in which a test frame is transmitted by each electronic device at different timing is illustrated.

Also, each of the electronic devices 200 to 204 receives the test frame transmitted from the electronic device in the periphery (402 and 408). Then, based on the received test frame, each of the electronic devices 200 to 204 measures communication quality (such as RSSI or actually-transmitted data rate) (403 and 409).

Then, each of the electronic devices 200 to 204 reports the measurement result to the information processing apparatus 100 (404, 405, 410, and 411). For example, communication quality information related to each electronic device is included in the reporting frame illustrated in FIG. 8 when transmitted. Thus, the measurement result can be reported to the information processing apparatus 100. Also, for example, each of the electronic devices 200 to 204 can periodically report the measurement result to the information processing apparatus 100. In such a manner, by giving a report periodically, the information processing apparatus 100 can periodically receive communication quality in a calibration period (while adjustment mode is set).

Also, the information processing apparatus 100 which receives the measurement result from each of the electronic devices 200 to 204 records the measurement result (406 and 412). For example, recording into each of the tables respectively illustrated in FIG. 3 to FIG. 5 is performed.

Note that a report may be given to the information processing apparatus 100 each time a test frame is received. Also, a value in which a measurement result in a certain period of time is corrected (or calculated value (such as averaged value)) may be reported periodically or irregularly.

[Example of Operation of Electronic Device]

Figure 12:
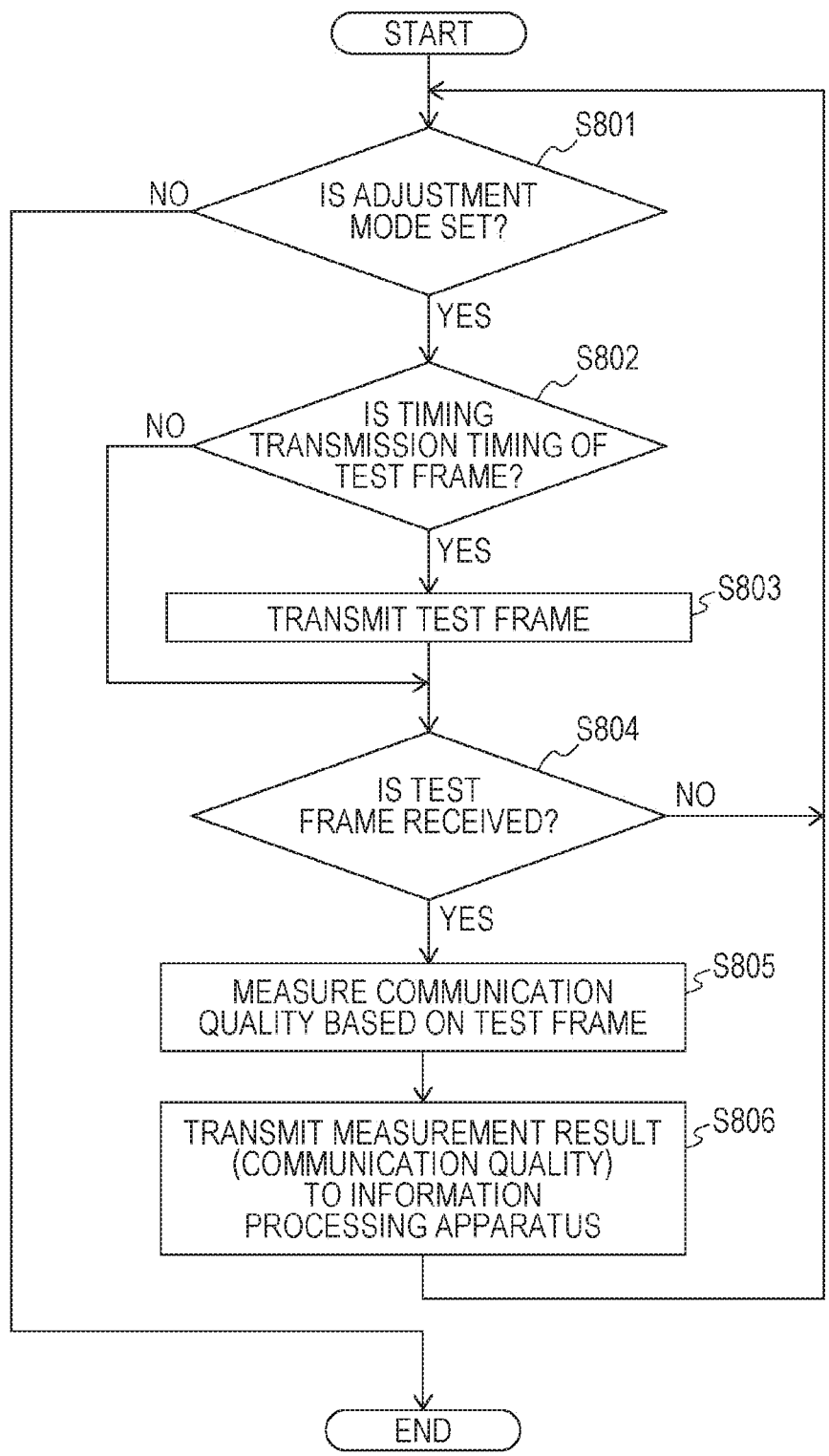
FIG. 12 is a flowchart illustrating an example of a processing procedure of communication quality measurement processing performed by the electronic device 200 in the first embodiment of the present technology.

FIG. 12 is a flowchart illustrating an example of a processing procedure of communication quality measurement processing performed by the electronic device 200 in the first embodiment of the present technology. Note that an example of an operation of each of the electronic devices 201 to 204 is similar to that of the electronic device 200. Thus, here, only a description of the electronic device 200 is made and a description of each of the electronic devices 201 to 204 is omitted.

First, the control unit 220 of the electronic device 200 determines whether the adjustment mode is set (step S801).

When the adjustment mode is not set (that is, when reproduction mode is set) (step S801), an operation in the communication quality measurement processing is ended.

When the adjustment mode is set (step S801), the control unit 220 determines whether timing is transmission timing of a test frame based on information from the timer 240 (step S802). In a case of the transmission timing of a test frame (step S802), the control unit 220 makes the communication unit 210 transmit the test frame (step S803).

When the timing is not the transmission timing of a test frame (step S802), the control unit 220 determines whether a test frame is received from a different electronic device (step S804). When no test frame is received from the different electronic device (step S804), the processing goes back to step S801.

When the test frame is received from the different electronic device (step S804), the control unit 220 measures communication quality related to the electronic device which transmits the test frame (step S805). Subsequently, the control unit 220 transmits the measurement result (communication quality) to the information processing apparatus 100 (step S806). Note that whichever of transmission processing and reception processing of a test frame may be performed first. Also, when it is possible to perform the transmission processing and reception processing of a test frame simultaneously, the processing can be performed simultaneously.

[Example of Operation of Information Processing Apparatus]

Figure 13:
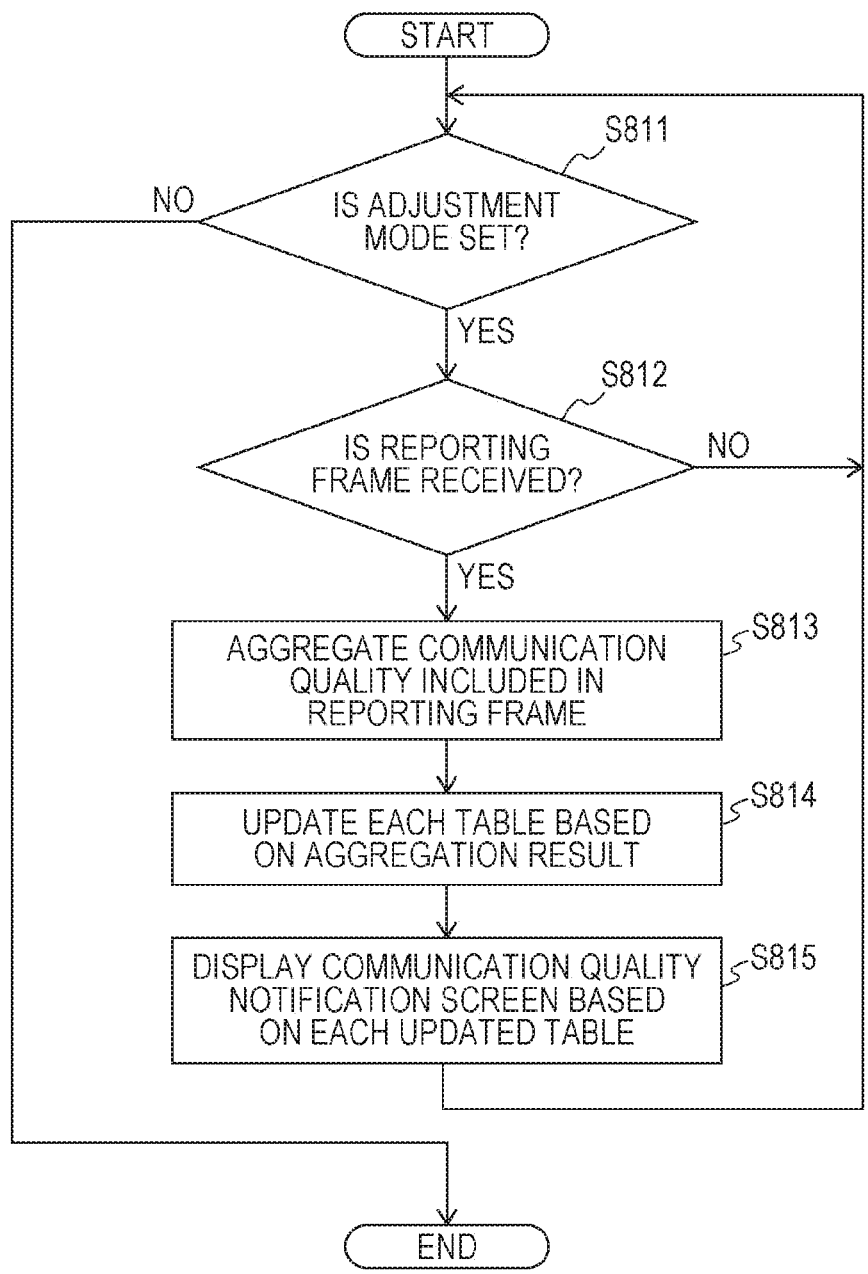
FIG. 13 is a flowchart illustrating an example of a processing procedure of communication quality notification processing performed by the information processing apparatus 100 in the first embodiment of the present technology.

FIG. 13 is a flowchart illustrating an example of a processing procedure of communication quality notification processing performed by the information processing apparatus 100 in the first embodiment of the present technology.

First, the control unit 120 of the information processing apparatus 100 determines whether the adjustment mode is set (step S811). When the adjustment mode is not set (step S811), an operation in the communication quality notification processing is ended.

When the adjustment mode is set (step S811), the control unit 120 determines whether a reporting frame is received from the electronic device (step S812). When no reporting frame is received from the electronic device (step S812), the processing goes back to step S811.

When the reporting frame is received from the electronic device (step S812), the control unit 120 performs aggregation processing of communication quality information included in the reporting frame (step S813). Then, the control unit 120 updates contents in each table based on the aggregation result (step S814).

Subsequently, the control unit 120 displays communication quality notification screen onto the display unit 150 based on the updated contents in each table (step S815). For example, as illustrated in FIG. 10, the communication quality notification screen 340 is displayed.

2. Second Embodiment

In the first embodiment of the present technology, an example in which the electronic device measures communication quality and gives notification to the information processing apparatus has been described.

For example, a case of outputting high quality data (such as high-resolution audio source) in an environment illustrated in FIG. 1 is assumed. In this case, since communication quality is not enough, the user 20 may purchase a new electronic device (such as speaker) other than the electronic devices 200 to 204.

In such a case, it is considered that it becomes easy to purchase a new electronic device in a case where it is possible to simulate how communication quality is improved when the new electronic device participates in the mesh network. Then, in the second embodiment of the present technology, an example in which an information processing apparatus measures and acquires communication quality instead of a new electronic device will be described. That is, an information processing apparatus 100 to which each of electronic devices 200 to 204 reports reception quality is assumed as one electronic device. Then, an example of a case of simulating how communication quality as a system turns out when a new electronic device is added to a mesh network including the electronic devices 200 to 204 will be described.

Note that a configuration of each apparatus in the second embodiment of the present technology is substantially identical to the information processing apparatus 100 and the electronic devices 200 to 204 which are illustrated, for example, in FIG. 1, FIG. 2, and FIG. 6. Thus, to a part identical to that in the first embodiment of the present technology, a reference sign identical to that of the first embodiment of the present technology is assigned and a part of a description thereof is omitted.

[Example of Communication]

Figure 14:
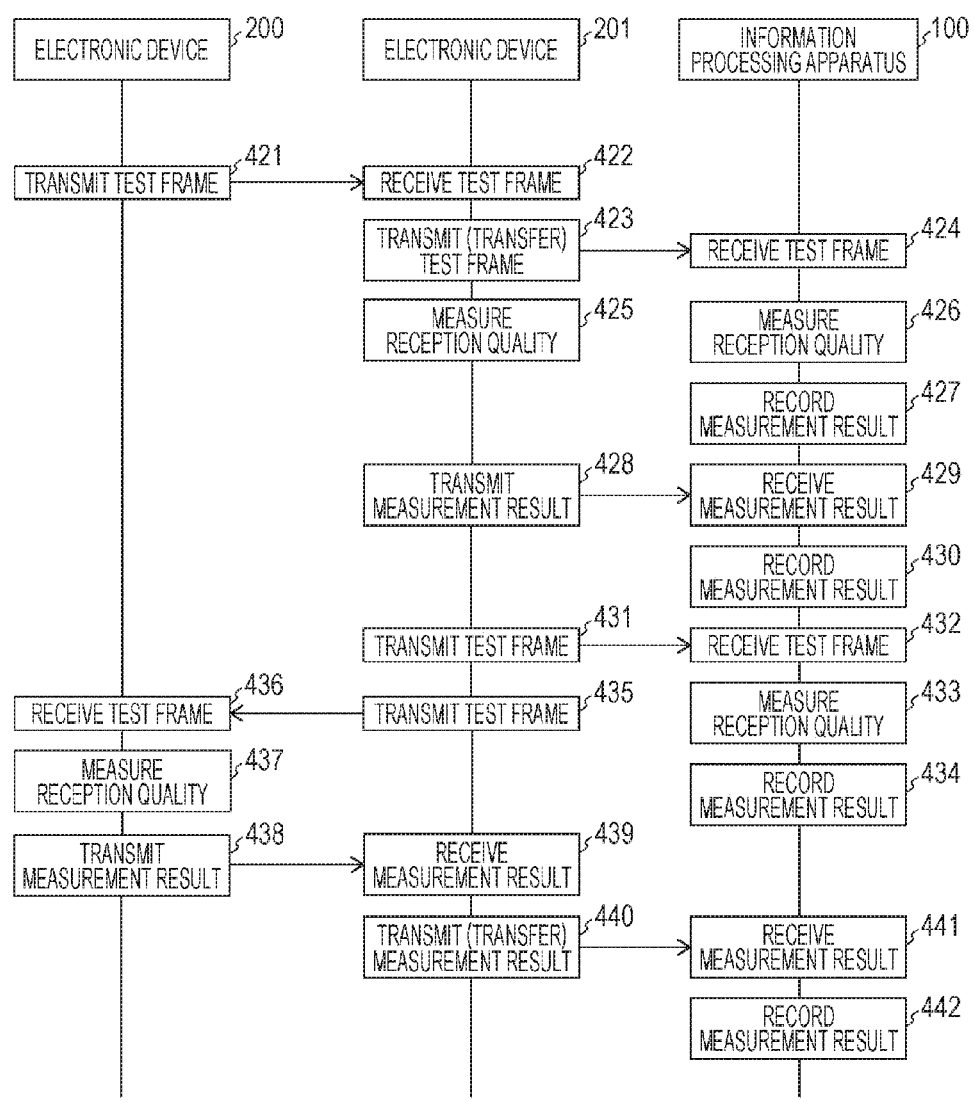
FIG. 14 is a sequence chart illustrating an example of communication processing between devices included in a communication system 10 in a second embodiment of the present technology.

FIG. 14 is a sequence chart illustrating an example of communication processing between devices included in a communication system 10 in the second embodiment of the present technology. Note that in FIG. 14, only the electronic devices 200 and 201 among the electronic devices 200 to 204 are illustrated and illustration of the other electronic devices are omitted.

Also, in FIG. 14, the following example is illustrated. That is, the information processing apparatus 100 does not transmit a test frame. The information processing apparatus 100 measures reception quality based on a test frame from each of the electronic devices 200 to 204 and acquires communication quality between the information processing apparatus 100 and the electronic devices 200 to 204.

Note that FIG. 14 is a modification example of FIG. 11. Thus, a description of a part identical to FIG. 11 will be omitted.

Similarly to FIG. 11, when the adjustment mode is set, each of the electronic devices 200 to 204 transmits a test frame to an electronic device in a periphery (421, 431, and 435). However, in FIG. 14, the information processing apparatus 100 measures communication quality. Thus, the electronic device 201 which receives the test frame transfers the test frame to the information processing apparatus 100 (422 to 424).

Also, the information processing apparatus 100 receives a test frame transmitted from the electronic device in the periphery (424 and 432). Then, the information processing apparatus 100 measures communication quality (such as RSSI or actually transmitted data rate) based on the received test frame (426 and 433).

Subsequently, the information processing apparatus 100 records the measurement result (427 and 434). In such a manner, the information processing apparatus 100 held by a user 20 can be assumed as an electronic device and can participate in the mesh network. In this case, communication quality related to a position where the information processing apparatus 100 exists can be measured. Accordingly, similarly to the electronic devices 200 to 204, the communication quality related to the information processing apparatus 100 can be displayed on a communication quality notification screen.

[Example of Communication of when the Information Processing Apparatus Transmits Test Frame]

In FIG. 14, an example in which the information processing apparatus 100 transmits no test frame and acquires communication quality between the information processing apparatus 100 and the electronic devices 200 to 204 has been illustrated. However, the information processing apparatus 100 may transmit a test frame. Thus, in FIG. 15, an example in which the information processing apparatus 100 transmits a test frame is illustrated.

Figure 15:
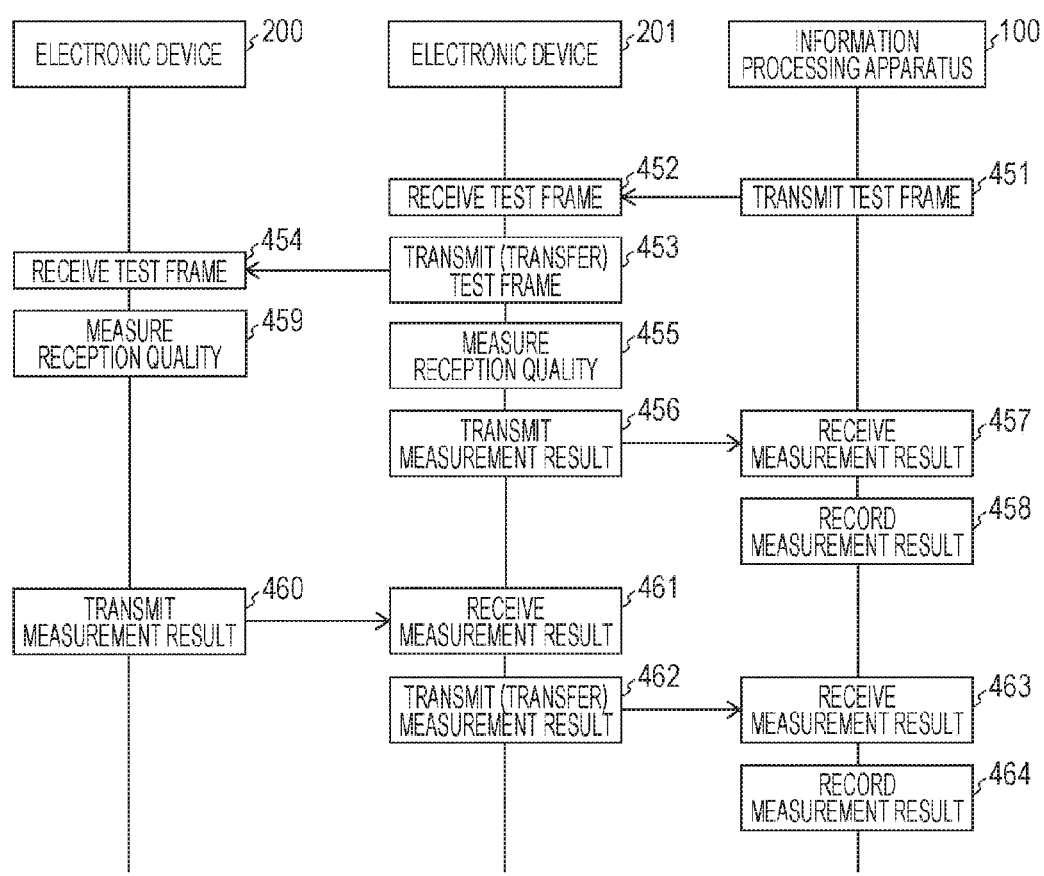
FIG. 15 is a sequence chart illustrating an example of communication processing between the devices included in the communication system 10 in the second embodiment of the present technology.

FIG. 15 is a sequence chart illustrating an example of communication processing between the devices included in the communication system 10 in the second embodiment of the present technology. Note that in FIG. 15, only the electronic devices 200 and 201 among the electronic devices 200 to 204 are illustrated and illustration of the other electronic devices is omitted.

Note that communication processing illustrated in FIG. 15 may be performed, for example, after the communication processing illustrated in FIG. 14. Also, FIG. 15 is a modification example of FIG. 11. Thus, a description of a part identical to FIG. 11 will be omitted.

When an adjustment mode is set, the information processing apparatus 100 transmits a test frame to an electronic device in a periphery (451). Also, the electronic device 201 which receives the test frame transfers the test frame to the electronic device 200 (452 to 454).

Also, each of the electronic devices 200 and 201 receives the test frame transmitted from the electronic device in the periphery and the information processing apparatus 100 (452 and 454). Then, based on the received test frame, each of the electronic devices 200 and 201 measures communication quality (such as RSSI or actually-transmitted data rate) (455 and 459).

Then, each of the electronic devices 200 and 201 reports the measurement result to the information processing apparatus 100 (456, 457, and 460 to 463). Subsequently, the information processing apparatus 100 records the measurement result (458 and 464).

[Example of Display on Communication Quality Notification Screen]

Figure 16:
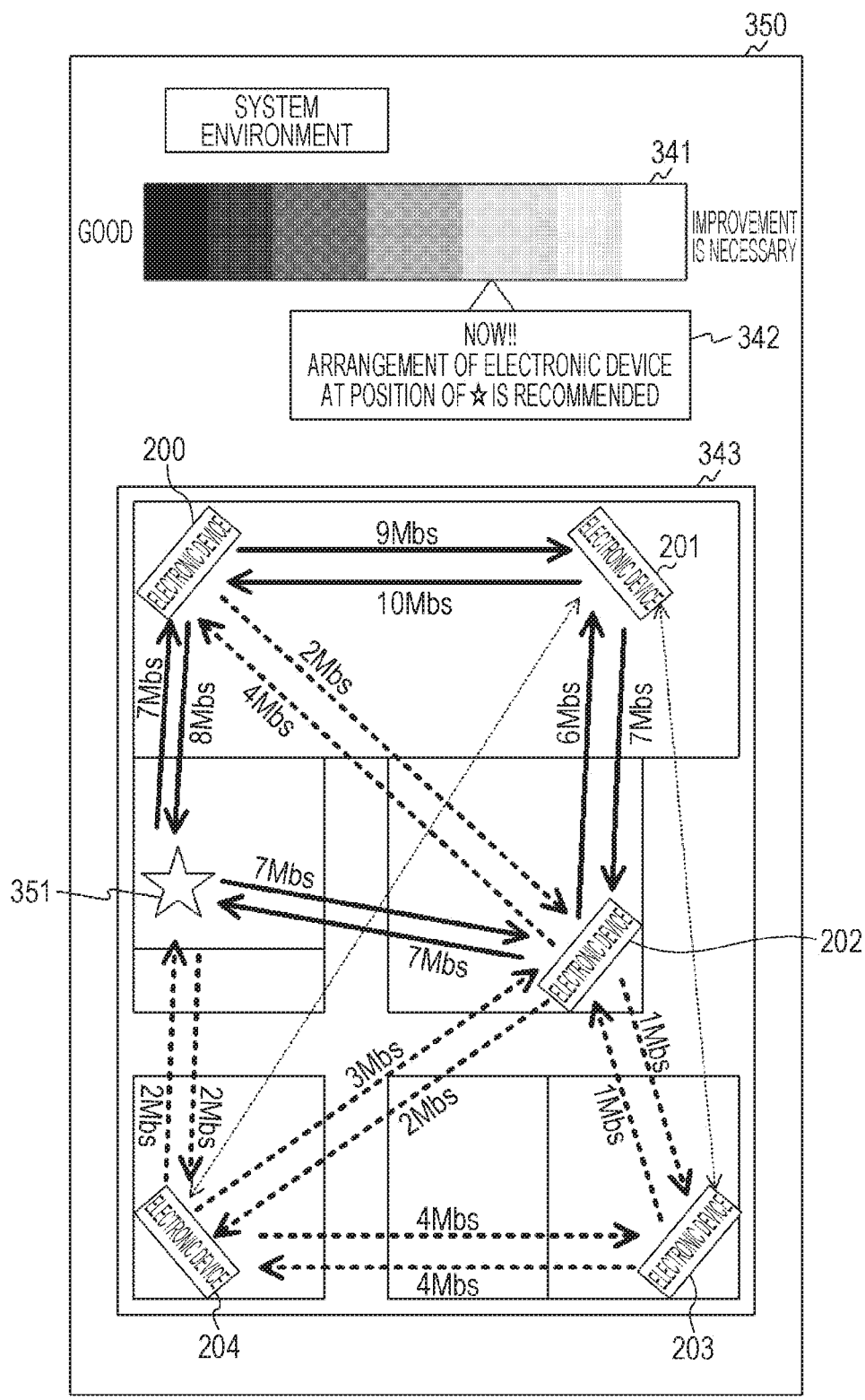
FIG. 16 is a view illustrating an example of a communication quality notification screen (communication quality notification screen 350) displayed on a display unit 150 in the second embodiment of the present technology.

FIG. 16 is a view illustrating an example of a communication quality notification screen (communication quality notification screen 350) displayed on a display unit 150 in the second embodiment of the present technology.

The communication quality notification screen 350 is a modification example of the communication quality notification screen 340 illustrated in FIG. 10 and is different from the communication quality notification screen 340 at a point that an icon 351 indicating the information processing apparatus 100 is added and that communication quality related to the information processing apparatus 100 is additionally displayed. Note that the other points are identical to the communication quality notification screen 340. Thus, to the parts identical to the communication quality notification screen 340, reference signs identical to those of the communication quality notification screen 340 are assigned.

As illustrated in FIG. 16, communication quality (communication quality with electronic devices 200 to 204) at a position where the information processing apparatus 100 held by the user 20 exists can be easily checked. Accordingly, by moving the information processing apparatus 100 while looking at the communication quality notification screen 350, the user 20 can easily check a place in a room to which place a new electronic device is moved and at which place system performance is improved.

In such a manner, a control unit 120 of the information processing apparatus 100 can display the communication quality notification screen 350 onto the display unit 150. On the communication quality notification screen 350, an apparatus image indicating a position where the information processing apparatus 100 exists in a space in which the electronic devices 200 to 204 are installed can be displayed. Also, on the communication quality notification screen 350, communication quality related to the information processing apparatus 100 and the electronic devices 200 to 204 can be displayed while being associated with each device.

[Example of Operation of Information Processing Apparatus]

Figure 17:
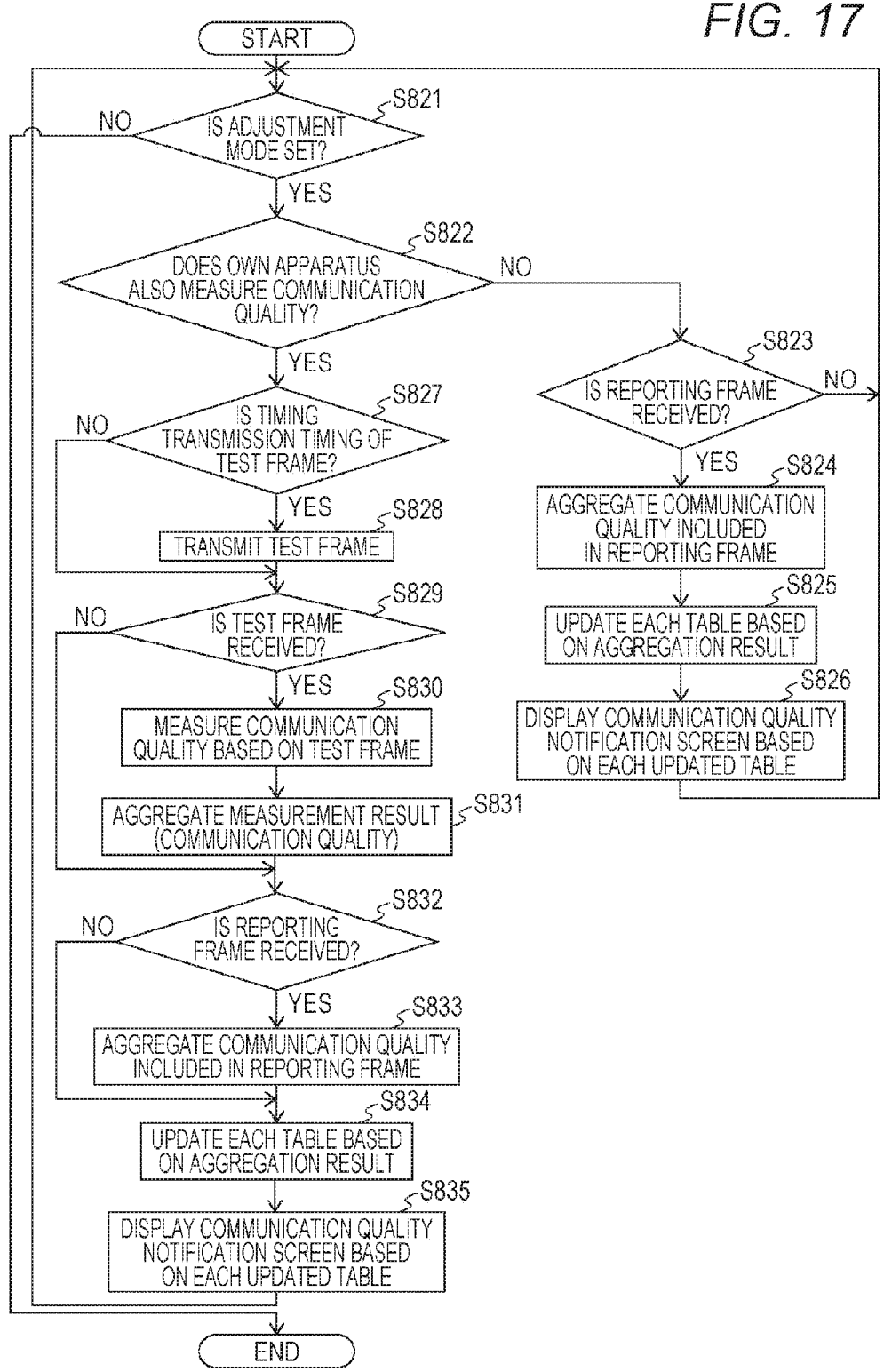
FIG. 17 is a flowchart illustrating an example of a processing procedure of communication quality notification processing performed by an information processing apparatus 100 in the second embodiment of the present technology.

FIG. 17 is a flowchart illustrating an example of a processing procedure of communication quality notification processing performed by the information processing apparatus 100 in the second embodiment of the present technology. An example of an operation illustrated in FIG. 17 is partially identical to those in FIG. 12 and FIG. 13. That is, the processing procedure illustrated in FIG. 17 (steps S821, S823 to S826, and S832 to S835) corresponds to the processing procedure illustrated in FIG. 13 (steps S812 to S815). Also, the processing procedure illustrated in FIG. 17 (steps S827 to S830) corresponds to the processing procedure illustrated in FIG. 12 (steps S802 to S805). Thus, a description thereof is omitted.

When the adjustment mode is set (step S821), the control unit 120 of the information processing apparatus 100 determines whether the own apparatus is set to measure communication quality (step S822). In a case where the own apparatus is also set to measure communication quality (step S822), the processing goes to step S827. In a case where the own apparatus is not set to measure the communication quality (step S822), the processing goes to step S823.

Also, the control unit 120 of the information processing apparatus 100 aggregates and records the measurement result (communication quality) which is measured by the own apparatus (step S831).

3. Third Embodiment

In each of the first and second embodiments of the present technology, an example of notifying communication quality related to a fixed electronic device has been described.

Here, an electronic device which is movable (for example, which moves or rotates) autonomously or according to user operation (which device is, for example, self-propelled vacuum cleaner, a self-propelled speaker, or robot) can be considered. In a case of performing adjustment for installation of such a mobile electronic device, it is possible to measure communication quality and to set an optimal environment while moving the electronic device. Thus, an example of adjustment method in a case of installing a mobile electronic device will be described in the third embodiment of the present technology.

Note that a configuration of each apparatus in the third embodiment of the present technology is substantially identical to the information processing apparatus 100 and the electronic devices 200 to 204 which are illustrated, for example, in FIG. 1, FIG. 2, and FIG. 6. Thus, to a part identical to that in the first embodiment of the present technology, a reference sign identical to that of the first embodiment of the present technology is assigned and a part of a description thereof is omitted.

[Example of Display of Communication Quality Notification Screen Related to Mobile Electronic Device]

Figure 18:
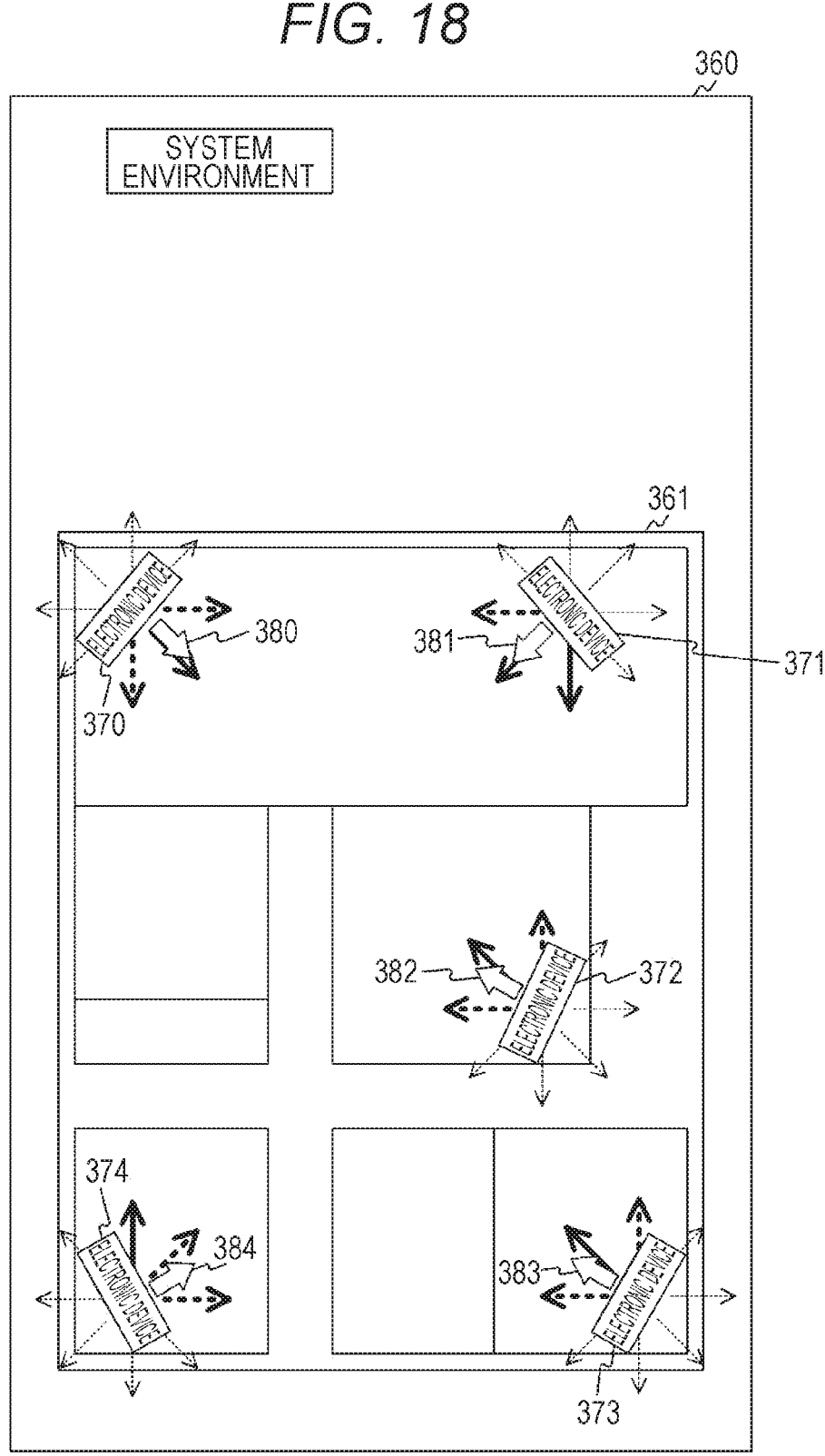
FIG. 18 is a view illustrating an example of a communication quality notification screen (communication quality notification screen 360) displayed on a display unit 150 in a third embodiment of the present technology.

FIG. 18 is a view illustrating an example of a communication quality notification screen (communication quality notification screen 360) displayed on a display unit 150 in the third embodiment of the present technology. In this example, a description will be made on the assumption that each of electronic devices 200 to 204 is a mobile electronic device which can rotate the own device autonomously or according to control (such as remote control) from the information processing apparatus 100. In such a manner, since each of the electronic devices 200 to 204 rotates the own device, it is possible to change a direction of a sound output (sound output direction).

The communication quality notification screen 360 is a modification example of the communication quality notification screen 340 illustrated in FIG. 10 and is different from the communication quality notification screen 340 at a point that icons 370 to 374 indicating the electronic devices 200 to 204 are displayed and that communication quality in each direction of each electronic device is displayed. Also, on the communication quality notification screen 360, icons 380 to 384 indicating sound output directions of the electronic devices 200 to 204 are displayed around the icons 370 to 374 indicating the electronic devices 200 to 204. Note that when the electronic device is a display device (such as display), icons (corresponding to icons 380 to 384) indicating directions of a display screen can be displayed. In such a manner, a direction of a part, which needs to face a user, among parts of the electronic device can be displayed and notified to the user.

For example, when the adjustment mode is set, each of the electronic devices 200 to 204 serially rotates the own device autonomously or according to the control from the information processing apparatus 100 and measures communication quality in each direction (such as eight direction). In this case, for example, the information processing apparatus 100 can specify one of the electronic devices 200 to 204 as an electronic device a direction of which is to be changed (specified electronic device) and can assume that the other electronic devices are fixed. Then, the information processing apparatus 100 can make each electronic device measure communication quality. Then, after communication quality is measured in each direction of the specified electronic device, a different electronic device is specified as an electronic device a direction of which is to be changed (specified electronic device) and the specified electronic device measures communication quality in all directions. In such a manner, an electronic device a direction of which is to be changed (specified electronic device) is changed according to a predetermined rule and communication quality in each of the directions (such as eight direction) is measured in each combination of the electronic device.

Then, each of the electronic devices 200 to 204 serially reports the measurement result (communication quality) to the information processing apparatus 100 while associating the result with the measured direction. As illustrated in FIG. 18, the communication quality acquired in such a manner can be displayed while being associated with a direction of the electronic device.

For example, a sign (such as arrow) indicating communication quality measured in eight directions is displayed around each of the icons 370 to 374 indicating the electronic devices 200 to 204. In FIG. 18, an arrow in a direction with high communication quality is indicated by a solid thick line. Also, an arrow in a direction with not-high communication quality in which direction communication can be performed is indicated by a dotted thick line. An arrow in a direction with low communication quality is indicated by a dotted thin line. Also, only a sign (such as arrow) indicating a direction with the highest communication quality may be displayed.

Also, when acquiring the communication quality measured with respect to each combination of the electronic devices, the information processing apparatus 100 selects a direction with the highest communication quality for each electronic device based on the acquired communication quality. Then, the information processing apparatus 100 notifies the selected direction to each electronic device by using wireless communication and performs control in such a manner that each electronic device rotates in the selected direction. In this case, the information processing apparatus 100 notifies a direction with the highest communication quality to each electronic device and makes each electronic device rotate automatically in the notified direction. Alternatively, the information processing apparatus 100 may transmit control information to rotate each electronic device in the direction with the highest communication quality and each electronic device may rotate based on the control information.

Also, the information processing apparatus 100 can exclude a direction with obviously low communication quality. In this case, the information processing apparatus 100 may perform a display which gives a warning for an electronic device facing the direction with the obviously low communication quality (which display is, for example, blink display of icon 370 to 374 or display thereof in red).

Also, when the direction with obviously low communication quality is excluded, the information processing apparatus 100 can display a direction with high communication quality for a user by searching for a direction other than the direction with obviously low communication quality.

In such a manner, the control unit 120 of the information processing apparatus 100 can display, as communication quality related to the electronic devices 200 to 204, communication quality measured in a plurality of installation directions (such as eight direction) of each electronic device while associating the quality with each of the installation directions.

Also, each of the electronic devices 200 to 204 can be a mobile device. In this case, the control unit 120 can generate control information to move the electronic devices 200 to 204 and can transmit the control information to the electronic devices 200 to 204.

[Example of Contents in Electronic Device Management Table]

Here, the information processing apparatus 100 can manage whether an electronic device communication quality of which is to be measured is a stationary electronic device or a mobile electronic device (such as mobile terminal). Thus, an example of the management is illustrated in FIG. 19.

FIG. 19 is a table schematically illustrating an electronic device management table 134 held by an information processing apparatus 100 in the third embodiment of the present technology.

In the electronic device management table 134, information (stationary/mobile and function) related to each electronic device is stored. In such a manner, the information processing apparatus 100 can understand whether an electronic device, communication quality of which is to be measured, is a stationary device or a mobile device (such as mobile terminal). Also, by collecting information of a function of each electronic device, the information processing apparatus 100 can understand whether it is possible to move the electronic device.

For example, in a case of the stationary device, it can be assumed that there is a lot of power. Thus, it is possible to provide recommended information in such a manner that the number of paths with different electronic devices is increased. Also, it is possible to provide recommended information in consideration of performance of an electronic device.

Note that in the third embodiment of the present technology, an electronic device which can rotate the own device has been described as an example. However, it is also possible to display communication quality in a similar manner with respect to an electronic device which can move the own device. In this case, for example, communication quality can be measured by serially moving an electronic device in a movable range.

4. Fourth Embodiment

In the third embodiment of the present technology, an example of installing a mobile electronic device has been described. Here, an information processing apparatus which acquires and displays communication quality related to an electronic device may be moved (for example, moved or rotated) autonomously or according to user operation. In a case of using such a mobile information processing apparatus, it is possible to acquire communication quality and to set an optimal environment while moving the information processing apparatus.

Thus, in the fourth embodiment of the present technology, an example of using a mobile information processing apparatus will be described.

Note that a configuration of an electronic device in the fourth embodiment of the present technology is substantially identical to the electronic devices 200 to 204 illustrated, for example, in FIG. 1 and FIG. 6. Thus, to a part identical to that in the first embodiment of the present technology, a reference sign identical to that of the first embodiment of the present technology is assigned and a part of a description thereof is omitted.

[Example of Configuration of Information Processing Apparatus]

Figure 20:
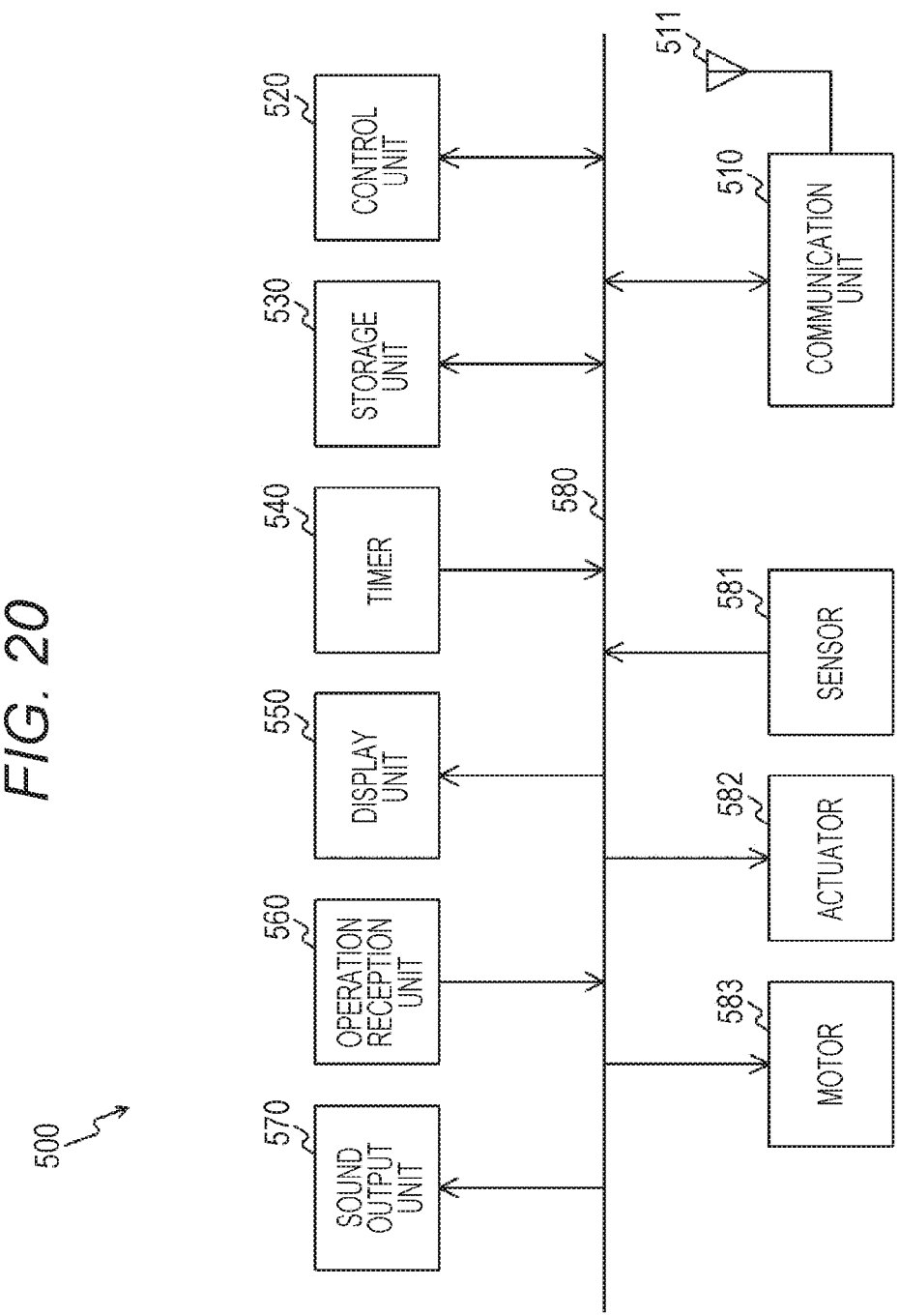
FIG. 20 is a block diagram illustrating an example of a functional configuration of an information processing apparatus 500 in a fourth embodiment of the present technology.

FIG. 20 is a block diagram illustrating an example of a functional configuration of an information processing apparatus 500 in the fourth embodiment of the present technology.

The information processing apparatus 500 includes a communication unit 510, an antenna 511, a control unit 520, a storage unit 530, a timer 540, a display unit 550, an operation reception unit 560, a sound output unit 570, a sensor 581, an actuator 582, and a motor 583. Also, these are connected to each other through a bus 580. Also, the information processing apparatus 500 is a robot which can move autonomously or by remote control (such as self-propelled vacuum cleaner which periodically and automatically perform cleaning, mobile self-propelled speaker, or humanoid robot).

Note that the communication unit 510, the antenna 511, the control unit 520, the storage unit 530, the timer 540, the display unit 550, the operation reception unit 560, and the sound output unit 570 corresponds to parts with the identical names in FIG. 2. Thus, a detailed description of these will be omitted here.

The sensor 581 is a sensor to detect a state of the information processing apparatus 500 and outputs detected sensor information to the control unit 520. Accordingly, the control unit 520 can detect a position or a direction of the information processing apparatus 500. Note that the sensor 581 includes, for example, a global positioning system (GPS) sensor which can acquire positional information, a gyro sensor which can detect a direction, an orientation sensor which can detect an orientation, or an obstacle sensor for avoiding collision (sensor to detect obstacle and to avoid obstacle).

The actuator 582 is a drive device to drive a part or the whole of the information processing apparatus 500 based on control by the control unit 520. The actuator 582 is used, for example, in a case of performing a rotation to change a direction of the information processing apparatus 500. Also, for example, the actuator 582 is used to change a direction or an angle of the antenna 511.

The motor 583 is a drive device to move the information processing apparatus 500 based on the control by the control unit 520. For example, the motor 583 moves the information processing apparatus 500 by driving a wheel provided in a lower part of the information processing apparatus 500.

[Example of Record of Communication Quality at Each Place]

Figures 21A, 21B:
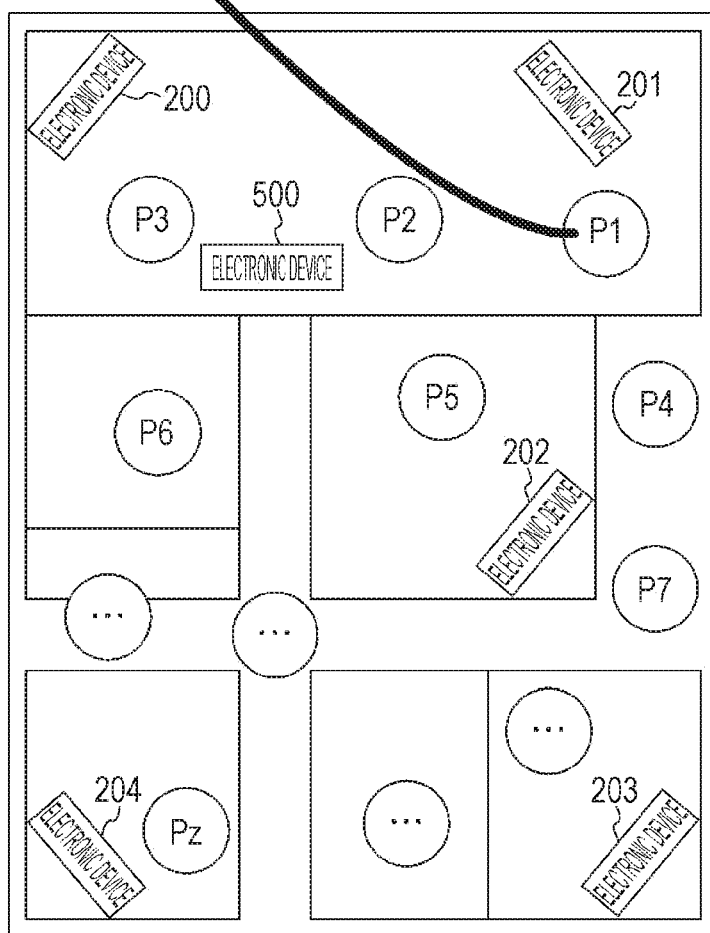
FIGS. 21A and 21B is a are views illustrating an example of a record of communication quality measured by the information processing apparatus 500 in the fourth embodiment of the present technology.

FIGS. 21A and 21B is a are views illustrating an example of a record of communication quality measured by the information processing apparatus 500 in the fourth embodiment of the present technology.

In FIG. 21A, a communication quality management table 700 which records communication quality measured by the information processing apparatus 500 is schematically illustrated. In FIG. 21B, places P1 to Pz where the information processing apparatus 500 moves and measures communication quality are illustrated in a simplified manner. Note that it is assumed that P1 to Pz are IDs respectively assigned to places. Also, the places P1 to Pz may be set randomly or a layout generated by a user (position of room and electronic device) may be set based on a predetermined rule (such as position in room or relationship with electronic device).

For example, the control unit 520 of the information processing apparatus 500 measures communication quality by serially moving the information processing apparatus 500 from the places P1 to Pz. For example, the information processing apparatus 500 receives a test frame from each of electronic devices 200 to 204 and measures communication quality of each of the electronic devices 200 to 204 while moving in a self-propelled manner. In this case, a period of time for measurement may be a period of time until the certain number of frames are received from each of the electronic devices 200 to 204 or may be a predetermined period of time (such as one minute). In such a manner, the information processing apparatus 500 performs the measurement while temporarily stopping at each of the positions P1 to Pz during the measurement time.

Also, the control unit 520 records, into the communication quality management table 700, the measured communication quality of the electronic devices 200 to 204 at each of the places P1 to Pz. For example, the information processing apparatus 500 moves to the place P1 and communication quality related to each of the electronic devices 200 to 204 which quality is measured at the place P1 is recorded while being associated with P1 in the communication quality management table 700, as indicated by an arrow. Note that the communication quality stored into the communication quality management table 700 may be information described in the first to third embodiments of the present technology (such as contents in management table illustrated in FIG. 3 to FIG. 5) or may be different information.

Also, at each place, the information processing apparatus 500 may change a direction of the own apparatus and may measure communication quality in each direction. For example division into eight directions can be performed and communication quality can be measured while the information processing apparatus 500 is temporarily stopped in each direction. An example of the recording is illustrated in FIG. 22.

[Example of Record of Communication Quality in a Plurality of Directions at Each Place]

Figures 22A, 22B:
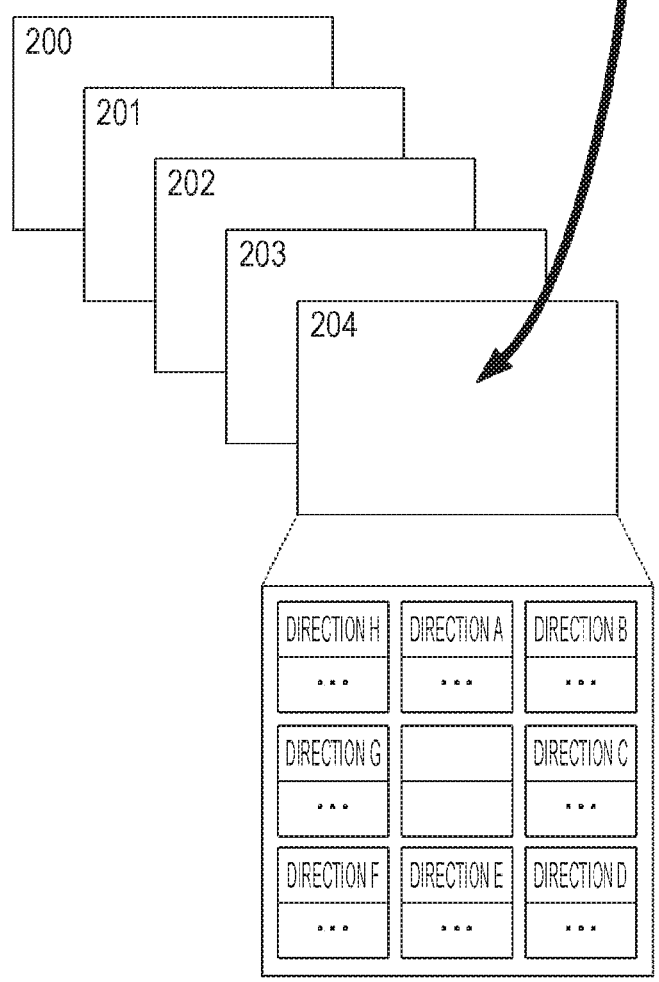
FIGS. 22A and 22B is a are views illustrating an example of a record of communication quality measured by the information processing apparatus 500 in the fourth embodiment of the present technology.

FIGS. 22A and 22B are views illustrating an example of a record of communication quality measured by the information processing apparatus 500 in the fourth embodiment of the present technology.

In FIG. 22A, a communication quality management table 701 which records communication quality measured by the information processing apparatus 500 is schematically illustrated. In FIG. 21B, communication quality in eight directions at the place P1 is illustrated in a simplified manner. For example, as indicated by an arrow, communication quality of the electronic device 204 in eight directions at the place P1 is recorded. Also, it is possible to display the communication quality in a manner easily recognized by a user. An example of the display is illustrated in each of FIG. 23 and FIG. 24.

[Example of Display of Communication Quality in a Plurality of Directions at Each Place]

Figure 23:
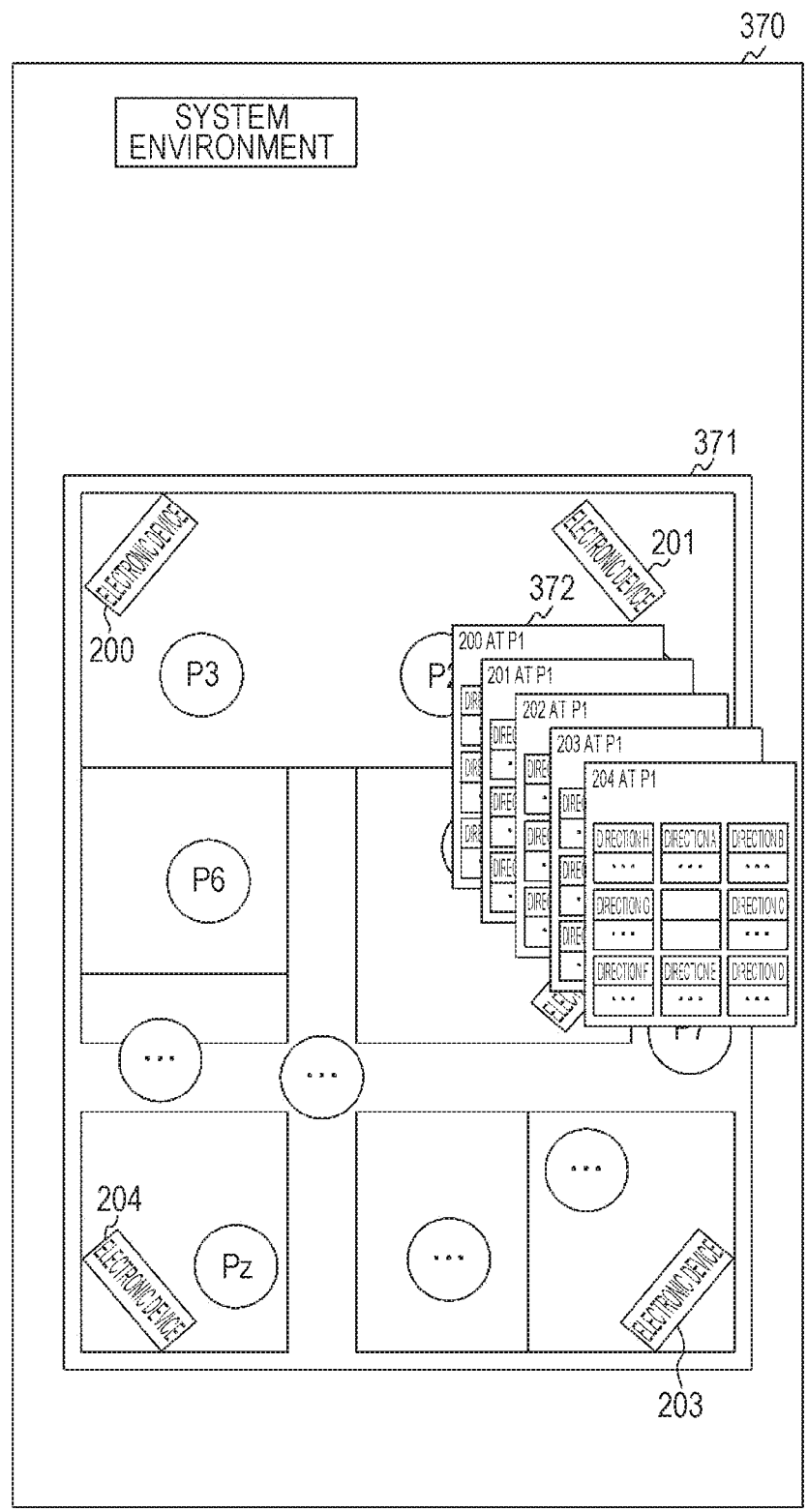
FIG. 23 is a view illustrating an example of a communication quality notification screen (communication quality notification screen 370) displayed on a display unit 150 in the fourth embodiment of the present technology.
Figure 24:
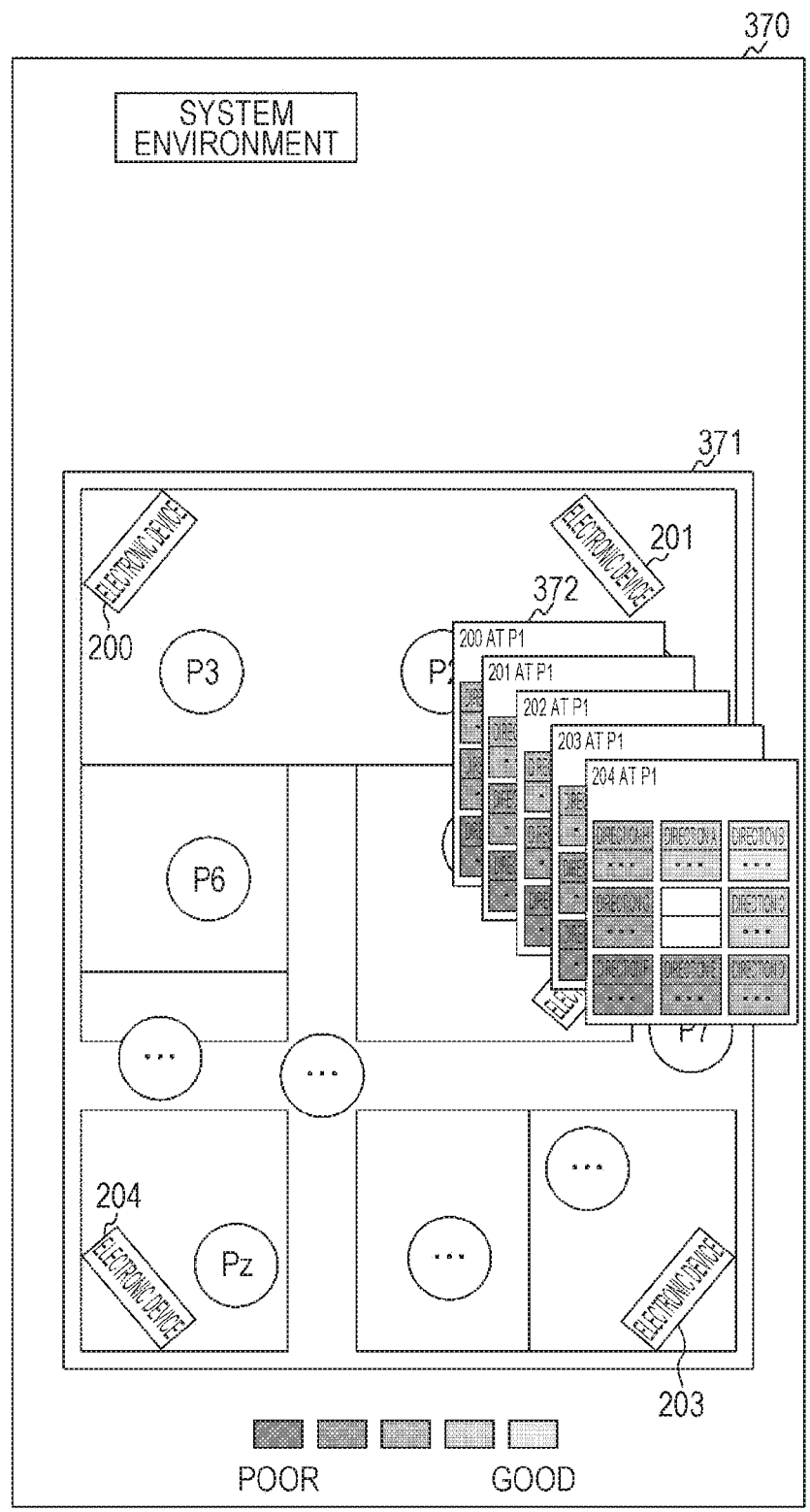
FIG. 24 is a view illustrating an example of a communication quality notification screen (communication quality notification screen 370) displayed on the display unit 150 in the fourth embodiment of the present technology.

Each of FIG. 23 and FIG. 24 is a view illustrating an example of a communication quality notification screen (communication quality notification screen 370) displayed on a display unit 150 in the fourth embodiment of the present technology. In this example, an example of displaying communication quality in eight directions at the place P1 will be described.

The communication quality notification screen 370 is a modification example of the communication quality notification screen 340 illustrated in FIG. 10 and is different from the communication quality notification screen 340 at a point that communication quality at each of the places P1 to Pz is displayed instead of communication quality between electronic devices 200 to 204.

As illustrated in FIG. 23, for example, a list 372 which displays communication quality in each direction in matrix can be displayed at a place, which is selected by user operation, with respect to each of the electronic devices 200 to 204.

Also, as illustrated in FIG. 24, for example, a list 373 which displays communication quality in each direction in a color can be displayed at a place, which is selected by user operation, with respect to each of the electronic devices 200 to 204.

By user operation, a list of an intended electronic device can be selected, switched to an upper side, and displayed.

Also, for example, it is possible to compose and display a color of each item by superimposing colored matrices (list 373) at places. In such a manner, by composing a color, it is possible to display communication quality in which performance of each of the electronic devices 200 to 204 at each place (such as place P1) is considered can be displayed in a manner visually recognized easily. That is, it is possible to display communication quality in a display mode easily recognized by the user.

[Example of Communication]

Figure 25:
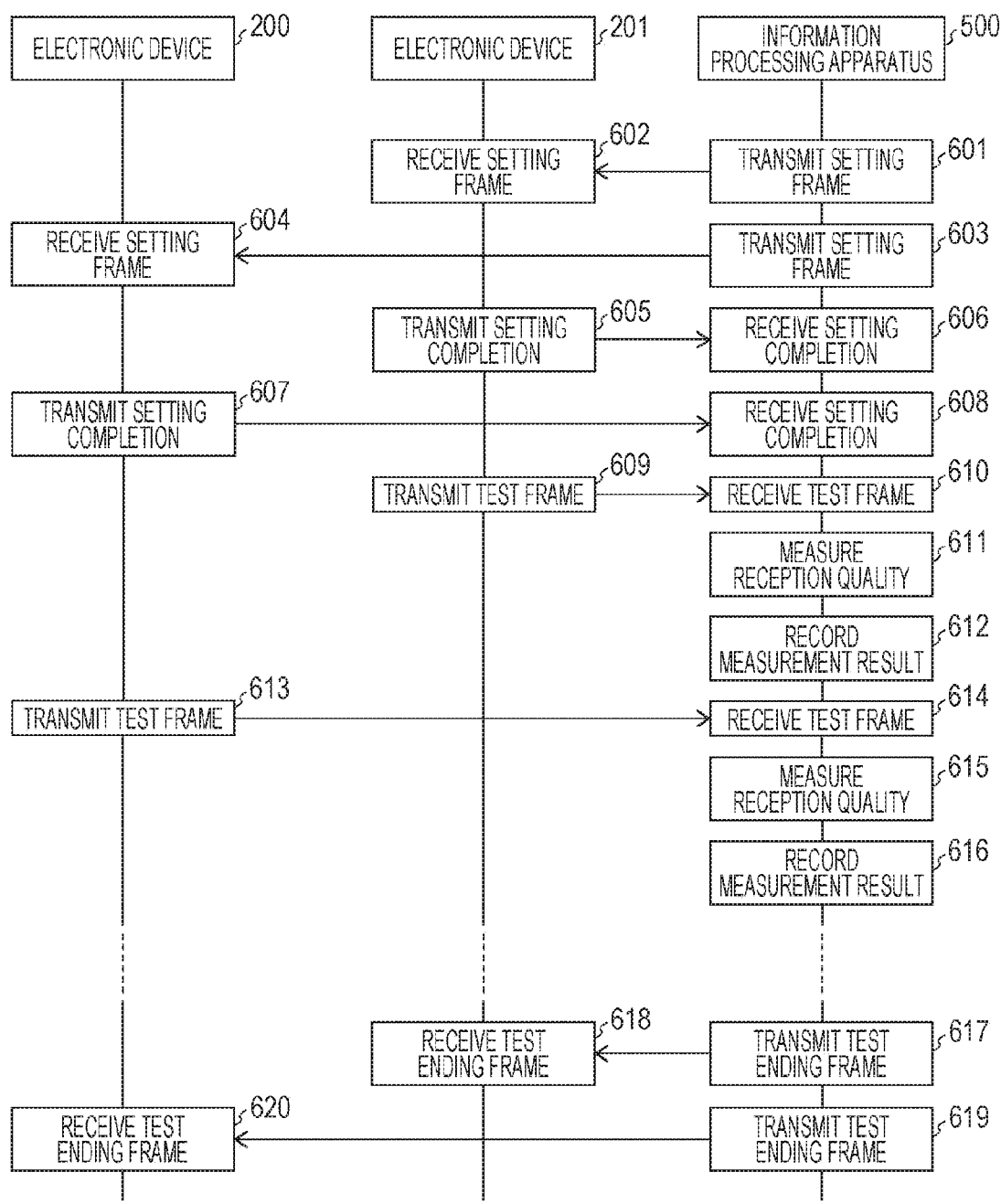
FIG. 25 is a sequence chart illustrating an example of communication processing between devices included in a communication system 10 in the fourth embodiment of the present technology.

FIG. 25 is a sequence chart illustrating an example of communication processing between devices included in a communication system 10 in the fourth embodiment of the present technology. Note that in FIG. 25, only the electronic devices 200 and 201 among the plurality of electronic devices are illustrated and illustration of the other electronic devices is omitted. It is assumed that the electronic device 201 includes a configuration similar to that of the electronic device 200. Also, in FIG. 25, an example in which the information processing apparatus 500 measures communication quality based on a test frame transmitted from each of the electronic devices 200 and 201 is illustrated.

First, an adjustment mode is set in each of the electronic devices 200 and 201. That is, the information processing apparatus 500 transmits a setting frame to the electronic devices 200 and 201 which participate in the same network (601 to 604). The setting frame is an instruction frame to notify that data collection of communication quality is to be started.

Each of the electronic devices 200 and 201 which receives the setting frame sets an adjustment mode based on the received setting frame. In such a manner, when the adjustment mode is set, each of the electronic devices 200 and 201 transmits a frame indicating that setting is completed to the information processing apparatus 500 (605 to 608).

Subsequently, each of the electronic devices 200 and 201 transmits a test frame to the information processing apparatus 500 (609, 610, 613, and 614). The information processing apparatus 500 which receives the test frame measures the communication quality based on the received test frame (611 and 615). Then, the information processing apparatus 500 records the measurement result (612 and 616).

In such a manner, transmission of a test frame from each of the electronic devices 200 and 201 and measurement and recording of communication quality performed by the information processing apparatus 500 are performed periodically or irregularly. Note that these are not illustrated in FIG. 25.

Subsequently, in a case of ending the adjustment mode (performance evaluation mode), the information processing apparatus 500 transmits a test ending frame to the electronic devices 200 and 201 (617 to 620). The test ending frame is a frame to give notification to end the adjustment mode (performance evaluation mode). Each of the electronic devices 200 and 201 which receives the test ending frame releases the adjustment mode.

Note that measurement time of communication quality (setting time of adjustment mode) may be previously determined and the electronic devices 200 and 201 may automatically end the adjustment mode when the measurement time is over. For example, measurement time is included in a setting frame which is transmitted first by the information processing apparatus 500. In this case, when receiving the setting frame, each of the electronic devices 200 and 201 sets the adjustment mode and ends the adjustment mode automatically when the measurement time included in the setting frame is over.

[Example of Communication]

Figure 26:
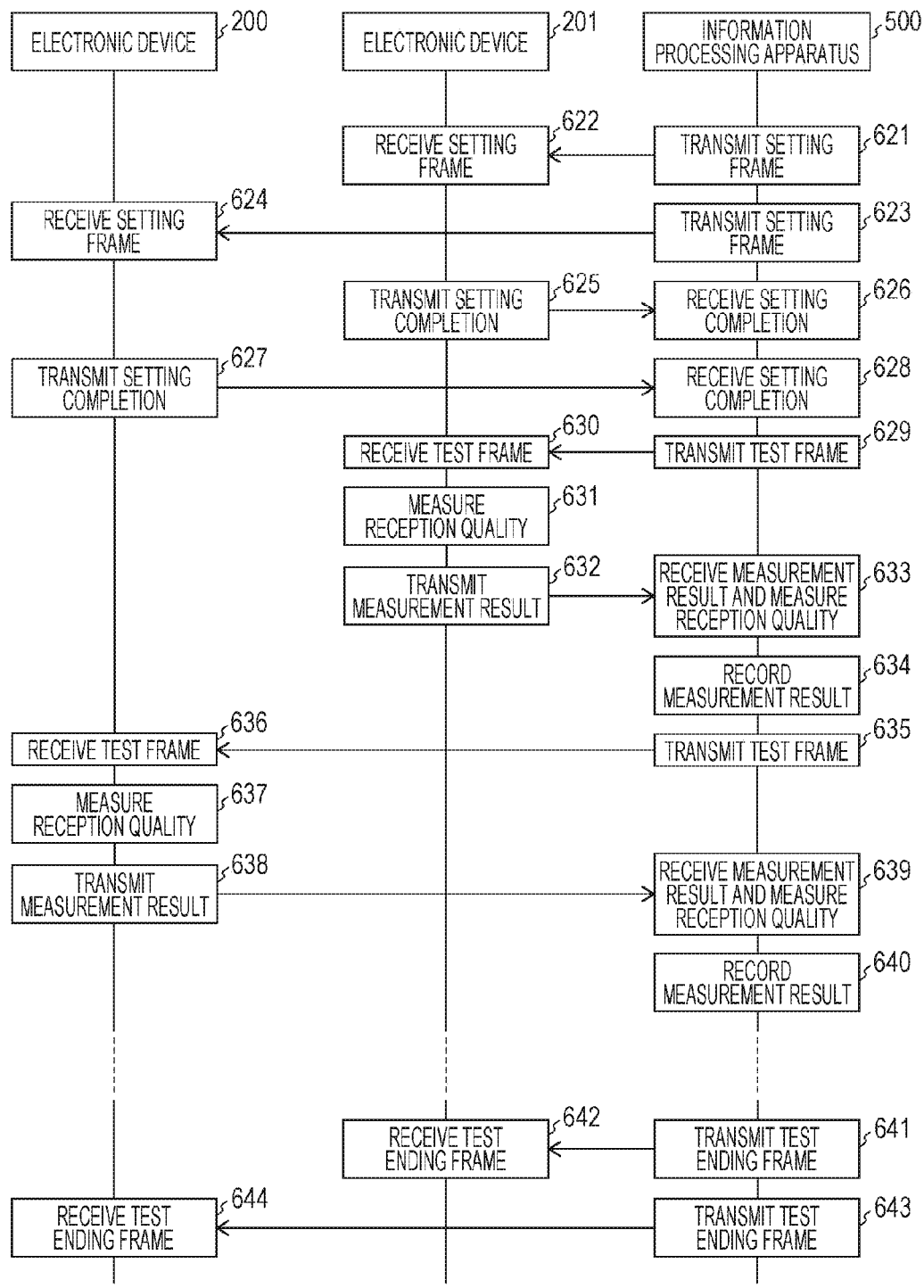
FIG. 26 is a sequence chart illustrating an example of communication processing between the devices included in the communication system 10 in the fourth embodiment of the present technology.

FIG. 26 is a sequence chart illustrating an example of communication processing between the devices included in the communication system 10 in the fourth embodiment of the present technology. Note that in FIG. 26, only the electronic devices 200 and 201 among the plurality of electronic devices are illustrated and illustration of the other electronic devices is omitted. Also, in FIG. 26, an example in which each of the information processing apparatus 500 and the electronic devices 200 and 201 measures communication quality is illustrated.

Note that each processing (621 to 628 and 641 to 644) illustrated in FIG. 26 corresponds to each processing (601 to 608 and 617 to 620) illustrated in FIG. 25.

The information processing apparatus 500 transmits a test frame to each of the electronic devices 200 and 201 (629, 630, 635, and 636). Each of the electronic devices 200 and 201 which receive the test frame measures communication quality based on the received test frame (631 and 637). Then, each of the electronic devices 200 and 201 transmits the measurement result to the information processing apparatus 500 (632, 633, 638, and 639). In this case, the information processing apparatus 500 measures communication quality based on the frame transmitted from each of the electronic devices 200 and 201 (633 and 639). Then, the information processing apparatus 500 records the measurement result (including received measurement result) (634 and 640).

In such a manner, transmission of a test frame to each of the electronic devices 200 and 201 and measurement and recording of communication quality performed by the information processing apparatus 500 are performed periodically or irregularly. Note that these are not illustrated in FIG. 26.

Note that similarly to FIG. 25, measurement time of communication quality (setting time of adjustment mode) may be previously determined and the electronic devices 200 and 201 may end the adjustment mode automatically when the measurement time is over.

In such a manner, the mobile information processing apparatus 500 can measure reception performance of a frame from a different electronic device while moving. Then, the data can be collected and put together. Accordingly, a preferable arrangement and direction of an electronic device can be estimated without movement of a user. Also, since the information processing apparatus 500 acquires communication quality automatically, the user can see the data whenever he/she intends.

[Example of Operation of Electronic Device]

Figure 27:
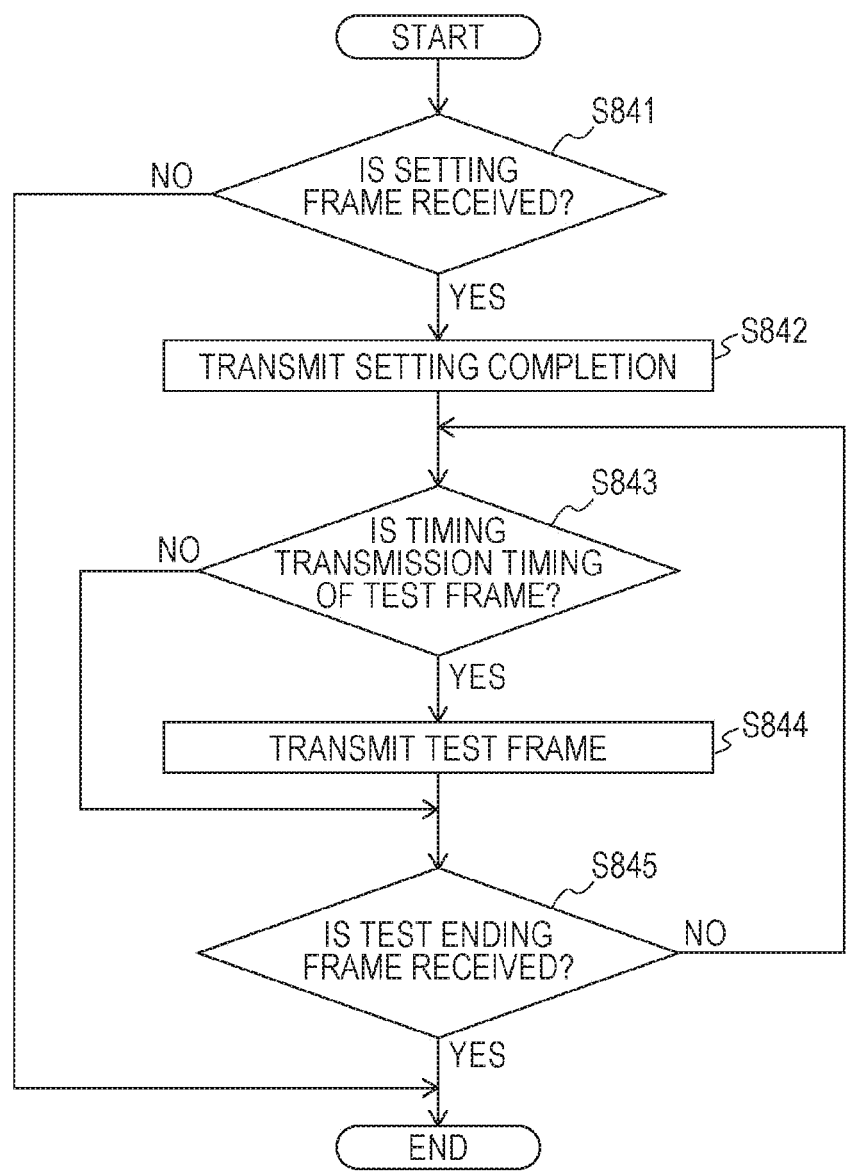
FIG. 27 is a flowchart illustrating an example of a processing procedure of communication quality measurement processing performed by an electronic device 200 in the fourth embodiment of the present technology.

FIG. 27 is a flowchart illustrating an example of a processing procedure of communication quality measurement processing performed by the electronic device 200 in the fourth embodiment of the present technology. In FIG. 27, an example of an operation corresponding to an example of communication illustrated in FIG. 25 is illustrated. Note that an example of an operation of each of the electronic devices 201 to 204 is similar to that of the electronic device 200. Thus, here, only a description of the electronic device 200 is made and a description of each of the electronic devices 201 to 204 is omitted.

First, the control unit 220 of the electronic device 200 determines whether a setting frame is received (step S841). When the setting frame is not received (step S841), an operation in the communication quality measurement processing is ended.

When the setting frame is received (step S841), the control unit 220 sets the adjustment mode and transmits setting completion to the information processing apparatus 500 (step S842).

Subsequently, the control unit 220 determines whether timing is transmission timing of a test frame based on information from a timer 240 (step S843). In a case of the transmission timing of a test frame (step S843), the control unit 220 makes the communication unit 210 transmit the test frame (step S844).

When the timing is not the transmission timing of a test frame (step S843), the control unit 220 determines whether a test ending frame is received (step S845). When the test ending frame is not received (step S845), the processing goes back to step S843.

When the test ending frame is received (step S845), an operation in the communication quality measurement processing is ended.

[Example of Operation of Information Processing Apparatus]

Figure 28:
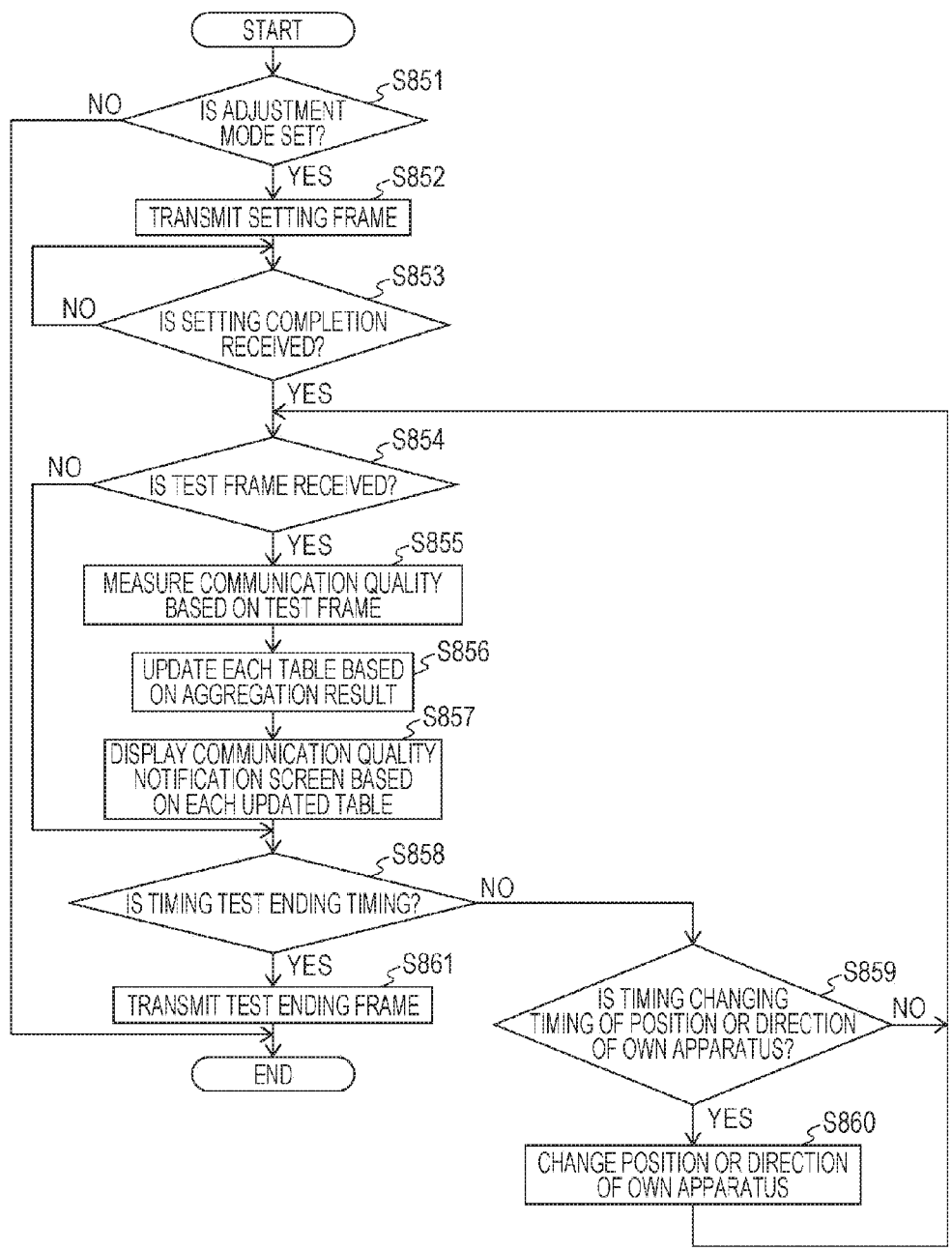
FIG. 28 is a flowchart illustrating an example of a processing procedure of communication quality measurement processing performed by the information processing apparatus 500 in the fourth embodiment of the present technology.

FIG. 28 is a flowchart illustrating an example of a processing procedure of communication quality measurement processing performed by the information processing apparatus 500 in the fourth embodiment of the present technology. In FIG. 28, an example of an operation corresponding to an example of communication illustrated in FIG. 25 is illustrated.

First, the control unit 520 of the information processing apparatus 500 determines whether the adjustment mode is set (step S851). When the adjustment mode is not set (step S851), an operation in the communication quality measurement processing is ended.

When the adjustment mode is set (step S851), the control unit 520 transmits the setting frame to each electronic device (step S852). Subsequently, the control unit 520 determines whether setting completion is received from all electronic devices (step S853). When setting completion is not received from all of the electronic devices (step S853), monitoring is kept performed.

When the setting completion is received from all of the electronic devices (step S853), it is determined whether a test frame is received (step S854). When the test frame is not received (step S854), the processing goes to step S858.

When the test frame is received (step S854), the control unit 520 measures communication quality based on the test frame (step S855). Subsequently, the control unit 520 performs aggregation processing of the communication quality and updates contents in each table (step S856).

Then, the control unit 520 displays a communication quality notification screen onto the display unit 150 based on the updated contents in each table (step S857).

Subsequently, the control unit 520 determines whether timing is the test ending timing based on the information from the timer 540 (step S858). In a case of the test ending timing (step S858), the control unit 520 makes the communication unit 510 transmit the test ending frame (step S861).

When the timing is not the test ending timing (step S858), the control unit 520 determines whether the timing is update timing to update a position or a direction of the information processing apparatus 500 (step S859). In a case of the update timing (step S859), the control unit 520 changes a position or a direction of the information processing apparatus 500 (step S860). When the timing is not the update timing (step S859), the processing goes back to step S854.

[Example of Operation of Electronic Device]

Figure 29:
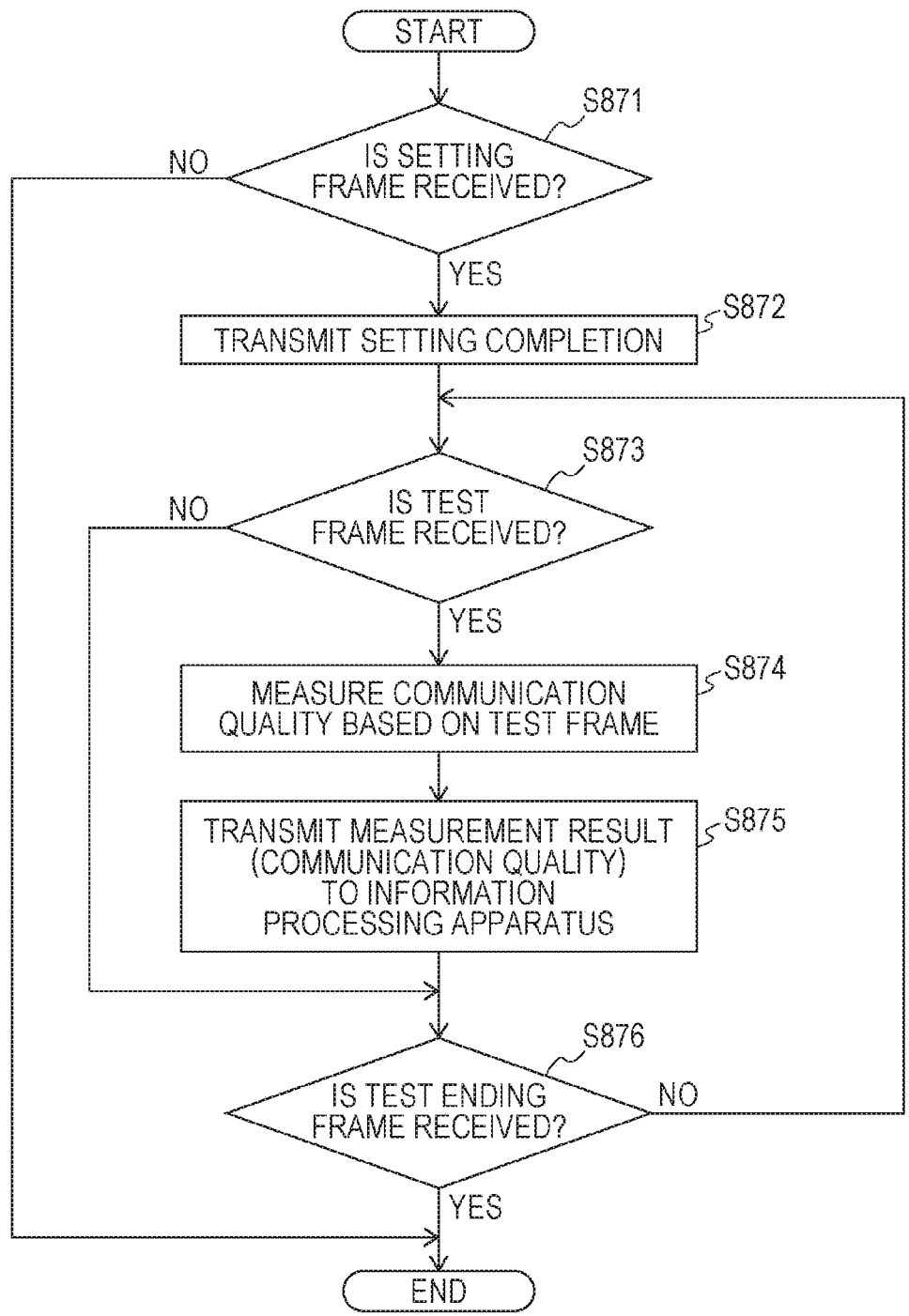
FIG. 29 is a flowchart illustrating an example of a processing procedure of communication quality measurement processing performed by the electronic device 200 in the fourth embodiment of the present technology.

FIG. 29 is a flowchart illustrating an example of a processing procedure of communication quality measurement processing performed by the electronic device 200 in the fourth embodiment of the present technology. In FIG. 29, an example of an operation corresponding to an example of communication illustrated in FIG. 26 is illustrated. Note that an example of an operation of each of the electronic devices 201 to 204 is similar to that of the electronic device 200. Thus, here, only a description of the electronic device 200 is made and a description of each of the electronic devices 201 to 204 is omitted.

Note that the processing procedure illustrated in FIG. 29 (steps S871, S872, and S876) corresponds to the processing procedure illustrated in FIG. 27 (steps S841, S842, and S845), and thus, a description thereof is omitted.

The control unit 220 of the electronic device 200 determines whether the test frame is received (step S873). When the test frame is not received (step S873), the processing goes to step S876.

When the test frame is received (step S873), the control unit 220 measures communication quality based on the test frame (step S874). Subsequently, the control unit 220 transmits the measurement result (communication quality) to the information processing apparatus 500 (step S875).

[Example of Operation of Information Processing Apparatus]

Figure 30:
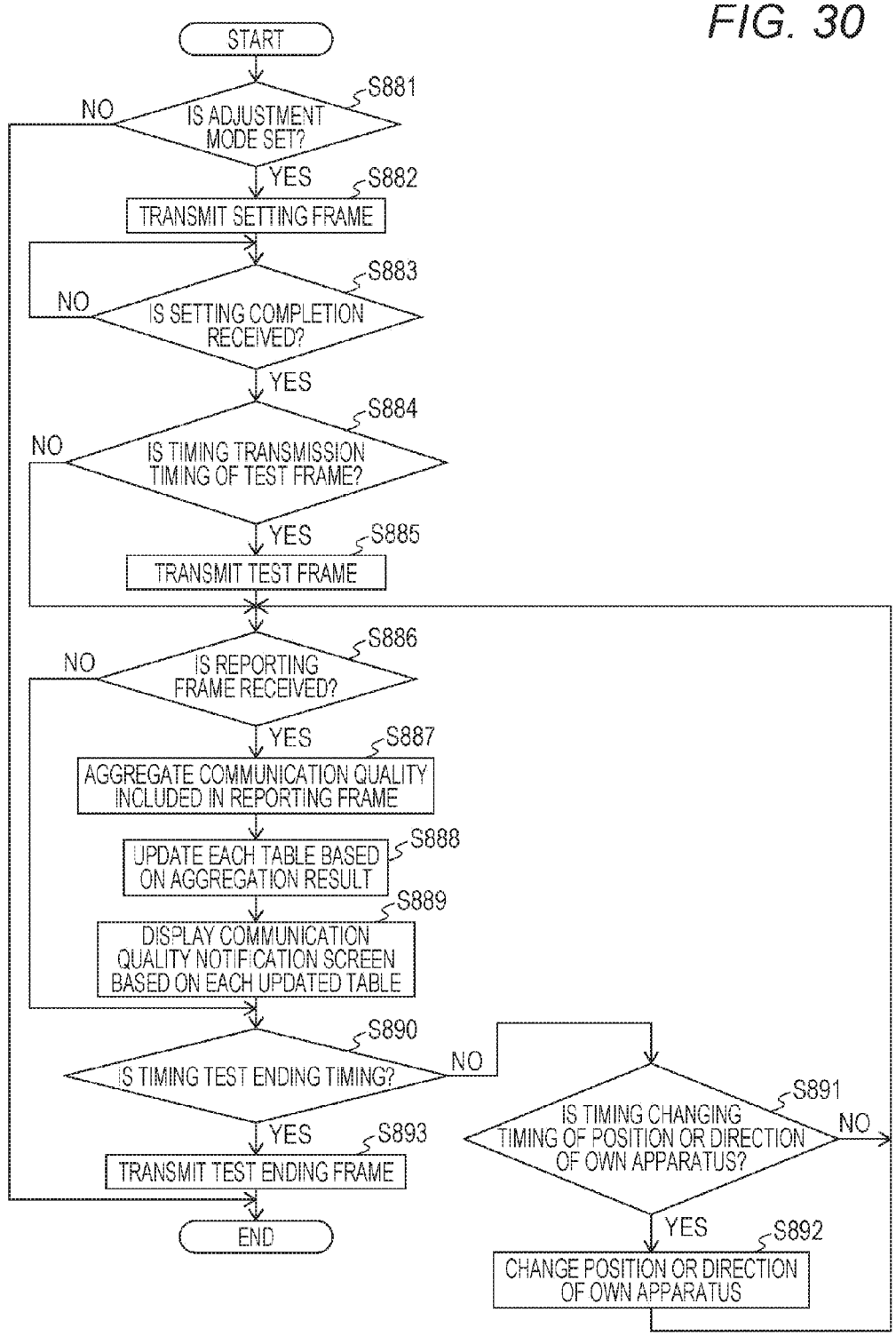
FIG. 30 is a flowchart illustrating an example of a processing procedure of communication quality measurement processing performed by the information processing apparatus 500 in the fourth embodiment of the present technology.

FIG. 30 is a flowchart illustrating an example of a processing procedure of communication quality measurement processing performed by the information processing apparatus 500 in the fourth embodiment of the present technology. In FIG. 30, an example of an operation corresponding to an example of communication illustrated in FIG. 26 is illustrated.

Note that the processing procedure illustrated in FIG. 30 (steps S881 to S883 and S890 to S893) corresponds to the processing procedure illustrated in FIG. 28 (steps S851 to S853 and S858 to S861), and thus, a description thereof is omitted.

The control unit 520 determines whether timing is transmission timing of the test frame based on information from the timer 540 (step S884). In a case of the transmission timing of a test frame (step S884), the control unit 520 makes the communication unit 510 transmit a test frame (step S885). When the timing is not transmission timing of a test frame (step S884), the processing goes to step S886.

Subsequently, the control unit 220 determines whether a reporting frame is received (step S886). When the reporting frame is not received (step S886), the processing goes to step S890.

When the reporting frame is received (step S886), the control unit 520 measures communication quality based on the reporting frame (step S887). Also, the control unit 520 performs aggregation processing of communication quality included in the reporting frame (step S887). Then, the control unit 520 updates contents in each table based on the aggregation result (step S888).

Subsequently, the control unit 520 displays a communication quality notification screen onto the display unit 150 based on the updated contents in each table (step S889).

In such a manner, the control unit 520 of the information processing apparatus 500 can move the information processing apparatus 500 and can use communication quality related to the electronic devices 200 to 204 which quality is measured serially after the movement. Also, the control unit 520 can display, onto the display unit 550, a spatial image indicating a space in which the electronic devices 200 to 204 are installed and a positional image (P1 to Pz) indicating a position in the space at which position communication quality is measured after the movement of the information processing apparatus 500. In this case, the control unit 520 can display communication quality measured at each position while associating the quality with the position.

In such a manner, each of the information processing apparatuses 100 and 500 can display various kinds of information related to a communication system based on the communication quality measured by the electronic devices 200 to 204 (or own apparatus). For example, each of the information processing apparatuses 100 and 500 can calculate and display a degree of system quality which can be kept at a place where a source device is installed. Note that required communication quality is different depending on a communication system. For example, in a communication system which needs to transmit/receive a large amount of data in real time, it is preferable that a reception interval deviation in a transmission/reception frame is small, a hop count is low, and a communication rate is high. On the other hand, depending on a communication system, there may be a case where quality with which a speech can be heard with an ear of a human is enough. Thus, according to a used communication system, a method of displaying a degree of communication quality as a communication system can be classified by levels and changed. The change may be performed based on user operation or by the following manner. That is, performance information or the like of each electronic device is acquired by the information processing apparatus and the information processing apparatus automatically performs the change based on the performance information or the like.

5. Fifth Embodiment

In the first to fourth embodiments of the present technology, an example in which an information processing apparatus handles communication quality measured by each device has been described. It is considered that information more useful for a user can be provided by aggregating and using the communication quality.

Thus, in the fifth embodiment of the present technology, an example of handling communication quality by using a cloud service will be described.

[Example of Configuration of Communication System]

Figure 31:
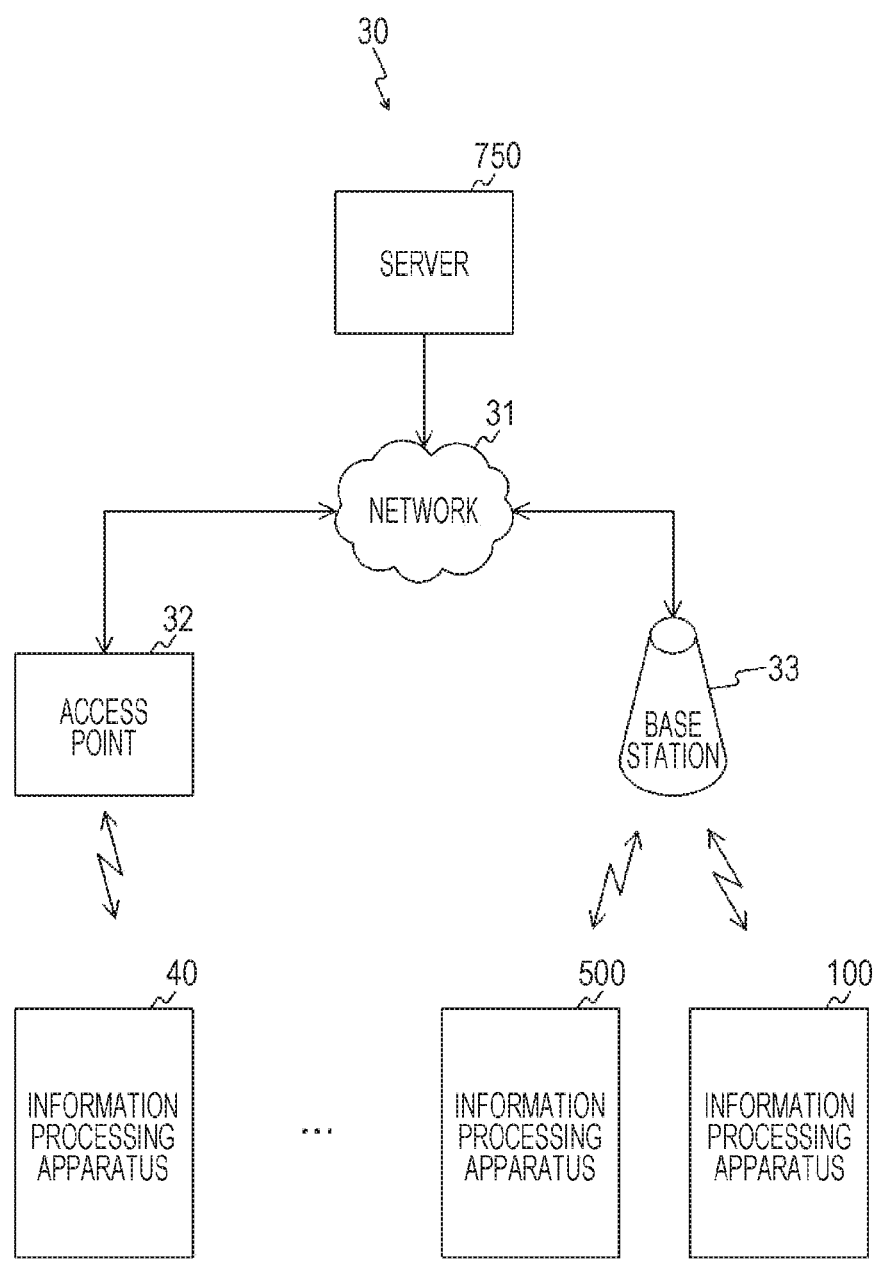
FIG. 31 is a block diagram illustrating an example of a system configuration of a communication system 30 in a fifth embodiment of the present technology.

FIG. 31 is a block diagram illustrating an example of a system configuration of a communication system 30 in the fifth embodiment of the present technology.

The communication system 30 includes a network 31, an access point 32, a base station 33, and information processing apparatuses 40, 100, and 500. The communication system 30 is, for example, a communication system to realize a cloud service.

The network 31 is a network (such as public line) such as a telephone network or the Internet. The access point 32 is an access point to connect information processing apparatus by using wireless communication. The base station 33 is a mobile communication base station (NodeB) to connect the information processing apparatus by using wireless communication.

A server 750 is an information processing apparatus to acquire information transmitted from the information processing apparatuses 40, 100, and 500. Also, the server 750 provides information to the information processing apparatuses 40, 100, and 500.

For example, when purchasing electronic devices 200 to 204, the user acquires, from the server 750, an application to display communication quality in a manner easily recognized by the user. Subsequently, by using the application, the user inputs an arrangement of an electronic device and a floor layout of a room in the information processing apparatus 100 and saves the data (layout information) into the information processing apparatus 100. Also, the information processing apparatus 100 saves communication quality (communication quality information) measured by each electronic device into the information processing apparatus 100.

In such a manner, each piece of information stored in the information processing apparatus 100 (such as layout information or communication quality information) can be provided by the user to a service in the network. For example, each piece of information stored in the information processing apparatus 100 (such as layout information or communication quality information) is transmitted to the server 750 in such a manner that the information can be handled by the server 750.

Accordingly, the server 750 can acquire layout information related to a room of each user or communication quality information in the layout. Then, the server 750 can generate various kinds of information by analyzing and learning these pieces of information (such as layout information and communication quality information). For example, information related to an arrangement or a direction of an electronic device with which arrangement or direction optimal communication quality is provided can be calculated from rough layout information. For example, since the user provides layout information of a room to the server 750, an arrangement of an electronic device which arrangement is optimal to the layout can be transmitted from the server 750 to the information processing apparatus 100. Accordingly, the user can recognize an optimal arrangement of an electronic device before arranging the electronic device.

In such a manner, it is possible to learn arrangement information optimal to a system by using a cloud service.

Also, for example, when a user provides each piece of information (layout information or communication quality information), an incentive such as a discount for purchasing an additional electronic device or a point can be provided in return by a service. Also, performance of wireless varies depending on a device (difference in model or the like), and thus, information thereof can be also provided to the user. Accordingly, the service side can collect a data source. Also, the user can receive an incentive such as a discount or a point.

I such a manner, in an embodiment of the present technology, communication quality related to the electronic devices 200 to 204 (or also related to information processing apparatus 100 or 500) is reported to the information processing apparatus 100 or 500. Accordingly, the information processing apparatus 100 or 500 can display the communication quality related to the electronic devices 200 to 204 in real time in a manner easily recognized by a user. Also, when the user checks the display contents, each of the electronic devices 200 to 204 can be arranged at a place optimal as a system appropriate for an environment.

Accordingly, an arrangement including a direction optimal to each of the electronic devices 200 to 204 can be set by the user freely. That is, an environment appropriate for communication quality between the electronic devices 200 to 204 can be provided.

Also, in a case of newly adding an electronic device to the communication system 10, a user can easily recognize a place and the number of electronic devices to be added to improve system performance of a mesh network. Also, in a case of reducing an electronic device from the mesh network or replacing an electronic device included in the mesh network, a user can easily come to recognition in a similar manner.

Also, an installation place of each of the electronic devices 200 to 204 can be changed at timing intended by the user.

Also, by accumulating and analyzing data in various environments, communication quality related to an electronic device can be learned and a user can be user induced to an optimal installation place.

6. Application Example

A technology related to the present disclosure can be applied to various products. For example, each of the information processing apparatuses 100 and 500 and the electronic devices 200 to 204 can be realized as a mobile terminal such as a smartphone, a tablet personal computer (PC), a laptop, a portable game terminal, or a digital camera, a fixed terminal such as a television receiver, a printer, a digital scanner, or a network storage, or an in-vehicle terminal such as a car navigation apparatus. Also, each of the information processing apparatuses 100 and 500 and the electronic devices 200 to 204 may be realized as a terminal to perform machine to machine (M2M) communication (also referred to as machine type communication (MTC) terminal) which terminal is, for example, a smart meter, a vending machine, a remote monitoring apparatus, or a point of sale (POS) terminal. Also, each of the information processing apparatuses 100 and 500 and the electronic devices 200 to 204 may be a wireless communication module mounted in such a terminal (which module is, for example, integrated circuit module including one die).

[6-1. First Application Example]

Figure 32:
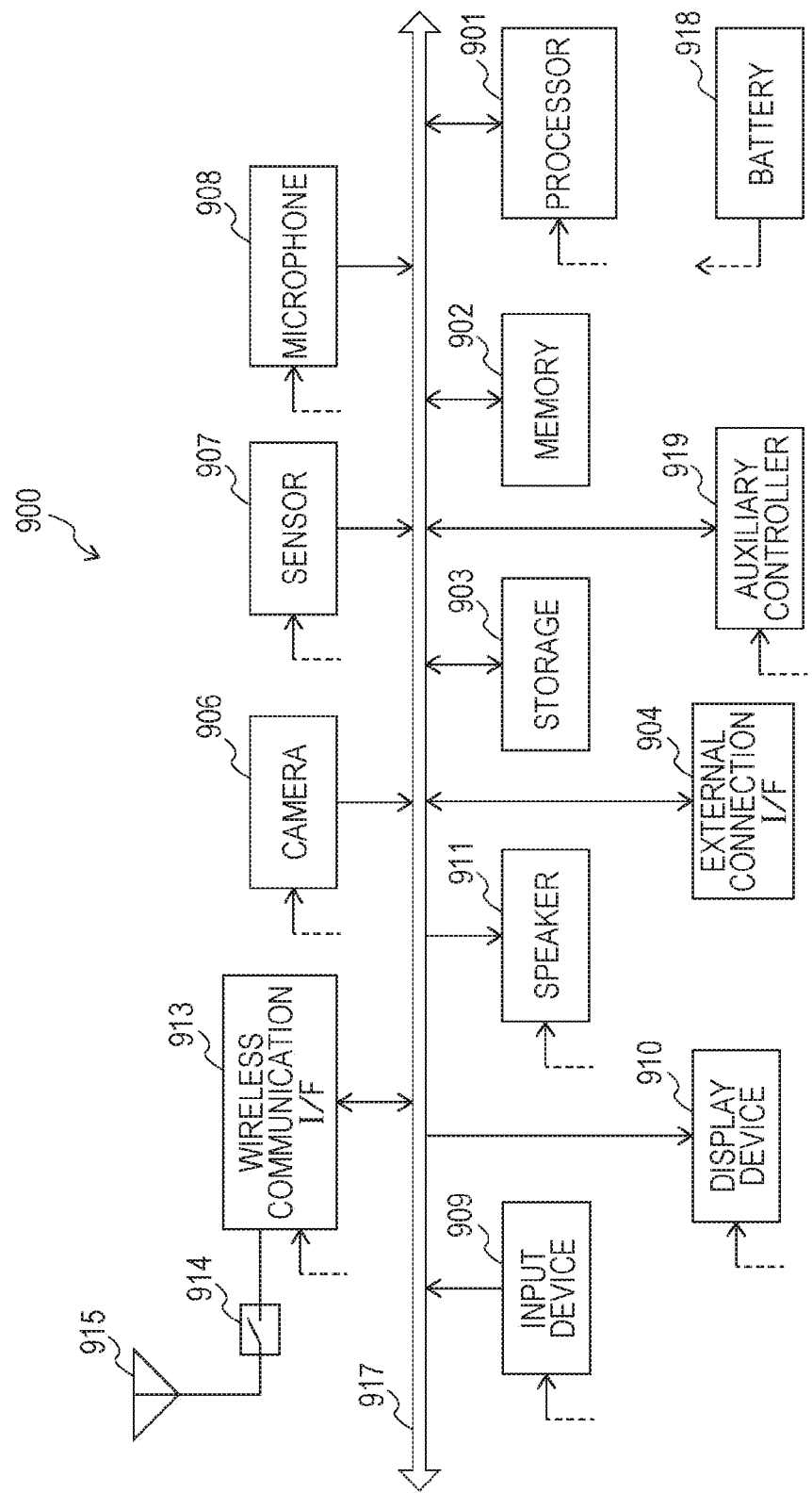
FIG. 32 is a block diagram illustrating an example of a schematic configuration of a smartphone.

FIG. 32 is a block diagram illustrating an example of a schematic configuration of a smartphone 900 to which a technology according to an embodiment of the present technology can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC) and controls a function of an application layer and a different layer of the smartphone 900. The memory 902 includes random access memory (RAM) and read only memory (ROM) and stores a program and data executed by the processor 901. The storage 903 may include a storage medium such as semiconductor memory or a hard disk. The external connection interface 904 is an interface to connect an external device such as a memory card or a universal serial bus (USB) device to a smartphone 900.

The camera 906 includes, for example, an imaging element such as a charge coupled device (CCD) or a complementary metal oxide semiconductor (CMOS) and generates an imaged image. The sensor 907 may include, for example, a sensor group of a positioning sensor, a gyro sensor, a terrestrial magnetism sensor, an acceleration sensor, and the like. The microphone 908 converts a sound input into the smartphone 900 into a sound signal. The input device 909 includes, for example, a touch sensor to detect a touch on a screen of the display device 910, a keypad, a keyboard, a button, or a switch and receives operation or an information input from the user. The display device 910 includes a screen such as a liquid crystal display (LCD) or an organic light emitting diode (OLED) display and displays an output image of the smartphone 900. The speaker 911 converts, into a sound, a sound signal which is output from the smartphone 900.

The wireless communication interface 913 supports one or more of wireless LAN standards such as IEEE 802.11a, 11b, 11g, 11n, 11ac, and 11ad and executes wireless communication. In an infrastructure mode, the wireless communication interface 913 may communicate with a different apparatus through a wireless LAN access point. Also, in an ad hoc mode or a direct communication mode such as Wi-Fi Direct, the wireless communication interface 913 may directly communicate with a different apparatus. Note that in Wi-Fi Direct, one of two terminals operates as an access point unlike the ad hoc mode. However, communication is performed between these terminals directly. Typically, the wireless communication interface 913 may include a baseband processor, a radio frequency (RF) circuit, a power amplifier, and the like. The wireless communication interface 913 may be a one-chip module in which a memory to store a communication control program, a processor to execute the program, and a related circuit are integrated. The wireless communication interface 913 may support, in addition to a wireless LAN system, a different kind of wireless communication system such as a near field communication system, a proximity wireless communication system, or a cellular communication system. The antenna switch 914 switches a connection destination of the antenna 915 in a plurality of circuits (such as circuit for different wireless communication system) included in the wireless communication interface 913. The antenna 915 includes one or a plurality of antenna elements (such as a plurality of antenna elements included in MIMO antenna) and is used for transmission/reception of a wireless signal performed by the wireless communication interface 913.

Note that the example in FIG. 32 is not the limitation and the smartphone 900 may include a plurality of antennas (such as antenna for wireless LAN or antenna for proximity wireless communication system). In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to each block in the smartphone 900, which is illustrated in FIG. 32, through a feed line partially-indicated by a broken line in the drawing. The auxiliary controller 919 operates a minimum function of the smartphone 900, for example, in a sleep mode.

In the smartphone 900 illustrated in FIG. 32, the control unit 120 described with reference to FIG. 2, the control unit 220 described with reference to FIG. 6, and the control unit 520 described with reference to FIG. 20 may be implemented in the wireless communication interface 913. Also, at least a part of these functions may be implemented in the processor 901 or the auxiliary controller 919.

Note that the smartphone 900 may operate as a wireless access point (software AP) by an access point function executed by the processor 901 in an application level. Also, the wireless communication interface 913 may include a wireless access point function.

[6-2. Second Application Example]

Figure 33:
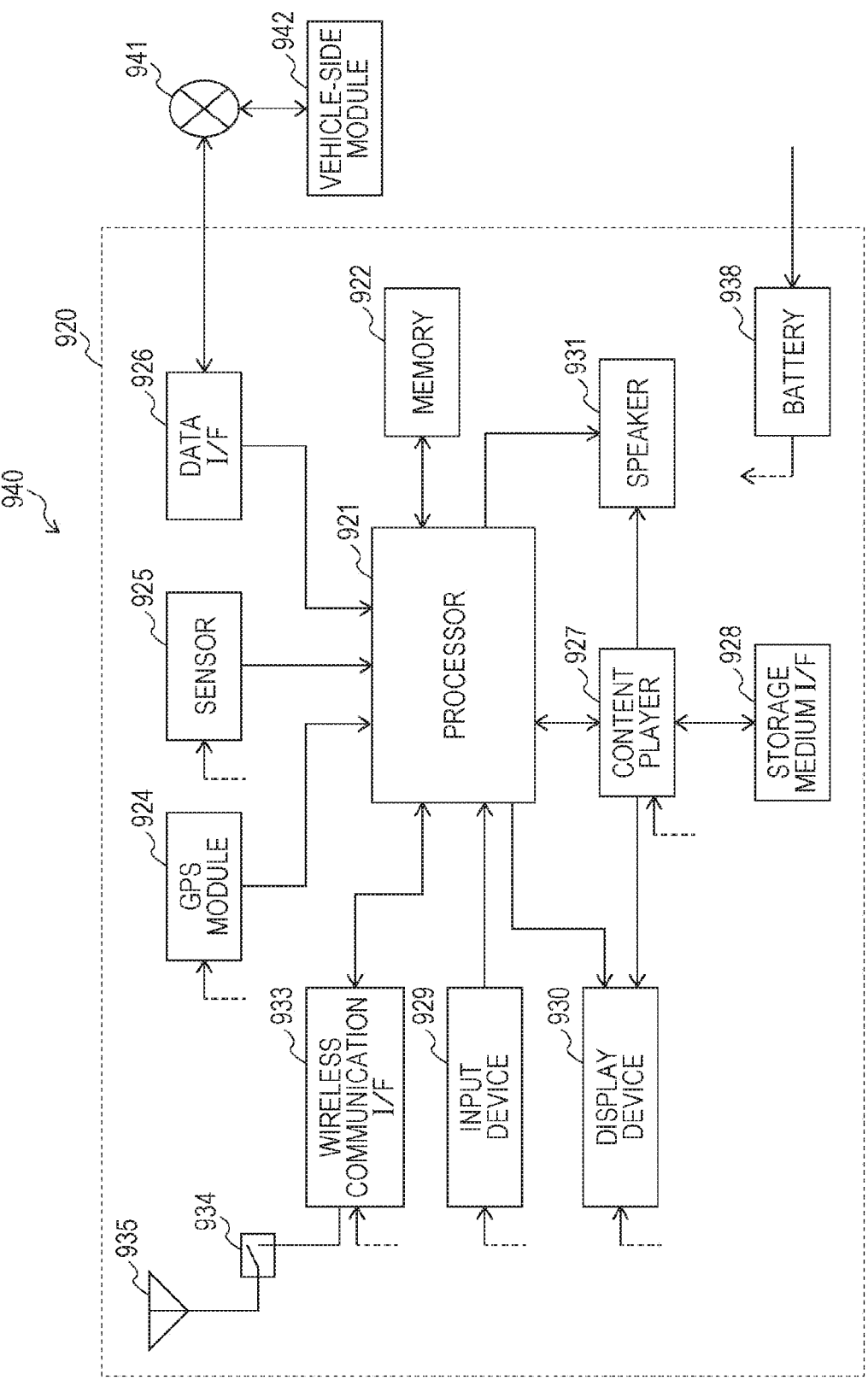
FIG. 33 is a block diagram illustrating an example of a schematic configuration of a car navigation apparatus.

FIG. 33 is a block diagram illustrating an example of a schematic configuration of a car navigation apparatus 920 to which a technology according to an embodiment of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC. The processor 921 controls a navigation function and a different function of the car navigation apparatus 920. The memory 922 includes a RAM and a ROM and stores a program and data executed by the processor 921.

The GPS module 924 measures a position (such as latitude, longitude, and altitude) of the car navigation apparatus 920 by using a GPS signal received from a GPS satellite. The sensor 925 may include, for example, a sensor group of a gyro sensor, a terrestrial magnetism sensor, an atmospheric pressure sensor, and the like. For example, the data interface 926 is connected to an in-vehicle network 941 through a terminal (not illustrated) and acquires data which is generated on a vehicle side and which is, for example, vehicle speed data.

The content player 927 reproduces content stored in a storage medium (such as CD or DVD) which is inserted into the storage medium interface 928. The input device 929 includes, for example, a touch sensor to detect a touch on a screen of the display device 930, a button, or a switch and receives operation or an information input from the user. The display device 930 includes a screen such as an LCD or OLED display and displays an image of a navigation function or content to be reproduced. The speaker 931 outputs sound of a navigation function or content to be reproduced.

The wireless communication interface 933 supports one or more of wireless LAN standards such as IEEE 802.11a, 11b, 11g, 11n, 11ac, and 11ad and executes wireless communication. In an infrastructure mode, the wireless communication interface 933 may communicate with a different apparatus through a wireless LAN access point. Also, in an ad hoc mode or a direct communication mode such as Wi-Fi Direct, the wireless communication interface 933 may directly communicate with a different apparatus. Typically, the wireless communication interface 933 may include a baseband processor, an RF circuit, a power amplifier, and the like. The wireless communication interface 933 may be a one-chip module in which a memory to store a communication control program, a processor to execute the program, and a related circuit are integrated. The wireless communication interface 933 may support, in addition to a wireless LAN system, a different kind of wireless communication system such as a near field communication system, a proximity wireless communication system, or a cellular communication system. The antenna switch 934 switches a connection destination of the antenna 935 in a plurality of circuits included in the wireless communication interface 933. The antenna 935 includes one or a plurality of antenna elements and is used for transmission/reception of a wireless signal performed by the wireless communication interface 933.

Note that the example in FIG. 33 is not the limitation and the car navigation apparatus 920 may include a plurality of antennas. In this case, the antenna switch 934 may be omitted from the configuration of the car navigation apparatus 920.

The battery 938 supplies power to each block in the car navigation apparatus 920, which is illustrated in FIG. 33, through a feed line partially-indicated by a broken line in the drawing. Also, the battery 938 accumulates power fed from a vehicle side.

In the car navigation apparatus 920 illustrated in FIG. 33, the control unit 120 described with reference to FIG. 2, the control unit 220 described with reference to FIG. 6, and the control unit 520 described with reference to FIG. 20 may be implemented in the wireless communication interface 933. Also, at least apart of these functions may be implemented in the processor 921.

Also, the technology according to an embodiment of the present disclosure may be realized as an in-vehicle system (or vehicle) 940 including one or more blocks of the above-described car navigation apparatus 920, the in-vehicle network 941, and a vehicle-side module 942. The vehicle-side module 942 generates vehicle-side data such as a vehicle speed, an engine speed, or trouble information and outputs the generated data to the in-vehicle network 941.

Note that the above embodiments are described as examples to embody the present technology. Matters in the embodiments and matters to specify the invention in claims correspond to each other. Similarly, the matters to specify the invention in the claims and matters with names identical thereto in the embodiments of the present technology correspond to each other. However, the present technology is not limited to the embodiments and can be embodied by being modified as various embodiments within the spirit and the scope of the present technology.

Also, the processing procedures described in the above embodiments may be considered as a method including the series of procedures. Alternatively, the processing procedures may be considered as a program to cause a computer to execute the series of procedures or a recording medium to store the program. As the recording medium, for example, a compact disc (CD), a MiniDisc (MD), a digital versatile disc (DVD), a memory card, or a Blu-ray (registered trade mark) disc can be used.

Note that an effect described in the present specification is just an example and not the limitation. Also, there may be a different effect.

Note that the present technology may include the following configuration.

(1) A system including:
circuitry configured to
acquire information from at least first and second electronic devices, the information indicating a quality of a wireless link between the at least first and second electronic devices;
generate adjustment information indicating an adjustment of at least one of a position, orientation, antenna position or antenna direction of at least one of the first or second electronic devices to improve the quality of the wireless link between the first and second electronic devices; and
control outputting the adjustment information.

(2) The system of (1), wherein
the adjustment information indicates a recommended antenna direction for at least one of the first or second electronic devices.

(3) The system of any of (1) to (2), wherein
the adjustment information indicates a recommended orientation of at least one of the first or second electronic devices.

(4) The system of any of (1) to (3), wherein
the adjustment information indicates a recommended position of at least one of the first or second electronic devices.

(5) The system of any of (1) to (4), wherein
the information acquired from the at least first and second electronic devices indicates a data rate of the wireless link between the at least first and second electronic devices.

(6) The system of any of (1) to (5), wherein
the information acquired from the at least first and second electronic devices indicates a hop count of an indirect wireless link between the at least first and second electronic devices.

(7) The system of any of (1) to (6), wherein
the information acquired from the at least first and second electronic devices indicates a time delay of the wireless link between the at least first and second electronic devices.

(8) The system of any of (1) to (7), wherein
the system is configured to operate in a test mode, and
the circuitry is configured to control the first and second electronic devices to measure the quality of a wireless link between the at least first and second electronic devices.

(9) The system of any of (1) to (8), wherein
the circuitry is configured to control outputting the adjustment information by generating display data to be displayed by a display.

(10) The system of (9), further including:
a user interface configured to receive an input corresponding to a layout of a building and a location of each or the first and second devices within the building, wherein
the circuitry is configured to generate the display data based on the received input.

(11) The system of (10), wherein
the user interface includes as display configured to display a plurality of icons each corresponding to a feature of the building and each of the first and second electronic device.

(12) The system of (11), wherein
the user interface is configured to receive, as the input, one or more dragging operations dragging one or more of the plurality of icons to a predetermined area of the display.

(13) The system of (10), wherein
the user interface is configured to receive an input corresponding to a name of each of the first and second electronic devices.

(14) The system of (9), wherein
the display data indicates the quality of the wireless link between the first and second electronic devices.

(15) The system of (14), wherein
The quality of the wireless link between the first and second electronic devices is indicated by a graphic indicator extending between icons representing the first and second electronic devices.

(16) The system of (14), wherein
the display data indicates a spacial relationship between the first and second electronic devices.

(17) The system of (14), wherein
the display data includes a layout of a building and indicates a position of the first and second electronic devices on the layout of the building.

(18) The system of any of (1) to (17), wherein
the circuitry is configured to output the adjustment information to at least one of the first or second electronic devices.

(19) The system of any of (1) to (18), wherein
the system is a third electronic device that includes the circuitry, and the third electronic device is communicatively coupled to the first and second electronic devices via a network.

(20) The system of (19), wherein
the circuitry is configured to stream content to at least one of the first or second electronic devices via the network for reproduction at the at least one of the first or second electronic devices.

(21) The system of (19), wherein
the network is a network in which the first, second and third electronic devices are connected to each other by one-on-one wireless communication.

(22) The system of (19), wherein
the network is an ad hoc mesh network connecting the first, second and third electronic devices.

(23) The system of any of (1) to (22), wherein the system includes:
the first electronic device;
the second electronic device; and
a third electronic device including the circuitry.

(24) The system of (23), wherein
the first and second electronic devices are configured to measure at least one of a data rate, a received signal strength indicator (RSSI), a modulation and coding scheme (MCS), a time deviation or hop count of the link between the first and second electronic devices.

(25) The system of (24), wherein
the first and second electronic devices transmit a result of the measurement to the third electronic device as the information indicating a quality of a wireless link between the at least first and second electronic devices.

(26) The system of any of (1) to (25), wherein
the at least one of the first or second electronic devices is a wireless speaker.

(27) A method performed by a system, the method including:
acquiring information from at least first and second electronic devices, the information indicating a quality of a wireless link between the at least first and second electronic devices;
generating adjustment information indicating an adjustment of at least one of a position, orientation, antenna position or antenna direction of at least one of the first or second electronic devices to improve the quality of the wireless link between the first and second electronic devices; and
controlling outputting the adjustment information.

(28) One or more non-transitory computer readable media including computer program instructions, which when executed by a system, cause the system to:
acquire information from at least first and second electronic devices, the information indicating a quality of a wireless link between the at least first and second electronic devices;
generate adjustment information indicating an adjustment of at least one of a position, orientation, antenna position or antenna direction of at least one of the first or second electronic devices to improve the quality of the wireless link between the first and second electronic devices; and
control outputting the adjustment information.

(29) An information processing apparatus including: an acquisition unit configured to acquire communication quality related to each of a plurality of devices in a network in which the plurality of devices is connected to each other; and a control unit configured to output, based on the acquired communication quality, adjustment information to adjust a position and a direction of an antenna of each of the devices.

(30) The information processing apparatus according to (29), wherein the control unit displays a spatial image, which indicates a space in which the plurality of devices is installed, and a device image, which indicates a position in the space at which position the devices are installed, onto a display unit and displays the communication quality related to the devices while associating the communication quality with the devices.

(31) The information processing apparatus according to (29) or (30), wherein the control unit displays an apparatus image, which indicates a position in the space at which position the information processing apparatus exists, onto the display unit and displays communication quality related to the information processing apparatus and the devices while associating the communication quality with the information processing apparatus and the devices.

(32) The information processing apparatus according to (29) or (30), wherein the control unit displays, as the communication quality related to the devices, communication quality measured in each of installation directions of the devices while associating the communication quality with each of the installation directions.

(33) The information processing apparatus according to any one of (29) to (32), wherein based on the acquired communication quality, the control unit displays, onto a display unit, the adjustment information which suggests a position and a direction of an antenna of each of the devices for improvement of communication quality in the network.

(34) The information processing apparatus according to any one of (29) to (33), wherein the information processing apparatus is a mobile device, and
the control unit moves the information processing apparatus and uses communication quality which is related to each of the devices and which is measured serially after the movement.

(35) The information processing apparatus according to (34), wherein the control unit displays a spatial image, which indicates a space in which the plurality of devices is installed, and a positional image, which indicates a position in the space at which position the communication quality is measured after the movement, onto the display unit and displays the communication quality measured at the position while associating the communication quality with the position.

(36) The information processing apparatus according to any one of (29) to (35), wherein each of the devices is a mobile device, and the control unit generates control information to move each of the devices based on the acquired communication quality and transmits the control information to each of the devices.

(37) The information processing apparatus according to any one of (29) to (36), wherein the control unit displays, onto the display unit, a state image indicating a state of communication quality in the network based on the acquired communication quality.

(38) The information processing apparatus according to any one of (29) to (37), wherein the communication quality is communication quality between the devices which quality is measured by each of the devices or communication quality between the information processing apparatus and each of the devices.

(39) The information processing apparatus according to any one of (29) to (38), wherein the network is a network in which the plurality of devices is connected to each other by one-on-one wireless communication.

(40) A communication system including: a device which configures a network by being mutually connected to an information processing apparatus and a different device, acquires communication quality related to the information processing apparatus and the different device, and transmits the communication quality to the information processing apparatus; and the information processing apparatus configured to output adjustment information for adjustment of a position and a direction of an antenna of each device based on the transmitted communication quality.

(41) An information processing method including: acquiring to acquire communication quality related to each of a plurality of devices in a network in which the plurality of devices is connected to each other; and controlling to output, based on the acquired communication quality, adjustment information for adjustment of a position and a direction of an antenna of each of the devices.

(42) A program for causing a computer to execute acquiring to acquire communication quality related to each of a plurality of devices in a network in which the plurality of devices is connected to each other, and controlling to output, based on the acquired communication quality, adjustment information for adjustment of a position and a direction of an antenna of each of the devices.

REFERENCE SIGNS LIST 10, 30 Communication system
31 Network
32 Access point
33 Base station
40, 100, 500 Information processing apparatus
110 Communication unit
111 Antenna
120 Control unit
130 Storage unit
140 Timer
150 Display unit
160 Operation reception unit
170 Sound output unit
180 Bus
200 to 204 Electronic device
210 Communication unit
211 Antenna
220 Control unit
230 Storage unit
240 Timer
250 Sound output unit
260 Bus
510 Communication unit
511 Antenna
520 Control unit
530 Storage unit
540 Timer
550 Display unit
560 Operation reception unit
570 Sound output unit
580 Bus
581 Sensor
582 Actuator
583 Motor
750 Server
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle-side module

The invention claimed is:

1. A system, comprising:
circuitry configured to:
acquire first information from at least one of a first electronic device or a second electronic device,
wherein the first information indicates a quality of a first wireless link between the first electronic device and the second electronic device,
wherein the system is a third electronic device that includes the circuitry, and the third electronic device is communicatively coupled with each of the first electronic device and the second electronic device via a network;
acquire, based on a location of the third electronic device, second information from at least one of the first electronic device or the second electronic device,
wherein the second information indicates a quality of a second wireless link between the third electronic device and at least one of the first electronic device or the second electronic device;
generate adjustment information based on at least one of the first information or the second information,
wherein the adjustment information indicates an adjustment of at least one of a position, an orientation, an antenna position or an antenna direction of at least one of the first electronic device or the second electronic device to improve the quality of the first wireless link and the quality of the second wireless link; and
control transmission of the adjustment information.

2. The system of claim 1, wherein
the adjustment information indicates a recommended antenna direction for at least one of the first electronic device or the second electronic device.

3. The system of claim 1, wherein
the adjustment information indicates a recommended orientation of at least one of the first electronic device or the second electronic device.

4. The system of claim 1, wherein
the adjustment information indicates a recommended position of at least one of the first electronic device or the second electronic device.

5. The system of claim 1, wherein
the first information indicates a data rate of the first wireless link.

6. The system of claim 1, wherein
the first information indicates a hop count of an indirect wireless link between the first electronic device and the second electronic device.

7. The system of claim 1, wherein
the first information indicates a time delay of the first wireless link.

8. The system of claim 1, wherein
the system is configured to operate in a test mode, and
the circuitry is further configured to control the first electronic device and the second electronic device to measure the quality of the first wireless link.

9. The system of claim 1, wherein
the system further includes a display screen, and
the circuitry is further configured to:
generate display data based on the adjustment information; and
control the display screen to display the display data.

10. The system of claim 9, further comprising:
a user interface configured to receive a first input, wherein the first input corresponds to a layout of a building and the position of each of the first electronic device and the second electronic device within the building,
wherein the circuitry is further configured to generate the display data based on the received first input.

11. The system of claim 10, wherein
The display screen is the user interface configured to display a plurality of icons, wherein each icon of the plurality of the icons corresponds to one of a feature of the building, the first electronic device or the second electronic device.

12. The system of claim 11, wherein
the user interface is further configured to receive, as the first input, a drag operation to drag at least one of the plurality of icons to a specific area of the user interface.

13. The system of claim 10, wherein
the user interface is further configured to receive a second input corresponding to a name of each of the first electronic device and the second electronic device.

14. The system of claim 9, wherein
the display data indicates the quality of the first wireless link.

15. The system of claim 14, further comprising
a user interface configured to display the quality of the first wireless link by a graphic indicator that extends between a first icon and a second icon of a plurality of icons,
wherein the first icon represents the first electronic device and the second icon represents the second electronic device.

16. The system of claim 14, wherein
the display data indicates a spatial relationship between the first electronic device and the second electronic device.

17. The system of claim 14,
wherein the display data includes a layout of a building, and
wherein the display data indicates the position of the first electronic device and the second electronic device in the layout of the building.

18. The system of claim 1, wherein
the circuitry is further configured to output the adjustment information to at least one of the first electronic device or the second electronic device.

19. The system of claim 1, wherein
the circuitry is further configured to stream, via the network, a plurality of content items to at least one of the first electronic device or the second electronic device for reproduction of the plurality of content items at the at least one of the first electronic device or the second electronic device.

20. The system of claim 1, wherein
the network is such that each of the first electronic device, the second electronic device, and the third electronic device are inter-connected based on one-on-one wireless communication.

21. The system of claim 1, wherein
the network is an ad hoc mesh network that connects the first electronic device, the second electronic device, and the third electronic device.

22. The system of claim 1, wherein
the first electronic device and the second electronic device are configured to measure at least one of a data rate, a received signal strength indicator (RSSI), a modulation and coding scheme (MCS), a time deviation or a hop count of the first wireless link.

23. The system of claim 22, wherein
each of the first electronic device and the second electronic device transmits a result of the measurement to the third electronic device as the first information, wherein the first information indicates the quality of the first wireless link.

24. The system of claim 1, wherein
at least one of the first electronic device or the second electronic device is a wireless speaker.

25. A method, comprising:
in a system:
acquiring first information from at least one of a first electronic device or a second electronic device, wherein the first information indicates a quality of a first wireless link between the first electronic device and the second electronic device;
wherein the system is a third electronic device that is communicatively coupled with each of the first electronic device and the second electronic device via a network;
acquiring, based on a location of the third electronic device, second information from at least one of the first electronic device or the second electronic device, wherein the second information indicates a quality of a second wireless link between the third electronic device and at least one of the first electronic device or the second electronic device;
generating adjustment information based on at least one of the first information or the second information,
wherein the adjustment information indicates an adjustment of at least one of a position, an orientation, an antenna position or an antenna direction of at least one of the first electronic device or the second electronic device to improve the quality of the first wireless link and the quality of the second wireless link; and
controlling transmission of the adjustment information.

26. A non-transitory computer-readable medium having stored thereon computer-executable instructions which, when executed by a system, cause the system to execute operations, the operations comprising:
acquiring first information from at least one of a first electronic device or a second electronic device, wherein the first information indicates a quality of a first wireless link between the first electronic device and the second electronic device;
wherein the system is a third electronic device that is communicatively coupled with each of the first electronic device and the second electronic device via a network;
acquiring, based on a location of the third electronic device, second information from at least one of the first electronic device or the second electronic device, wherein the second information indicates a quality of a second wireless link between the third electronic device and at least one of the first electronic device or the second electronic device;
generating adjustment information based on at least one of the first information or the second information, wherein the adjustment information indicates an adjustment of at least one of a position, an orientation, an antenna position or an antenna direction of at least one of the first electronic device or the second electronic device to improve the quality of the first wireless link and the quality of the second wireless link; and controlling transmission of the adjustment information.

* * * * *